(12) United States Patent
Kobatake et al.

(10) Patent No.: US 9,466,431 B2
(45) Date of Patent: Oct. 11, 2016

(54) IONIC COMPOUND AND PROCESS FOR PRODUCTION THEREOF, AND ELECTROLYTIC SOLUTION AND ELECTRICAL STORAGE DEVICE EACH UTILIZING THE IONIC COMPOUND

(75) Inventors: Takayuki Kobatake, Suita (JP); Masayuki Okajima, Suita (JP); Taisuke Kasahara, Suita (JP); Yasuyuki Miyoshi, Suita (JP); Izuho Okada, Suita (JP); Naohiko Itayama, Suita (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 323 days.

(21) Appl. No.: 13/980,671

(22) PCT Filed: Jan. 20, 2012

(86) PCT No.: PCT/JP2012/051275
§ 371 (c)(1),
(2), (4) Date: Jul. 19, 2013

(87) PCT Pub. No.: WO2012/099259
PCT Pub. Date: Jul. 26, 2012

(65) Prior Publication Data
US 2013/0295449 A1    Nov. 7, 2013

(30) Foreign Application Priority Data

Jan. 21, 2011 (JP) ................. 2011-011445
Feb. 10, 2011 (JP) ................. 2011-027924
Apr. 20, 2011 (JP) ................. 2011-094525
Apr. 21, 2011 (JP) ................. 2011-095524
Dec. 22, 2011 (JP) ................. 2011-282242

(51) Int. Cl.
*H01M 6/04* (2006.01)
*H01G 9/035* (2006.01)
(Continued)

(52) U.S. Cl.
CPC .............. *H01G 9/035* (2013.01); *H01G 11/62* (2013.01); *H01M 10/0567* (2013.01); *H01M 10/0568* (2013.01); *H01M 10/0569* (2013.01); *H01G 9/2018* (2013.01); *Y02E 60/13* (2013.01)

(58) Field of Classification Search
CPC .... H01G 11/62; H01G 9/035; H01G 9/2018; H01M 10/0568; H01M 10/0567; H01M 10/0569; Y02E 60/13
USPC .......... 429/200; 252/62.2; 361/504; 562/594
See application file for complete search history.

(56) References Cited

U.S. PATENT DOCUMENTS 7,645,434 B2   1/2010  Welz-Biermann et al.
7,713,658 B2   5/2010  Mizuta et al.
(Continued)

FOREIGN PATENT DOCUMENTS

JP    2001118600    4/2001
JP    2002-363133   12/2002
(Continued)

OTHER PUBLICATIONS

Japanese Office Action issued Jul. 29, 2014 in corresponding Japanese Application No. 2012-553793 with English translation.
(Continued)

*Primary Examiner* — Gary Harris
(74) *Attorney, Agent, or Firm* — Wenderoth, Lind & Ponack, L.L.P.

(57) ABSTRACT

The present invention provides an ionic compound containing a cyanoborate; a process for production thereof; and an electrolytic solution and a device. The electrolytic solution comprises an ionic compound represented by general formula (1) and a solvent, $$M^{n+}([B(CN)_{4-m}Y_m]^-)_n \quad (1)$$

wherein $M^{n+}$ represents an organic or inorganic cation having a valency of 1 to 3; Y represents a halogen, a hydrocarbon group which has a main chain having 1 to 10 carbon atoms and which may optionally contain a halogen, $-C(O)R^{14}$, $-S(O)_lR^{14}$, $-Z(R^{14})_2$, or $-XR^{14}$; $R^{14}$ represents H, a halogen, or an organic substituent group which has a main chain having 1 to 10 atoms; Z represents N or P; X represents O or S; $R^{13}$ represents H, or an hydrocarbon group which has a main chain having 1 to 10 atoms; l represents an integer of 1 to 2; m and n represent an integer of 1 to 3 respectively.

8 Claims, 4 Drawing Sheets

(51) Int. Cl.
  *H01G 11/62* (2013.01)
  *H01M 10/0568* (2010.01)
  *H01M 10/0569* (2010.01)
  *H01M 10/0567* (2010.01)
  *H01G 9/20* (2006.01)

(56) References Cited

U.S. PATENT DOCUMENTS

| | | |
|---|---|---|
| 7,914,927 B2 | 3/2011 | Mizuta et al. |
| 8,283,497 B2 | 10/2012 | Wenger et al. |
| 2003/0022069 A1 | 1/2003 | Karube et al. |
| 2004/0002002 A1 | 1/2004 | Mizuta et al. |
| 2005/0022369 A1 | 2/2005 | Yang et al. |
| 2006/0222584 A1 | 10/2006 | Welz-Biermann et al. |
| 2009/0123845 A1 | 5/2009 | Zaghib et al. |
| 2010/0173195 A1 | 7/2010 | Mizuta et al. |
| 2011/0150736 A1 | 6/2011 | Hagiwara et al. |
| 2011/0171112 A1* | 7/2011 | Armand .......... C07F 5/022 423/472 |
| 2012/0018676 A1 | 1/2012 | Wenger et al. |
| 2012/0296096 A1 | 11/2012 | Shinohara et al. |

FOREIGN PATENT DOCUMENTS

| | | |
|---|---|---|
| JP | 2003045484 | 2/2003 |
| JP | 2004-6240 | 1/2004 |
| JP | 2004063156 | 2/2004 |
| JP | 2004-165131 | 6/2004 |
| JP | 2004-175666 | 6/2004 |
| JP | 2004-175667 | 6/2004 |
| JP | 2006-517546 | 7/2006 |
| JP | 2009506505 | 2/2009 |
| JP | 2010013433 | 1/2010 |
| JP | 2011-1305 | 1/2011 |
| WO | 2010/021391 | 2/2010 |
| WO | 2010/086131 | 8/2010 |
| WO | 2011/085967 | 7/2011 |

OTHER PUBLICATIONS

International Search Report issued Apr. 17, 2012 in International (PCT) Application No. PCT/JP2012/051275.

Office Action issued Feb. 2, 2015 in corresponding Chinese Application No. 201280005961.0, with English translation.

Extended European Search Report issued May 4, 2015 in corresponding European Application No. 12736377.8.

Japanese Office Action issued May 12, 2015 in corresponding Japanese Application No. 2012-039397 (with English translation).

* cited by examiner

IONIC COMPOUND AND PROCESS FOR PRODUCTION THEREOF, AND ELECTROLYTIC SOLUTION AND ELECTRICAL STORAGE DEVICE EACH UTILIZING THE IONIC COMPOUND

TECHNICAL FIELD

The present invention relates to an ionic compound and a process for production thereof, and an electrolytic solution and an electrical storage device each utilizing the ionic compound.

BACKGROUND ART

An ionic compound and an electrolytic material containing the ionic compound are used for an ionic conductor for various cells based on ion conductivity, and utilized for electrochemical devices such as an electric field capacitor, an electric double layer capacitor, a lithium ion capacitor, a solar cell, and an electrochromic display device, in addition to cells having charge/discharge mechanism such as a primary cell, a lithium ion secondary cell, and a fuel cell.

Various compounds as an ionic compound to be used preferably for these electrochemical devices have been investigated and for example, alkali metal salts or organic cation salts of hexafluorophosphate, tetrafluoroborate, trifluoromethylsulfonylimide (TFSI), dicyanamide (DCA), tricyanomethide (TCM), and the like have been proposed.

In Patent Documents 1 and 2, among the above-mentioned ionic compounds, compounds containing anions having a structure formed by bonding a cyano group to N, C, B, or the like as a central element are investigated, and these patent documents describe that ionic compounds containing the anions having the above-mentioned structure are used preferably as electrolytes for various electrochemical devices since the ionic compounds are excellent in ion conductivity and have thermally, physically, and electrochemically stable characteristics.

Particularly, with regard to an ionic compound containing, as an anion, cyanoborate having boron as a central element, Patent Documents 3 and 4, for example, describe ionic compounds (TCB salts) containing tetracyanoborate ($[B^-(CN)_4]$, hereinafter, may be referred to as TCB) as an anion. Since TCB salts shows characteristics of ionic liquids, that is, characteristics of being a liquid even at room temperature and being stable thermally, physically, and electrochemically, their production process as well as their applications for various uses are investigated (Patent Documents 3 and 4).

Further, Patent Document 5 discloses an ionic compound obtained by substituting a part of the cyano group bonded to boron of TCB with an alkoxy group or a thioalkoxy group, and describes that the ionic compound is useful as an ionic liquid or the like.

Patent Documents

Patent Document 1: Japanese Unexamined Patent Application Publication No. 2004-165131
Patent Document 2: Japanese Unexamined Patent Application Publication No. 2004-6240
Patent Document 3: Japanese Unexamined Patent Application Publication No. 2006-517546
Patent Document 4: PCT International Publication No. WO 2010/021391
Patent Document 5: PCT International Publication No. WO 2010/086131

SUMMARY OF THE INVENTION

Problems to be Solved by the Invention

For example, an electrical storage device used as an electric power source for mobile phones, personal computers, domestic electric appliances, and also automobiles and the like is investigated as a use of the above-mentioned ionic compound. In the use thereof, requirement of miniaturization and high-performance is increasing year by year and an electrical storage device is required to have higher output power.

It is considered that the performance of an electrical storage device is improved by investigating an ionic compound. That is, if it is possible to replace a substituent group for cyanoborate with an arbitrary substituent group, the physical properties such as melting point and solubility in an organic solvent can be changed depending on the uses while the characteristics as TCB are kept, and accordingly it is supposed to be possible to provide an ionic compound which can satisfy the above-mentioned demands.

In addition, even if an ionic compound has good physical properties, in the case where the ionic compound contains impurities, the intrinsic advantageous properties of the ionic compound cannot be exhibited sufficiently and the ionic compound itself may be deteriorated easily. Consequently, in the case where such an ionic compound is used for various uses, there occurs a problem that it is hard to obtain desired performance. Particularly, researches by the present inventors have made it clear that a cyanoborate salt has extremely high affinity with water, so that the water content is hardly lowered even by heating to a high temperature. That is, in a compound containing a cyanoborate anion, water and free $CN^-$ tend to remain in the generated ionic compound, and in the case where such impurities are contained, the ionic compound tends to become inferior in heat resistance. Consequently, if this ionic compound is used for an electrolytic solution for an electrical storage device, decomposition of electrolytic solution, a decrease in voltage endurance, and also corrosion of electrodes and other peripheral materials used for the electrical storage device tend to be caused easily, and as a result, there occurs a problem that the performance of the electrical storage device such as cycle performance are lowered.

The present invention has been completed in terms of the circumstances as described above, and an object of the present invention is to provide: an ionic compound containing cyanoborate, particularly an ionic compound with a decreased content of a prescribed impurity; a process for producing such an ionic compound; and an electrolytic material for an electrical storage device which is hardly decomposed even under high voltage, an electrolytic material with a lowered water content which causes an adverse effect on electrochemical characteristics of an electrical storage device, and an electrical storage device using the electrolytic material.

Solutions to the Problems

An electrolytic solution according to the present invention has a feature of containing an ionic compound represented by general formula (1) and a solvent:

$$M^{n+}([B(CN)_{4-m}Y_m]^-)_n \quad (1)$$

(wherein, $M^{n+}$ represents an organic or inorganic cation having a valency of 1, 2 or 3; Y represents a halogen, a hydrocarbon group which has a main chain having 1 to 10 carbon atoms and which may optionally contain a halogen, —C(O)R$^{14}$, —S(O)$_l$R$^{14}$, —Z(R$^{14}$)$_2$, or —XR$^{14}$; R$^{14}$ represents H, a halogen, or an organic substituent group which has a main chain having 1 to 10 atoms; Z represents N or P; X represents O or S; l represents an integer of 1 to 2; m represents an integer of 1 to 3; and n represents an integer of 1 to 3).

In the ionic compound of the present invention, in general formula (1), Y is preferably a hydrocarbon group which has a main chain having 1 to 10 carbon atoms and which may optionally contain a halogen, —C(O)R$^{14}$, —S(O)$_l$R$^{14}$, —Z(R$^{14}$)$_2$, or —XR$^{14}$, and Y is more preferably a hydrocarbon group which has a main chain having 1 to 10 carbon atoms and which may optionally contain a halogen, or —OR$^{14}$. Further, in general formula (1), an ionic compound in which $M^{n+}$ is a metal ion and an ionic compound in which $M^{n+}$ is an organic cation are both preferable embodiments of the present invention.

The present invention also includes a device using the above-mentioned electrolytic solution.

The present invention also includes a process for producing the ionic compound represented by formula (1). The production process of the present invention has a feature of allowing a compound represented by formula (8) and a substitution reaction reagent to react with each other:

$$M^{n+}([B(CN)_{4-m}Y_m]^-)_n \quad (1)$$

(in general formula (1), $M^{n+}$ represents an organic or inorganic cation having a valency of 1, 2 or 3; Y represents a halogen, a hydrocarbon group which has a main chain having 1 to 10 carbon atoms and which may optionally contain a halogen, —C(O)R$^{14}$, —S(O)$_l$R$^{14}$, —Z(R$^{14}$)$_2$, or —XR$^{14}$; R$^{14}$ represents H, a halogen, or an organic substituent group which has a main chain having 1 to 10 atoms; Z represents N or P; X represents O or S; l represents an integer of 1 to 2; m represents an integer of 1 to 3; and n represents an integer of 1 to 3);

$$M^{n+}([B(CN)_{4-m}(XR^{13})_m]^-)_n \quad (8)$$

(in general formula (8), $M^{n+}$ represents an organic or inorganic cation having a valency of 1, 2 or 3; X represents O or S; R$^{13}$ represents H or a hydrocarbon group which has a main chain having 1 to 10 carbon atoms; m represents an integer of 1 to 3; and n represents an integer of 1 to 3).

The above-mentioned substitution reaction reagent is preferably an alkylsilylcyanide, an organic magnesium reagent, an organic lithium reagent, an aliphatic alcohol, a halogenated alcohol, a phenol, a carboxylic anhydride, a sulfonic acid or a sulfonic anhydride.

In the ionic compound of the present invention, in general formula (1), Y is preferably —OR$^{14}$ and the organic substituent group represented by R$^{14}$ is an alkyl group which has a main chain having 1 to 10 carbon atoms and which may optionally contain a halogen, an aryl group which has 6 to 10 carbon atoms and which may optionally contain a halogen, an alkanoyl group which has a main chain having 1 to 10 carbon atoms and which may optionally contain a halogen, a halosulfinyl group, an alkylsulfinyl group which has 1 to 10 carbon atoms and which may optionally contain a halogen, an arylsulfinyl group which has 6 to 10 carbon atoms and which may optionally contain a halogen, a halosulfonyl group, an alkylsulfonyl group which has 1 to 10 carbon atoms and which may optionally contain a halogen, an arylsulfonyl group which has 6 to 10 carbon atoms and which may optionally contain a halogen, or an alkylsilyl group which has 1 to 10 carbon atoms.

Further, the present invention includes an ionic compound represented by general formula (6), which has a content of water (moisture) as an impurity of 3000 ppm or lower:

$$M^{n+}([B(CN)_{4-m}(XR^{14})_m]^-)_n \quad (6)$$

(in general formula (6), $M^{n+}$ represents an organic or inorganic cation having a valency of 1 to 3; X represents O or S; R$^{14}$ represents H, a halogen, or an organic substituent group which has a main chain having 1 to 10 atoms; m represents an integer of 1 to 3; and n represents an integer of 1 to 3).

It is preferable that the above-mentioned ionic compound has a CN$^-$ content of 10000 ppm or lower as an impurity.

Moreover, the present invention also includes a process for producing the ionic compound represented by general formula (6). The production process of the present invention has a feature of allowing a cyanide compound, a boron compound, and a halogen salt of an organic or inorganic cation to react with one another:

$$M^{n+}([B(CN)_{4-m}(XR^{14})_m]^-)_n \quad (6)$$

(in general formula (6), $M^{n+}$ represents an organic or inorganic cation having a valency of 1, 2 or 3; X represents O or S; R$^{14}$ represents H, a halogen, or an organic substituent group which has a main chain having 1 to 10 atoms; m represents an integer of 1 to 3; and n represents an integer of 1 to 3).

The above-mentioned cyanide compound is preferably trialkylsily cyanide.

Advantages of the Invention

Since the content of a prescribed impurity is decreased in the ionic compound of the present invention represented by general formula (1) described above, it is supposed that a decrease in physical properties attributed to the impurity contained in the ionic compound is hardly caused.

Further, the electrolytic solution of the present invention containing the ionic compound (1) and a solvent hardly causes decomposition even in a high voltage range.

Moreover, according to the present invention, an electrolytic material such as an electrolytic solution with decreased content of water or the like which causes an adverse effect on electrochemical properties of an electrical storage device for an electrolytic solution can be obtained. Accordingly, use of the electrolytic material of the present invention for an electrolytic solution gives an electrolytic solution with good voltage endurance. It is supposed that this electrolytic solution scarcely corrodes and scarcely deteriorates an electrical storage device member such as an electrode, and as a result, it is supposed that deterioration of the electrochemical properties of an electrical storage device can be also suppressed.

According to the process of the present invention, a cyanoborate salt having 1 to 3 cyano groups and an arbitrary substituent group can be obtained.

MODE FOR CARRYING OUT THE INVENTION

1. Ionic Compound

Figure 1:
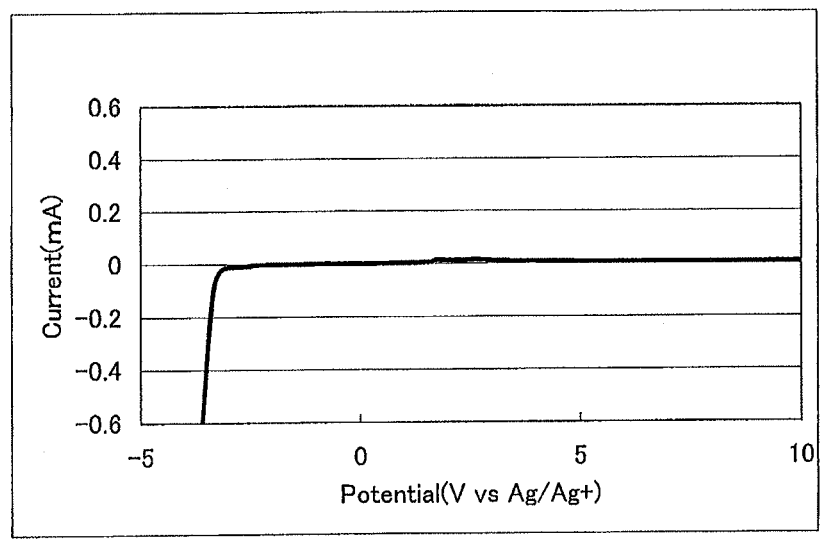
FIG. 1 is a diagram showing LSV measurement results of Experimental Example 2-3-1.

An ionic compound according to the present invention is an ionic compound represented by formula (1); $M^{n+}([B(CN)_{4-m}Y_m]^-)_n$ (hereinafter, referred to as ionic compound (1)) and composed of an organic or inorganic cation represented by $M^{n+}$ and a cyanoborate anion represented by $([B(CN)_{4-m}Y_m]^-)$. In formula (1), Y represents a halogen, a hydrocarbon group which has a main chain having 1 to 10 carbon atoms and which may optionally contain a halogen, $-C(O)R^{14}$, $-S(O)_l R^{14}$, $-Z(R^{14})_2$, or $-XR^{14}$; $R^{14}$ represents H, a halogen, or an organic substituent group which has a main chain having 1 to 10 atoms; Z represents N or P (preferably N); X represents O or S (preferably O); l represents an integer of 1 to 2; m represents an integer of 1 to 3; and n represents an integer of 1 to 3.

The ionic compound (1) of the present invention is different from a TCB salt in that a part of the cyano groups bonded to boron is substituted with a Y group in the cyanoborate anion constituting the ionic compound (1). That is, the TCB salt has a structure in which only a cyano group is bonded directly to boron, whereas the ionic compound (1) of the present invention has a structure in which a cyano group and a Y group are bonded to boron. Consequently, owing to the difference of the structures, it is expected that the ionic compound has physical properties different from those of the TCB salt in terms of melting point and solubility in an organic solvent. Accordingly, use of an electrolytic solution containing the cyanoborate salt as an electrolyte for various electrical storage devices gives performance as high as or similar to that of the TCB salt and also gives wider selection of a solvent than the TCB salt, so that a solvent which could not be used for the TCB salt may be used, and it is expected that the electrolyte can be used in a wider range. Hereinafter, the anion and cation constituting the ionic compound of the present invention will be described in order.

Cyanoborate Anion: $[B(CN)_{4-m}Y_m]^-$

The cyanoborate anion of the present invention has a structure represented by the general formula: $[B(CN)_{4-m}Y_m]^-$ formed by bonding a cyano group: —CN and —Y to boron. In the above-mentioned general formula, m is an integer of 1 to 3, so that the cyanoborate anion of the present invention include cyanoborate anions such as tricyanoborate anion: $[B(CN)_3Y]^-$ in which m is 1; dicyanoborate anion: $[B(CN)_2Y_2]^-$ in which m is 2; and monocyanoborate anion: $[B(CN)Y_3]^-$ in which m is 3.

In the cyanoborate anion represented by the above-mentioned general formula, Y represents a halogen, a hydrocarbon group which has a main chain having 1 to 10 carbon atoms and which may optionally contain a halogen, $-C(O)R^{14}$, $-S(O)_l R^{14}$, $Z(R^{14})_2$, or $XR^{14}$. In the case where m is 2 or 3, two or more Ys may be same or different and two or more Ys may be bonded together to form a cyclic structure including a B atom.

In the case where Y constituting the above-mentioned cyanoborate anion is a halogen, examples of Y include F, Cl, Br, and I. In addition, in the case where Y is a halogen, m is preferably 2 or more. In this case, two or more Ys are preferably different halogens or preferably a halogen and a substituent group other than halogens.

Examples of the hydrocarbon group which has a main chain having 1 to 10 carbon atoms include alkyl groups having 1 to 10 carbon atoms such as a methyl group, an ethyl group, a n-propyl group, an iso-propyl group, a n-butyl group, an iso-butyl group, a sec-butyl group, a tert-butyl group, a pentyl group, a hexyl group, a heptyl group, an octyl group, and a 2-ethylhexyl group; alkenyl groups having 1 to 10 carbon atoms such as a vinyl group, a propenyl group, an isopropenyl group, an allyl group, a 1-butenyl group, a 2-butenyl group, a 3-butenyl group, a 1,3-butadienyl group, a 1-cyclohexenyl group, a 2-cyclohexenyl group, a 3-cyclohexenyl group, a methylcyclohexenyl group, and an ethylcyclohexenyl group; alkynyl groups having 1 to 10 carbon atoms such as an ethynyl group, a propargyl group, a cyclohexylethynyl group, and a phenylethynyl group; and aryl groups and hetero atom-containing aryl groups having 6 to 10 carbon atoms such as a phenyl group, a benzyl group, a thienyl group, a pyridyl group, and an imidazolyl group.

Examples of the halohydrocarbon group having 1 to 10 carbon atoms include haloalkyl groups and haloaryl groups obtained by substituting some or all of hydrogen atoms of the above-mentioned hydrocarbon groups with a halogen (F, Cl, Br, or I) such as a fluoromethyl group, a difluoromethyl group, a trifluoromethyl group, a chloromethyl group, a bromomethyl group, an iodomethyl group, a difluorochloromethyl group, a fluorodichloromethyl group, a fluoroethyl group, a difluoroethyl group, a trifluoroethyl group, a tetrafluoroethyl group, a perfluoroethyl group, a fluorochloroethyl group, a chloroethyl group, a fluoropropyl group, a perfluoropropyl group, a fluorochloropropyl group, a perfluorobutyl group, a perfluorooctyl group, a pentafluorocyclohexyl group, a perfluorocyclohexyl group, a pentafluorophenyl group, a perchlorophenyl group, a fluoromethylene group, a fluoroethylene group, a fluorocyclohexene group.

The above-mentioned hydrocarbon group Y which has a main chain having 1 to 10 carbon atoms and which may optionally contain a halogen may have a substituent group (e.g., alkoxy group, amino group, cyano group, carbonyl group, sulfonyl group, and the like).

As described above, in the case where Y is a hydrocarbon group which has a main chain having 1 to 10 carbon atoms and which may optionally contain a halogen, since the solubility of the cyanoborate salt in an organic solvent is improved, and the cyanoborate salt can make it possible to give an electrolytic solution with high performance at the time of being used as the electrolytic solution for an electrical storage device or the like, and therefore, it is preferable.

$R^{14}$ in $-C(O)R^{14}$, $-S(O)_l R^{14}$, $-Z(R^{14})_2$, and $-XR^{14}$ described above represents H, a halogen, or an organic substituent group which has a main chain having 1 to 10 atoms. The halogen is preferably fluorine, chlorine, bromine, iodine or the like. The above-mentioned organic substituent group may be any of linear, branched, and cyclic substituents, may have a combination of two or more structures thereof, or may have a substituent group. The organic substituent group $R^{14}$ may further contain an unsaturated bond. The number of atoms of the main chain of the organic substituent group $R^{14}$ is as described above, and the number of carbon atoms contained in the organic substituent group $R^{14}$ (including a substituent) is preferably within a range of 1 to 20, and more preferably within a range of 1 to 10. The valency of the organic substituent group $R^{14}$, that is, the number of bonding terminals may be one or two or more. The organic substituent group $R^{14}$ may contain a halogen atom (F, Cl, Br, or the like) and a hetero atom (O, N, Si, or the like) other than carbon and hydrogen, and the number of these atoms and their positions are not particularly limited. Consequently, in the case where Y in general formula (1) is, for example, —$XR^{14}$, the kind of an atom neighboring to X is not particularly limited to carbon, but may be a hetero atom such as Si or Al. Further, the organic substituent group $R^{14}$ may be composed of only atoms other than carbon.

Specific examples of the organic substituent group $R^{14}$ may include saturated hydrocarbon groups of linear, branched, cyclic, and combination thereof such as a methyl group, an ethyl group, a n-propyl group, an iso-propyl group, a n-butyl group, an iso-butyl group, a sec-butyl group, a tert-butyl group, a pentyl group, a hexyl group, a heptyl group, an octyl group, a 2-ethylhexyl group, a cyclohexyl group, a methylcyclohexyl group, a cyclohexylmethyl group, and an adamantyl group; unsaturated hydrocarbon groups of linear, branched, cyclic, and combination thereof having a valency of one or two or more such as a vinyl group, a propenyl group, an isopropenyl group, an allyl group, a 1-butenyl group, a 2-butenyl group, a 3-butenyl group, a 1,3-butadienyl group, a 1-cyclohexenyl group, a 2-cyclohexenyl group, a 3-cyclohexenyl group, a methylcyclohexenyl group, an ethylcyclohexenyl group, a cyclohexenylmethyl group, a phenyl group, a tolyl group (methylphenyl group), a benzyl group, a phenylethyl group, a methylphenylethyl group, a cyclohexylphenyl group, a vinylphenyl group, a dimethylphenyl group, a naphthyl group, a methylnaphthyl group, a methylene group (methylidene group), an ethylene group (ethylidene group), a propylene group (propylidene group), a cyclohexene (1,2-, 1,3-, 1,4-) group, and a phenylene (o-, m-, p-) group; halohydrocarbon groups of linear, branched, cyclic, and combination thereof having a valency of one or two or more such as a fluoromethyl group, a difluoromethyl group, a trifluoromethyl group, a chloromethyl group, a bromomethyl group, an iodomethyl group, a difluorochloromethyl group, a fluorodichloromethyl group, a fluoroethyl group, a difluoroethyl group, a trifluoroethyl group, a tetrafluoroethyl group, a perfluoroethyl group, a fluorochloroethyl group, a chloroethyl group, a fluoropropyl group, a perfluoropropyl group, a fluorochloropropyl group, a perfluorobutyl group, a perfluorooctyl group, a pentafluorocyclohexyl group, a perfluorocyclohexyl group, a pentafluorophenyl group, a perchlorophenyl group, a fluoromethylene group, a fluoroethylene group, a fluorocyclohexene group, and a fluorophenylene group; cyano-hydrocarbon groups of linear, branched, cyclic, and combination thereof having a valency of one or two or more such as a cyanomethyl group, a dicyanomethyl group, a tricyanomethyl group, a cyanoethyl group, a dicyanoethyl group, a tricyanoethyl group, a tetracyanoethyl group, a cyanopropyl group, a cyanobutyl group, a cyanooctyl group, a cyanocyclohexyl group, a cyanophenyl group, a cyanomethylene group, a cyanoethylene group, a dicyanoethylene group, a cyanocyclohexene group, and a cyanophenylene group; alkoxy- and aryloxyhydrocarbon groups of linear, branched, cyclic, and combination thereof having a valency of one or two or more such as a methoxymethyl group, a methoxyethyl group, a methoxypropyl group, a methoxybutyl group, a methoxycyclohexyl group, a methoxyvinyl group, a methoxyphenyl group, a methoxynaphthyl group, an ethoxymethyl group, a propoxymethyl group, a butoxymethyl group, a pentyloxymethyl group, a hexyloxymethyl group, a cyclohexyloxymethyl group, a phenyloxymethyl group, a vinyloxymethyl group, an isopropenyloxymethyl group, a tert-butyloxymethyl group, a naphthyloxymethyl group, a methoxyethoxymethyl group, an ethoxyethoxymethyl group, an ethoxyethyl group, a propoxyethyl group, a butoxyethyl group, a pentyloxyethyl group, a hexyloxyethyl group, a cyclohexyloxyethyl group, a phenyloxyethyl group, a vinyloxyethyl group, an isopropenyloxyethyl group, a tert-butyloxyethyl group, a naphthyloxyethyl group, a methoxyethoxyethyl group, an ethoxyethoxyethyl group, a methyleneoxymethyl group, an ethyleneoxyethyl group, and a phenyleneoxyphenyl group; alkanoyl groups and alkanoyl group-containing organic substituent groups having a valency of one or two or more such as an acetyl group, a propanoyl group, a butanoyl group, a pentanoyl group, a hexanoyl group, a heptanoyl group, an octanoyl group, an isobutanoyl group, an acryloyl group, a methacryloyl group, a methyloxalyl group, a methylmalonyl group, a methylsuccinyl group, an oxalyl group, a malonyl group, and a succinyl group; ester bond-containing organic substituent groups of linear, branched, cyclic, and combination thereof having a valency of one or two or more such as an acetyloxymethyl group, an acetyloxyethyl group, a benzoyloxyethyl group, a butyrolactyl group, a caprolactyl group, a methoxycarbonyl group, an ethoxycarbonyl group, and a methoxyethyleneoxycarbonyl group; nitrogen-containing organic substituent groups of linear, branched, cyclic, and combination thereof having a valency of one or two or more such as an amino group, a dimethylamino group, an ethylmethylamino group, a methylphenylamino group, a diphenylamino group, an acetylamino group, a tert-butoxycarbonylamino group, a benzyloxycarbonylamino group, a 9-fluorenylmethyloxycarbonylamino group, a dimethylaminoethyl group, a pyrrolidinylethyl group, and a pyrrolidonylethyl group; alkyl- and aryl-thio groups such as a methylthio group, an ethylthio group, and a tolylthio group; halo-thio groups such as a fluorothio group and a chlorothio group; thioalkoxy structure-having groups e.g., haloalkyl- and aryl-thio groups such as a trifluoromethylthio group, a pentafluoroethylthio group, and a pentafluorophenylthio group; sulfinyl group-containing organic substituent groups, e.g., alkylsulfinyl groups such as a methylsulfinyl group, arylsulfinyl groups such as a tolylsulfinyl group, halosulfinyl groups such as a fluorosulfinyl group and a chlorosulfinyl group, haloalkyl- and haloaryl-sulfinyl groups such as a trifluoromethylsulfinyl group and a pentafluorophenylsulfinyl group; sulfonyl group-containing organic substituent groups such as a methylsulfonyl group, a tolylsulfonyl group, a fluorosulfonyl group, a trifluoromethylsulfonyl group, and a pentafluorophenylsulfonyl group; hetero atom-containing organic substituent groups such as a trimethylsilyl group, a triethylsilyl group, and dimethoxyaluminum; —$CH_2CH_2OB(CN)_3$, —$C_3H_6OB(CN)_3$; and the like. The organic substituent group $R^{14}$ may contain one or more kinds of organic substituent groups selected from the above-mentioned organic substituent groups, wherein two or more of the organic substitutents form a bonded structure.

Among the above mentioned organic substituent group $R^{14}$, preferable examples of the organic substituent group $R^{14}$ include a halogen such as fluorine and chlorine; hydrocarbon groups having 1 to 10 carbon atoms such as a methyl group, an ethyl group, a n-propyl group, an iso-propyl group, a n-butyl group, an iso-butyl group, a sec-butyl group, a tert-butyl group, a pentyl group, a hexyl group, a heptyl group, an octyl group, a 2-ethylhexyl group, an ethylene group and a propylene group; halohydrocarbon groups having 1 to 10 carbon atom such as a fluoromethyl group, a difluoromethyl group, a trifluoromethyl group, a chloromethyl group, a bromomethyl group, an iodomethyl group, a difluorochloromethyl group, a fluorodichloromethyl group, a fluoroethyl group, a difluoroethyl group, a trifluoroethyl group, a tetrafluoroethyl group, a perfluoroethyl group, a fluorochloroethyl group, a chloroethyl group, a fluoropropyl group, a perfluoropropyl group, a fluorochloropropyl group, a perfluorobutyl group, a perfluorooctyl group, a pentafluorocyclohexyl group, a perfluorocyclohexyl group, a fluoromethylene group, a fluoroethylene group, and a fluorocyclohexene group; aryl groups or halogenated aryl groups having 6 to 10 carbon atom such as a phenyl group, a tolyl group, a benzyl group, a phenylethyl group, a methylphenylethyl group, a cyclohexylphenyl group, a vinylphenyl group, a naphthyl group, a methylnaphthyl group, a phenylene (o-, m-, p-) group, a pentafluorophenyl group and perchlorophenyl group; cyano-hydrocarbon groups such as a cyanomethyl group, a dicyanomethyl group, a tricyanomethyl group, and a cyanoethyl group; alkanoyl groups having 1 to 10 carbon atom such as an acetyl group, a propanoyl group, a butanoyl group, a pentanoyl group, a hexanoyl group, a heptanoyl group, an octanoyl group, an isobutanoyl group, an acryloyl group, a methacryloyl group, a methyloxalyl group, a methylmalonyl group, a methylsuccinyl group, an oxalyl group, a malonyl group, and a succinyl group; ester bond-containing organic substituent groups having 1 to 10 carbon atoms such as a methoxycarbonyl group, an ethoxycarbonyl group and a methoxyethyleneoxycarbonyl group; and alkylsilyl groups having 1 to 10 carbon atoms such as a trimethylsilyl group, a triethylsilyl group.

More preferable examples of the organic substituent group $R^{14}$ include fluorine, a methyl group, an ethyl group, a propyl group, iso-propyl group, a butyl group, a phenyl group, an ethylene group, propylene group, a trifluoromethyl group, a perfluoroethyl group, a cyanoethyl group, an acetyl group, a propanoyl group, an oxalyl group, a methoxyethyleneoxycarbonyl group, a trimethylsilyl group.

Accordingly, a group represented by $—C(O)R^{14}$ is preferably a group in which $R^{14}$ is a halogen, a saturated or unsaturated hydrocarbon group or halohydrocarbon group, an alkoxy- or aryloxy-hydrocarbon group, and a nitrogen-containing substituent group, and more preferably a group in which $R^{14}$ is a methyl group, an ethyl group, a phenyl group, a trifluoromethyl group, and a pentafluorophenyl group.

A group represented by $—S(O)_lR^{14}$ is preferably a group in which $R^{14}$ is a halogen, or a saturated or unsaturated hydrocarbon group, or a halohydrocarbon group, and specifically, more preferable examples thereof include sulfinyl groups (l=1) such as a fluorosulfinyl group, a chlorosulfinyl group, a trifluoromethylsulfinyl group, a pentafluoroethylsulfinyl group, a phenylsulfinyl group, a pentafluorophenylsulfinyl group, and a tolylsulfinyl group; and sulfonyl groups (l=2) such as a fluorosulfonyl group, a chlorosulfonyl group, a trifluoromethylsulfonyl group, a pentafluoroethylsulfonyl group, a tolylsulfonyl group, a phenylsulfonyl group, and a pentafluorophenylsulfonyl group.

$—C(O)R^{14}$ and $—S(O)_lR^{14}$ are electron-withdrawing substituents like a cyano group, and delocalize the electric negative charge of the central element. As a result, the cyanoborate anion is stabilized and thus it is made possible to form a salt hardly decomposed even under high voltage and high temperature.

Examples of a group represented by $—Z(R^{14})_2$ include amino groups in which Z is N such as a dimethylamino group and an ethylmethylamino group; phosphino groups in which Z is P such as a diphenylphosphino group and a dicyclohexylphosphino group.

Examples of a group represented by $—XR^{14}$ include groups in which X is O and $R^{14}$ is a hydrocarbon group which has 1 to 20 carbon atoms and which may optionally contain a halogen (e.g., a methyl group, an ethyl group, a phenyl group, a trifluoromethyl group, and a pentafluoroethyl group); groups in which X is O and $R^{14}$ is an alkylsilyl group (e.g., a trimethylsilyl group and a triethylsilyl group); groups in which X is O and $R^{14}$ is an alkanoyl group selected from linear, branched, cyclic, and combination thereof having a valency of one or two or more (e.g., an acetyl group, a propanoyl group, a butanoyl group, a pentanoyl group, a hexanoyl group, a heptanoyl group, an octanoyl group, an isopropanoyl group, an isobutanoyl group, an acryloyl group, a methacryloyl group, a methyloxalyl group, a methylmalonyl group, a methylsuccinyl group, an oxalyl group, a malonyl group, and a succinyl group); groups in which X is O and $R^{14}$ is a sulfinyl group (e.g., a fluorosulfinyl group, a chlorosulfinyl group, a trifluoromethylsulfinyl group, and a tolylsulfinyl group) or a sulfonyl group (a fluorosulfonyl group, a chlorosulfonyl group, a trifluoromethylsulfonyl group, and a tolylsulfonyl group); and groups in which X is S and $R^{14}$ is a hydrocarbon group which has 1 to 20 carbon atoms and which may optionally contain a halogen (e.g., a methylthio group and a trifluoromethylthio group). In the case where two or more $—XR^{14}$s are bonded to B, these two or more $R^{14}$s may be bonded together to form a ring. X is O or S, and in terms of availability of a raw material and cost, X is preferably O.

If $Z(R^{14})_2$ and $XR^{14}$ are introduced into the cyanoborate salt, the salt becomes excellent not only in high voltage endurance but also in solubility in a solvent. In this case, if $R^{14}$ contains an electron-withdrawing substituent, the stability of the cyanoborate anion is improved and therefore, it is preferable. More specifically, it is preferable that $R^{14}$ contains an alkanoyl group, a sulfinyl group, and a sulfonyl group. Similarly, it is also preferable that $R^{14}$ contains fluorine or a fluorine-containing group such as a fluoroalkyl group.

Specific examples of the cyanoborate anion include alkoxytricyanoborate anions such as $[B(CN)_3(OMe)]^-$, $[B(CN)_3(OEt)]^-$, $[B(CN)_3(O-i-Pr)]^-$ ("-i-" represents "iso"; the same shall apply hereinafter), $[B(CN)_3(OBu)]^-$, $[B(CN)_3(OPh)]^-$, $[B(CN)_3(OCH_2CH_2O)B(CN)_3]^{2-}$, and $[B(CN)_3(OC_3H_6O)B(CN)_3]^{2-}$; dialkoxydicyanoborate anions such as $[B(CN)_2(OMe)_2]^-$, $[B(CN)_2(OEt)_2]^-$, $[B(CN)_2(Oi-Pr)_2]^-$, $[B(CN)_2(OBu)_2]^-$, and $[B(CN)_2(OPh)_2]^-$; trialkoxycyanoborate anions such as $[B(CN)(OMe)_3]^-$, $[B(CN)(OEt)_3]^-$, $[B(CN)(Oi-Pr)_3]^-$, $[B(CN)(OBu)_3]^-$, and $[B(CN)(OPh)_3]^-$; thioalkoxytricyanoborate anions such as $[B(CN)_3(SMe)]^-$; halogenated or haloalkylcyanoborate anions such as $[B(CN)_3(CF_3)]$ and $[B(CN)_3(C_2F_5)]^-$; alkyl- or aryl-cyanoborate anions such as $[B(CN)_3(Ph)]^-$, $[B(CN)_3(Me)]^-$, and $[B(CN)_3(CH_2)_6B(CN)_3]^{2-}$; haloalkoxycyanoborate anions such as $[B(CN)_3(OCF_3)]^-$ and $[B(CN)_3(OC_2F_5)]^-$; cyanoalkoxycyanoborate anions such as $[B(CN)_3(OC_2H_4CN)]^-$; ester-containing cyanoborate anions such as $[B(CN)_3(OCOCH_3)]^-$, $[B(CN)_3(OCOCF_3)]^-$, $[B(CN)_3(OCOC_2H_5)]^-$, $[B(CN)_3(OCOOCH_3)]^-$, and $[B(CN)_3(OCOOC_2H_5)]^-$; sulfonyl group-containing cyanoborate anions such as $[B(CN)_3(OSO_2F)]^-$, $[B(CN)_3(OSO_2CF_3)]^-$, $[B(CN)_3(OSO_2CH_3)]^-$, $[B(CN)_3(OSO_2C_6H_4CH_3)]^-$, $[B(CN)_3(SO_2F)]^-$, $[B(CN)_3(SO_2CF_3)]^-$, $[B(CN)_3(SO_2CH_3)]^-$, and $[B(CN)_3(SO_2C_6H_4CH_3)]^-$; acylcyanoborate anions such as $[B(CN)_3(COCH_3)]^-$ and $[B(CN)_3(COCF_3)]^-$; alkylsiloxycyanoborate anions such as $[B(CN)_3(OSiCH_3)]^-$; and cyanoborate anions represented by general formulas (8-1) and (8-2) described below.

[Chemical Formula 1]

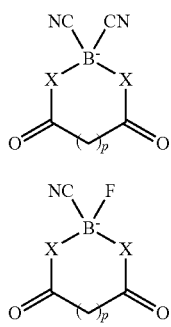

(In general formulas (8-1) and (8-2), p represents an integer of 0 to 10 and p is preferably 0 to 4 and more preferably 0 to 1.)

Y (excluding the case where Y is a halogen) may contain a functional group having a hetero atom such as Si, B, O, N, and Al. Examples of the functional group include a trimethylsilyl group, a triethylsilyl group, a dimethoxyaluminum group, $—CH_2CH_2B(CN)_3$, and $—C_3H_6B(CN)_3$.

Organic or Inorganic Cation: $M^{n+}$

The organic cation $M^{n+}$ constituting the ionic compound of the present invention is preferably an onium cation represented by general formula (2): $L^+$-$R_S$ (wherein, L represents C, Si, N, P, S or O; Rs are organic groups which are the same or different and may be bonded to one another; s represents the number of R bonded to L and is 3 or 4; and additionally, s is a value determined based on the valency of the element L and the number of double bonds directly bonded to L).

The above-mentioned "organic group" represented by R means a hydrogen atom, fluorine atom or a group containing at least one carbon atom. The above-mentioned "a group containing at least one carbon atom" may be any group as long as the group contains at least one carbon atom and may have other atoms such as a halogen atom and a hetero-atom and also a substituent group. Examples of the substituent group may include an amino group, an imino group, an amido group, a group having an ether bond, a group having a thio-ether bond, an ester group, a hydroxyl group, an alkoxy group, a carboxyl group, a carbamoyl group, a cyano group, a disulfide group, a nitro group, a nitroso group, a sulfonyl group, and the like.

Examples of the onium cations represented by the above-mentioned general formula (2) may be those represented by the following general formulas:

[Chemical Formula 2]

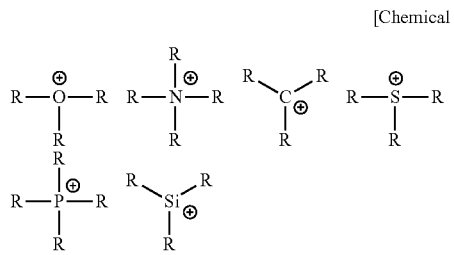

(wherein R represents the same as in the general formula (2))

Among the above mentioned six onium cations, preferred examples of the oniumu cation includes one containing N, P, S or O for L, more preferably one containing N for L. The onium cations may be used alone, or two or more may be used in combination. Specifically, as the onium cations containing N, P, S or O for L, preferable examples among them are onium cations represented by the following general formulas (3) to (5).

Examples may be at least one kind cation among 15 types of heterocyclic onium cations represented by the following general formulas (3);

[Chemical Formula 3]

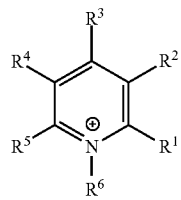
(3-1)

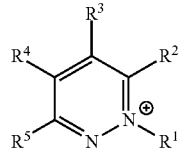
(3-2)

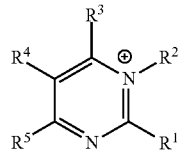
(3-3)

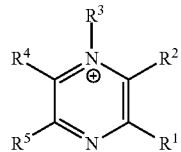
(3-4)

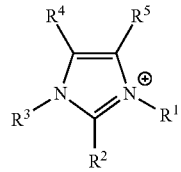
(3-5)

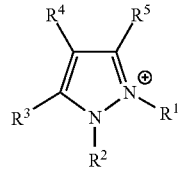
(3-6)

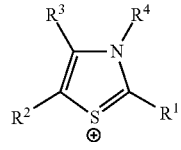
(3-7)

-continued

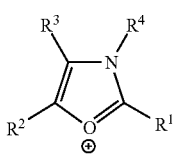
(3-8)

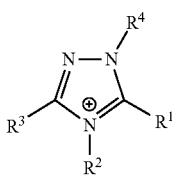
(3-9)

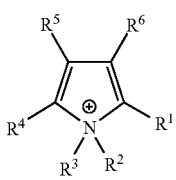
(3-10)

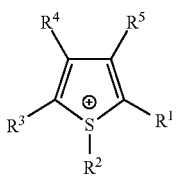
(3-11)

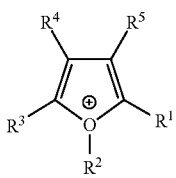
(3-12)

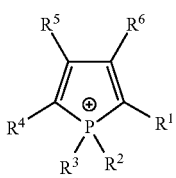
(3-13)

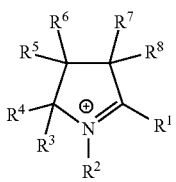
(3-14)

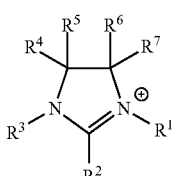
(3-15)

The organic groups $R^1$ to $R^8$ are same as the organic group R exemplified in the general formula (2). More particularly, $R^1$ to $R^8$ represent a hydrogen atom, a fluorine atom, or an organic group; and the organic group is preferably a linear, branched or cyclic hydrocarbon group or a fluorocarbon group having 1 to 18 carbon atoms (excluding a group which forms a ring by bonding groups represented by $R^1$ to $R^8$); more preferably a hydrocarbon group or a fluorocarbon group having 1 to 8 carbon atoms. Further, the organic group may contain a substituent group as exemplified in the above-mentioned general formula (2), a hetero atom such as N, O or S, or a halogen atom.

Examples may be at least one kind cation among 9 types of saturated cyclic onium cations represented by the following general formulas (4):

[Chemical Formula 4]

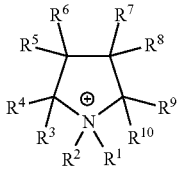
(4-1)

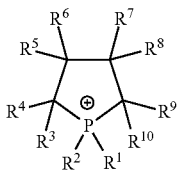
(4-2)

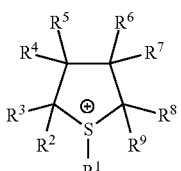
(4-3)

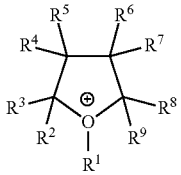
(4-4)

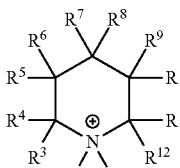
(4-5)

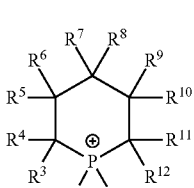
(4-6)

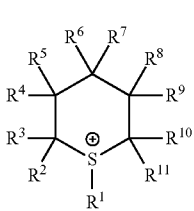
(4-7)

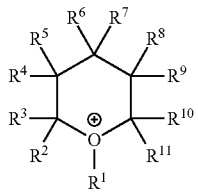
(4-8)

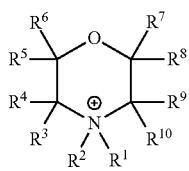
(4-9)

(wherein $R^1$ to $R^{12}$ represent the same as $R^1$ to $R^8$ in the general formula (3))

Examples may be a chain onium cation represented by the following general formulas (5):

[Chemical Formula 5]

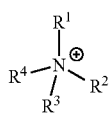
(5)

(wherein $R^1$ to $R^4$ are the same as $R^1$ to $R^8$ in the general formula (3))

Examples of the above-mentioned chain onium cations (5) includes quaternary ammoniums such as tetramethylammonium, tetraethylammonium, tetrapropylammonium, tetrabutylammonium, tetraheptylammonium, tetrahexylammonium, tetraoctylammonium, triethylmethylammonium, methoxyethyldiethylmethylammonium, trimethylphenylammonium, benzyltrimethylammonium, benzyltriethylammonium, benzyltributylammonium, dimethyldistearylammonium, diallyldimethylammonium, 2-methoxyethoxymethyltrimethylammonium, and tetrakis(pentafluoroethyl)ammonium, N-methoxytrimethylammonium, N-ethoxytrimethylammonium, and N-propoxytrimethylammonium; tertiary ammoniums such as trimethylammonium, triethylammonium, tributhylammonium, diethylmethylammonium, dimethylethylammonium, and dibutylmethylammonium; secondary ammoniums such as dimethylammonium, diethylammonium, and dibutylammonium; primary ammoniums such as methylammonium, ethylammonium, butylammonium, hexylammonium, and octylammonium; and ammonium compounds such as $NH_4$.

Among the onium cations of the above-mentioned general formula (3) to (5), nitrogen atom-containing onium cations are preferable; and at least one kind among 6 kinds of onium cations defined by the following general formulas is particularly preferable:

[Chemical Formula 6]

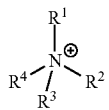
(5)

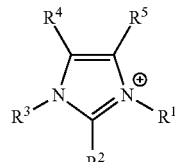
(3-5)

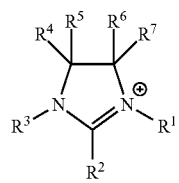
(3-15)

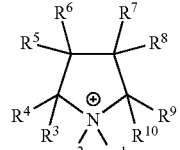
(4-1)

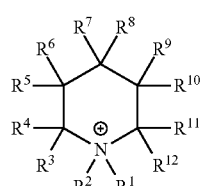
(4-5)

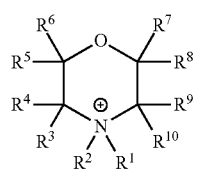
(4-9)

(wherein $R^1$ to $R^{12}$ are the same as $R^1$ to $R^8$ in the general formula (3)).

Particularly preferable examples among the above exemplified 6 kinds of the ammoniums are chain quaternary ammoniums such as tetraethylammonium, tetrabutylammonium, and triethylmethylammonium; chain tertiary ammonium such as triethylammonium, tributhylammonium, dibutylmethylammonium, and dimethylethylammonium; imidazoliums such as 1-ethyl-3-methylimidazolium and 1,2,3-trimethylimidazolium; and pyrrolidiniums such as N,N-dimethylpyrrolidinium and N-ethyl-N-methylpyrrolidinium since they are easily made available. Furthermore preferable examples include quaternary ammonium and imidazolium. From the viewpoint of reduction resistance, quaternary ammonium such as tetraethylammonium, tetrabutylammonium, or triethylmethylammonium, which is classified into the chain onium cation, is furthermore preferable.

Examples of the inorganic cation $M^{n+}$ include monovalent inorganic cations $M^{1+}$ such as $Li^+$, $Na^+$, $K^+$, $Cs^+$, and $Pb^+$; divalent inorganic cations $M^{2+}$ such as $Mg^{2+}$, $Ca^{2+}$, $Zn^{2+}$, $Pd^{2+}$, $Sn^{2+}$, $Hg^{2+}$, $Rh^{2+}$, $Cu^{2+}$, $Be^{2+}$, $Sr^{2+}$, and $Ba^{2+}$; and trivalent inorganic cations $M^{3+}$ such as $Ga^{3+}$. Among them, preferred are $Li^+$, $Na^+$, $Mg^{2+}$, and $Ca^{2+}$ since they have small ion radius and are easily used for an electrical storage device or the like, and the inorganic cation $M^{n+}$ is more preferably $Li^+$.

Ionic compound; $M^{n+}([B(CN)_{4-m}Y_m]^-)_n$

The ionic compound (1) of the present invention includes all compounds obtained by combining the cations and the anions. Specific examples of the ionic compound (1) include organic cation salts such as triethylmethylammonium tricyanomethoxyborate, triethylammonium tricyanomethoxyborate, tributylammonium tricyanomethoxyborate, triethylammonium tricyanoisopropoxyborate, 1-ethyl-3-methylimidazolium tricyanomethoxyborate, triethylmethylammonium tricyanophenylborate, triethylmethylammonium dicyanooxalylborate, triethylmethylammonium tricyano(trifluoromethyl)borate, triethylmethylammonium tricyano(cyanoethoxy)borate, and 1-ethyl-3-methylimidazolium tricyanophenylborate; and inorganic cation salts such as lithium tricyanomethoxyborate, sodium tricyanomethoxyborate, magnesium bis(tricyanomethoxyborate), lithium tricyanoisopropoxyborate, lithium tricyanoethoxyborate, lithium tricyanobutoxyborate, lithium tricyanophenoxyborate, lithium tricyanomethylthioborate, lithium tricyano(trifluoromethyl)borate, lithium tricyanophenylborate, lithium tricyanomethylborate, lithium tricyano(trifluoromethoxy)borate, lithium tricyano(hexafluoroisopropoxy)borate, lithium tricyano(pentafluorophenoxy)borate, lithium tricyanoacetoxyborate, lithium tricyano(trifluoroacetoxy)borate, lithium tricyano((methoxycarbonyl)oxo)borate, lithium tricyano(fluorosulfonato)borate, lithium tricyano(trifluoromethanesulfonato)borate, lithium tricyano(methanesulfonato)borate, lithium tricyano(p-toluenesulfonato)borate, lithium tricyano(fluorosulfonyl)borate, lithium tricyanoacetylborate, lithium tricyano(trifluoroacetyl)borate, lithium tricyano(trimethylsiloxy)borate, lithium dicyanooxalylborate, lithium cyanofluorooxalylborate, lithium dicyanodimethoxyborate, and lithium cyanotrimethoxyborate.

The ionic compound (1) of the present invention preferably has a water content as an impurity of 3000 ppm or lower. Especially, in a compound represented by general formula (6); $M^{n+}([B(CN)_{4-m}(XR^{14})_m]^-)_n$ among the ionic compounds (1), those having a content of water (moisture), as an impurity, of 3000 ppm or lower are preferable (the reference characters in general formula (6) are the same as those in the ionic compound (1)).

The present inventors have made investigations on characteristics of an ionic compound represented by general formula (1) described above, and found that an impurity such as water contained in the ionic compound causes an effect on the deterioration of the characteristics of the ionic compound, and the inventors have made further investigations to provide an ionic compound which is hard to cause deterioration of the characteristics, and consequently found that if the content of water among impurities in the ionic compound represented by general formula (1) (particularly the ionic compound (6)) is about 3000 ppm or lower (based on mass, the same shall apply hereinafter), the characteristics of the ionic compound are hardly deteriorated.

The water contained in the ionic compound is assumed that water being used as a reaction solvent or used at the time of purification in the production process of the ionic compound of the present invention, or being contaminated from environments such as air due to humidity absorption remains in a final product. It is supposed that the water contained in the ionic compound is water remained even in a final product, the remained water being used as a reaction solvent or used at the time of purification in the production process of the ionic compound of the present invention, or being contaminated from environments such as air due to humidity absorption. The ionic compound of the present invention, as will be described below, may be used for an electrolytic solution for various electrical storage devices; however, if the ionic compound contains water, this water is electrolyzed during operation of electrical storage devices and hydrogen ions are generated and therefore, pH of the electrolytic solution is lowered (acidic). As a result, it is supposed that owing to the acidic component generated in the electrolytic solution, electrode materials are dissolved and the performance of the electrical storage device is lowered. Further, at the time of electrolysis of water, gas is generated and owing to this, the inner pressure of various electrical storage devices with a sealed structure is increased and it may result in deformation or breakage. For this reason, the devices may not only become unusable but also cause a problem in terms of safety. Consequently, the water content in the ionic compound of the present invention is preferably about 1000 ppm or lower, more preferably about 550 ppm, furthermore preferably about 500 ppm, and even furthermore preferably about 200 ppm or lower. In addition, since water is an impurity, it is better as its content is lower, and it is most preferably 0 ppm; however it may be technically difficult to decrease the water content to 0 ppm, or it may not be preferable because of economical reasons. Consequently, in the present invention, it is preferable that if the lower limit of the water content is about 1 ppm, the characteristics of the ionic compound are scarcely affected, and the lower limit may be about 5 ppm. It is because in this case, significant characteristic deterioration is hardly observed and any problem on practical use is scarcely caused. The content of water in the present invention is a value measured by the procedure described in Examples below by using a Karl Fischer water content measurement apparatus (e.g., Karl Fischer Moisture Titrator manufactured by Hiranuma Sangyo Corporation).

Further, the ionic compound of the present invention preferably has a low cyanide ion ($CN^-$) content. The cyanide ion content is preferably about 10000 ppm or lower. As will be described below, the ionic compound of the present invention is preferably used for an electrolytic solution for various electrical storage devices; however, if the electrolytic solution contains cyanide ions, there may cause the problems that the cyanide ions react with electrodes to lower the ion conductivity or gas is generated to possibly cause deformation of the devices. The content of the cyanide ions is preferably about 5000 ppm or lower, more preferably about 1000 ppm, furthermore preferably about 300 ppm or lower, still more preferably about 100 ppm or lower, and even more preferably about 50 ppm or lower. It is preferable as the cyanide ion content in the ionic compound of the present invention is lower, and the case of 0 ppm is most preferable; however, if the content of the cyanide ions is about 0.02 ppm, the characteristics of the ionic compound are scarcely affected, and even in the case where the lower limit is about 0.1 ppm, significant characteristic deterioration is hardly observed and any problem on practical use is scarcely caused.

Further, it is preferable that in the ionic compound of the present invention, the content of one or more impurity ions selected from the group consisting of alkali metals and alkaline earth metals, which do not constitute the ionic compound represented by general formula (1) described above, is about 20000 ppm or lower in total (about 2% by mass or lower). The content of alkali metal and/or alkaline earth metal ions as impurities is more preferably about 10000 ppm or lower, more preferably about 5000 ppm or lower. The content is still more preferably about 1000 ppm or lower, even more preferably about 500 ppm or lower, and even furthermore preferably about 100 ppm or lower. It is most preferable that the ionic compound of the present invention contains no impurity ion (0 ppm) described above; however if the lower limit of the content of one or more impurity ions selected from the group consisting of alkali metals and alkaline earth metals is about 0.1 ppm, the characteristics of the ionic compound are scarcely affected and even in the case where the lower limit is about 1 ppm, significant characteristic deterioration is hardly observed. Examples of the alkali metal as an impurity include Li, Na, K, Cs and the like; and examples of the alkali earth metals include Mg, Ca, Sr, Ba and the like. Among them, it is preferable to set particularly the contents of Na, K, and Ca to the above-mentioned range.

The expression "alkali metals and alkaline earth metals, which do not constitute the ionic compound represented by general formula (1)" means alkali metals and alkaline earth metals which are not cation $M'''^+$ constituting general formula (1) among the alkali metals and the alkaline earth metals. As will be described below, the ionic compound of the present invention may contain an alkali metal or an alkaline earth metal as cation $M'''^+$; however, in the present invention, the alkali metal or the alkaline earth metal constituting the ionic compound is not regarded as an impurity. That is, in the present invention, when an alkali metal and/or an alkaline earth metal is contained as a component other than the cation constituting the aimed ionic compound, this component is regarded as an impurity. For example, in the case where the ionic compound represented by general formula (1) contains $Li^+$ as cation $M'''^+$, an alkali metal and/or an alkaline earth metal other than $Li^+$ is regarded as an impurity. That is, in this case, it is preferable that the content (total) of one or more of $Na^+$, $K^+$, $Rb^+$, $Cs^+$, $Fr^+$, $Be^{2+}$, $Mg^{2+}$, $Ca^{2+}$, $Sr^{2+}$, $Ba^{2+}$, and $Ra^{2+}$ is within the above-mentioned range. In the case of an ionic compound in which $M'''^+$ is $K^+$, an alkali metal and/or an alkaline earth metal other than $K^+$ is regarded as an impurity. In the case of an ionic compound in which $M'''^+$ is $Mg^{2+}$, an alkali metal and/or an alkaline earth metal other than $Mg^{2+}$ is regarded as an impurity. The same shall apply to the case where $M'''^+$ is an alkali metal or an alkaline earth metal other than those described above.

The ionic compound (1) of the present invention preferably has a low content of impurities derived from starting raw materials or components contaminated during the reaction. Specifically, the content (total, based on mass) of Group V to XI elements of the periodic table is preferably about 1000 ppm or lower, more preferably about 100 ppm or lower, and furthermore preferably about 10 ppm or lower. It is most preferable that the content of Group V to XI elements of the periodic table is not contained in the ionic compound (1) of the present invention; however the lower limit thereof may be, for example, about 0.1 ppm, and further the lower limit thereof may be about 0.5 ppm. If the content of the impurities is within the above-mentioned range, the characteristics of the ionic compound are scarcely affected and significant deterioration of the characteristics is hardly observed. Among the Group V to XI elements of the periodic table, the elements which are preferably lowered are Fe, V, Cr, Mo, W, Mn, Re, Ru, Co, Rh, Ir, Ni, Pd, Cu, Ag, and Au, and more preferably Fe, V, Cr, Mo, Mn, Co, Ni, and Cu.

For measurement of the content of the above-mentioned impurities, any conventionally known measurement method can be used, and examples thereof include methods described in Examples such as atomic absorption spectrometry, ICP atomic emission spectrometry (inductively coupled plasma atomic emission spectrometry), and ion chromatography.

A method for setting the content of the impurities to the above-mentioned range is not particularly limited. For example, employment of the production process of the present invention as will be described below or purifying of an ionic compound obtained by the production process of the present invention or by a known method through a purification method such as an oxidizing agent treatment method, an activated carbon treatment method, a liquid separation extraction method with water or organic solvent, an electrochemical treatment method, a recrystallization method, a reprecipitation method, or chromatography can give an ionic compound with lower amount of the impurities.

2. Process for Producing Ionic Compound (1)

The present invention also includes a process for producing the ionic compound (1). The production process of the present invention includes production processes [1] and [2] for producing the ionic compound (1) directly from starting raw materials, and a production process [3] for producing the aimed ionic compound (1) using intermediates synthesized in advance as raw materials.

2-1. Production Process [1]

First, a production process [1] for the ionic compound (1) of the present invention will be described. In the production process [1] of the present invention, the ionic compound (1) is produced by reaction of a cyanide compound, a boron compound, and a halogen salt of an organic or inorganic cation.

Cyanide Compound

A cyanide compound is used as a CN source of the ionic compound (1) represented by general formula (1) described above. Specific examples of the cyanide compound include alkylsilylcyanides such as trimethylsilylcyanide, triethylsilylcyanide, triisopropylsilylcyanide, ethyldimethylsilylcyanide, isopropyldimethylsilylcyanide, and tert-butyldimethylsilylcyanide; alkylarylsilylcyanides such as dimethylphenylsilylcyanide and phenyldimethylsilylcyanide; and metal cyanides such as copper cyanide, zinc cyanide, potassium cyanide, sodium cyanide, and lithium cyanide. Among them, alkylsilylcyanides are preferable and trialkylsilylcyanides are more preferable. Trimethylsilylcyanide (hereinafter, may be abbreviated as TMSCN) is furthermore preferable.

A commercialized cyanide compound or a cyanide compound synthesized by known methods may be used as the cyanide compound.

Boron Compound

The ionic compound (1) represented by general formula (1) described above can be obtained by allowing starting raw materials containing the cyanide compound, the halogen salt of an organic or inorganic cation, and the boron compound to react. The boron compound is a boron source of the ionic compound of the present invention, and specific examples thereof include boric acid, a borate ester, and a borate thioester.

As the borate ester among the above-mentioned boron compounds, those represented by the general formula; $B(OR^{14})_3$ ($R^{14}$ represents an organic substituent group which has a main chain having 1 to 10 atoms and is the same as the organic substituent group $R^{14}$ in formula general (1) described above, the same shall apply hereinafter) are preferably used. Examples of the borate ester of the present invention include $B(OMe)_3$, $B(OEt)_3$, $B(O\text{-}i\text{-}Pr)_3$, $B(O\text{-}t\text{-}Bu)_3$ ("-t-" represents "tert", the same shall apply hereinafter), and $B(OPh)_3$. Among them, $B(OMe)_3$ and $B(OEt)_3$ are preferable since they have relatively high reactivity.

As the borate thioester, those represented by the general formula; $B(SR^{14})_3$ are preferably used. Examples of the borate thioester of the present invention include $B(SMe)_3$, $B(SEt)_3$, $B(S\text{-}i\text{-}Pr)_3$, $B(S\text{-}t\text{-}Bu)_3$, $B(SPh)_3$ and the like. Among them, $B(SMe)_3$ and $B(SEt)_3$ are preferable and $B(SMe)_3$ is more preferable. Among the above-exemplified boric compounds, a borate ester is preferably used in terms of versatility. In a process for producing a cyanoborate salt, $BCl_3$ are often used as indispensable starting raw materials; however, $BCl_3$ has problems of high toxicity and difficulty of handling because of high reactivity. As compared with $BCl_3$, a borate ester is advantageous in terms of low cost, low toxicity, and easiness of handling.

The addition ratio of the above-mentioned raw materials may be changed depending on the number of cyano groups which are substituted with boron in the ionic compound (1), an aimed product, and accordingly, monocyanoborate (mono-cyano substituted one), dicyanoborate (di-substituted one) and tricyanoborate (tri-substituted one) can be obtained.

In the production process [1] of the present invention, the addition amount of the cyanide compound to the boron compound is preferably set to be 0.5:1 to 10:1 (cyanide compound:boron compound, mole ratio). It is more preferably 0.8:1 to 5:1 and furthermore preferably 1:1 to 4:1. If the addition amount of the cyanide compound is too small, the production amount of the aimed ionic compound may be lowered and a byproduct may be produced. On the other hand, if the addition amount of the cyanide compound is too large, the amount of impurities derived from CN is increased and purification of the aimed product tends to be difficult.

Halogen Salt of Organic or Inorganic Cation

The reaction of the cyanide compound and the boron compound is preferably carried out in the presence of the halogen salt of an organic or inorganic cation.

A halogen constituting the halogen salt of an organic or inorganic cation is preferably F, Cl, Br, and I, and more preferably Cl or Br. On the other hand, examples of the organic or inorganic cation constituting the halogen salt of an organic or inorganic cation may be the organic or inorganic cations mentioned above.

Preferable examples of the halogen salt of an organic or inorganic cation include triethylammonium bromide, tributylammonium bromide, triethylmethylammonium bromide, 1-ethyl-3-methylimidazolium bromide, lithium bromide, triethylammonium chloride, tributylammonium chloride, triethylmethylammonium chloride, 1-ethyl-3-methylimidazolium chloride, triethylmethylammonium chloride, and lithium chloride. The halogen salt of an organic or inorganic cation are more preferably triethylammonium bromide, triethylmethylammonium bromide, lithium bromide, triethylammonium chloride, triethylmethylammonium chloride, and lithium chloride; and furthermore preferably triethylammonium bromide, triethylmethylammonium bromide, and lithium bromide.

From the viewpoint of decreasing the amount of the above-mentioned various impurities, those which are free from the impurity ions are preferably employed as the cyanide compound, the boron compound and the halogen salt of an organic or inorganic cation, which are raw materials.

The use amount of the halogen salt of an organic or inorganic cation to the boron compound is preferably 1:5 to 5:1 (boron compound:halogen salt of organic or inorganic cation, mole ratio). It is more preferably 1:2 to 2:1, and furthermore preferably 1:0.8 to 1:1.2. If the addition amount of the halogen salt of an organic or inorganic cation is too small, removal of a byproduct may be insufficient or the cation amount may be deficient so that the aimed product cannot be produced efficiently. On the other hand, if the addition amount of the halogen salt of an organic or inorganic cation is too large, the halogen salt of an organic or inorganic cation tends to remain as an impurity.

In the production process [1], it is preferable to use a reaction solvent in order to homogeneously promote the reaction. The reaction solvent is not particularly limited if it can dissolve the above-mentioned raw materials therein, and water or an organic solvent is used. Examples of the organic solvent include hydrocarbon solvents such as toluene, xylene, benzene, and hexane; chlorine-containing solvents such as chloroform, dichloromethane, dichloroethane, chlorobenzene, and dichlorobenzene; ether solvents such as diethyl ether, cyclohexyl methyl ether, dibutyl ether, dimethoxyethane, dioxane, and tetrahydrofurane; ester solvents such as ethyl acetate and butyl acetate; ketone solvents such as 2-butanone and methyl isobutyl ketone; alcohol solvents such as methanol, ethanol, 2-propanol, and butanol; nitrile solvents such as acetonitrile, isobutyronitrile, valeronitrile, and benzonitrile; tetrahydrofurane, dioxolane, γ-butyrolactone, ε-caprolactone, ethylene carbonate, propylene carbonate, dimethylcarbonate, methylethylcarbonate, diethylcarbonate, dimethyl sulfoxide, dimethylformamide, N-methyl-2-pyrrolidone, and the like. These reaction solvents may be used alone or two or more of them may be used in combination.

In the production process [1], the order of adding and mixing the raw materials is not particularly limited. Since the halogen salts of an organic or inorganic cation include those having low solubility in an organic solvent other than water, it is preferable that an ammonium salt and a reaction solvent are mixed previously and thereafter remaining raw materials, a boron compound and a cyanide compound, are added to the resulting mixed solution. An aspect is more preferable in which a boron compound is added to a mixed solution of an ammonium salt and a reaction solvent and thereafter a cyanide compound is added.

The conditions at the time of allowing the starting raw materials to react are not particularly limited, and may be adjusted properly depending on the advancing state of the reaction, and for example, the reaction temperature is preferably set to be 20° C. to 180° C. It is more preferably 40° C. to 120° C. and furthermore preferably 50° C. to 80° C. The reaction time is preferably set to be 1 hour to 50 hours, more preferably 5 hours to 40 hours, and furthermore preferably 10 hours to 30 hours.

After the reaction, the produced ionic compound (cyanoborate salt) may be purified in order to increase its purity. A purification method is not particularly limited, and examples thereof include purification methods performed by washing with water, an organic solvent, or a mixture solvent thereof, an adsorption purification method, a reprecipitation method, a liquid separation extraction method, a recrystallization method, a crystallization method, and chromatography.

2-2. Production Process [2]

Among the ionic compounds (1) of the present invention, a compound represented by the general formula (7); $M^{n+}([B(CN)_{4-m}Y'_qX^{15}_r]^-)_n$ (hereinafter, referred to as ionic compound (7): in general formula (7), Y' represents a hydrocarbon group which has a main chain having 1 to 10 carbon atoms and which may optionally contain a halogen, —C(O)R$^{14}$, —S(O)$_l$R$^{14}$, —Z(R$^{14}$)$_2$, or —XR$^{14}$; X$^{15}$ may be the same or different and is F, Cl, Br, or I; q represents an integer of 1 to 3; r represents an integer of 0 to 2; q+r=m; and other reference characters are the same as those in general formula (1)) can be also produced by allowing a specified boron compound and an alkylsilyl compound to react with each other (production process [2]). In the above-mentioned reaction, if necessary, a halogen salt of an organic or inorganic cation may be used.

Examples of the boron compound that can be used preferably in the production process [2] include boron compounds represented by the general formula of B(Y')$_q$(X$^{15}$)$_{3-q}$ or M$^{n+}$B(Y')$_q$(X$^{15}$)$_{4-q}$. Specific examples thereof include organic halo-boron compounds in which a halogen and an organic group such as an alkyl group, an aryl group, an amino group, or an alkanoyl group are bonded to boron, e.g., PhB(Cl)$_2$, C$_6$F$_5$B(Cl)$_2$, MeB(Cl)$_2$, Me$_2$B(F), n-C$_6$H$_{11}$B (F)$_2$, Me$_2$NB(F)$_2$, (Me$_2$N)$_2$BF, LiB(F)$_2$(OCOCOO), LiB(F)$_2$(OCOCH$_3$)$_2$, and LiB(F)$_2$(OCOCF$_3$)$_2$. Among the organic halo-boron compounds, organic halo-boron compounds in which an aryl group, an alkyl group is bonded to boron are preferable, and especially, PhB(Cl)$_2$ and MeB(Cl)$_2$ are preferably usable since they have relatively high reactivity.

On the other hand, as the alkylsilyl compound, the alkylsilylcyanides or the alkylarylsilylcyanides exemplified in the production process [1] are preferably used. Especially, alkylsilylcyanides are preferable and trialkylsilylcyanides are more preferable. Trimethylsilylcyanide is furthermore preferable.

As the halogen salt of an organic or inorganic cation, those described in the production process [1] are similarly usable.

As a reaction solvent, those described in the production process [1] are similarly usable. Preferably, the solvent is a chlorine-containing solvent such as chloroform, dichloromethane, dichloroethane, chlorobenzene, or dichlorobenzene; or a nitrile solvent such as acetonitrile, isobutyronitrile, valeronitrile, or benzonitrile. The reaction conditions are not particularly limited, and for example, the reaction temperature may be set to be 20° C. to 80° C. (more preferably 30° C. to 120° C., and furthermore preferably 50° C. to 100° C.) and the reaction time may be set to be 1 hour to 50 hours (more preferably 2 hours to 10 hours).

The production process [2] is preferable as a production process for lithium cyano(fluoro)oxalylborate, lithium dicyanooxalylborate, triethylmethylammonium tricyanophenylborate or the like among the ionic compounds (7).

2-3. Production Process [3]

The aimed ionic compound (1) can be produced directly by the above-mentioned production process [1] or [2]; however, the aimed ionic compound (1) can be also produced by once synthesizing an ionic compound by the production process [1], [2], or the like, thereafter modifying or substituting the organic substituent group R$^{14}$ in general formula (1), and changing the substituent group to an organic substituent group different from the former (production process [3]).

That is, the production process [3] of the present invention is a process for producing an ionic compound represented by formula (1) and has a feature of allowing a compound represented by general formula (8) and a substitution reaction reagent to react with each other:

(in general formula (8), M$^{n+}$ is an organic or inorganic cation having a valency of 1, 2 or 3; X represents O or S; R$^{13}$ represents H or a hydrocarbon group which has a main chain having 1 to 10 carbon atoms; m represents an integer of 1 to 3; and n represents an integer of 1 to 3).

In the production process [3], a compound represented by general formula (8) described above (hereinafter, may be simply referred to as "intermediate (8)") is used as an intermediate at the time of producing the ionic compound (1). Use of this intermediate (8) makes it possible to obtain a cyanoborate salt having an arbitrary substituent group depending on the purpose.

2-3-1. Intermediate (8)

The intermediate (8): M$^{n+}$([B(CN)$_{4-m}$(XR$^{13}$)$_m$]$^-$)$_m$ of the present invention is the ionic compound (1) of the present invention, and at the same time can be used as a raw material of the ionic compound (1).

An organic or inorganic cation: M$^{n+}$ includes those which are the same as those for the ionic compound (1). Preferred organic or inorganic cations are also the same as those for the ionic compound (1).

Cyanoborate Anion: [B(CN)$_{4-m}$(XR$^{13}$)$_m$]$^-$.

In the anion: [B(CN)$_{4-m}$(XR$^{13}$)$_m$]$^-$ of the intermediate (8), X represents O or S. It is preferably O. R$^{13}$ represents H or a hydrocarbon group which has a main chain having 1 to 10 carbon atoms. The hydrocarbon group may optionally contain a substituent group, and in this case, the number of carbon atoms constituting the substituent group is not included in the number of the carbon atoms. Examples of the hydrocarbon group are preferably saturated and/or unsaturated, linear, branched, and cyclic hydrocarbon groups which have 1 to 10 carbon atoms, and more preferable examples of the hydrocarbon group include an alkyl group, a cycloalkyl group, an alkenyl group, an alkynyl group, an aryl group, and an aralkyl group having 1 to 10 carbon atoms. Specific examples of the hydrocarbon group R$^{13}$ include linear or branched alkyl groups such as a methyl group, an ethyl group, a propyl group, an isopropyl group, a n-butyl group, a tert-butyl group, a sec-butyl group, a pentyl group, a hexyl group, and an octyl group; cycloalkyl groups such as a cyclohexyl group and a cyclopentyl group; alkenyl groups such as a vinyl group; aryl groups such as a phenyl group, a methylphenyl group, a methoxyphenyl group, a dimethylphenyl group, and a naphthyl group; aralkyl groups such as a benzyl group; and the like. Preferred are a methyl group, an ethyl group, a propyl group, an isopropyl group, a butyl group, and a phenyl group.

Specific examples of the cyanoborate anion constituting the intermediate (8) include alkoxytricyanoborate anions such as [B(CN)$_3$(OMe)]$^-$, [B(CN)$_3$(OEt)]$^-$, [B(CN)$_3$(O-i-Pr)]$^-$, [B(CN)$_3$(OBu)]$^-$, and [B(CN)$_3$(OPh)]$^-$; dialkoxydicyanoborate anions such as [B(CN)$_2$(OMe)$_2$]$^-$, [B(CN)$_2$(OEt)$_2$]$^-$, [B(CN)$_2$(O-i-Pr)$_2$]$^-$, [B(CN)$_2$(OBu)$_2$]$^-$, and [B(CN)$_2$(OPh)$_2$]$^-$; trialkoxycyanoborate anions such as [B(CN)(OMe)$_3$]$^-$, [B(CN)(OEt)$_3$]$^-$, [B(CN)(O-i-Pr)$_3$]$^-$, [B(CN)(OBu)$_3$]$^-$, and [B(CN)(OPh)$_3$]$^-$; thioalkoxytricyanoborate anions such as [B(CN)$_3$(SMe)]$^-$; and the like.

The intermediate (8) of the present invention includes all compounds formed by combining the cation: M$^{n+}$ and the anion: [B(CN)$_{4-m}$(XR$^{13}$)$_m$]$^-$. Specific examples of the intermediate (8) include organic cation salts such as triethylmethylammonium tricyanomethoxyborate, triethylammonium tricyanomethoxyborate, tributylammonium tricyanomethoxyborate, triethylammonium tricyanoisopropoxyborate, and 1-ethyl-3-methylimidazolium tricyanomethoxyborate; and inorganic cation salts such as lithium tricyanomethoxyborate and sodium tricyanomethoxyborate.

Among them, preferred are triethylmethylammonium tricyanomethoxyborate and lithium tricyanomethoxyborate.

The production process of the intermediate (8) of the present invention is not particularly limited, and the intermediate can be produced based on the production processes [1] and [2], and a conventionally known process described in Patent Document 5 or the like.

The production process [3] of the present invention includes [3-1] a process for producing an ionic compound (1) in which $XR^{13}$ in the anion constituting the intermediate (8) is substituted by allowing the intermediate (8) and a substitution reaction reagent to react with each other (hereinafter, referred to as production process [3-1]) and [3-2] a process for producing an ionic compound (1) in which $R^{13}$ in the anion constituting the intermediate (8) is substituted by allowing the intermediate (8) and a substitution reaction reagent to react with each other (hereinafter, referred to as production process [3-2]). Hereinafter, these processes will be described in order.

2-3-2. Production Process [3-1]

Examples of the substitution reaction reagent used in the production process [3-1] of the present invention include alkylsilylcyanides such as trimethylsilylcyanide, triethylsilylcyanide, triisopropylsilylcyanide, ethyldimethylsilylcyanide, isopropyldimethylsilylcyanide, and tert-butyldimethylsilylcyanide; alkylarylsilylcyanides such as dimethylphenylsilylcyanide and diphenyldimethylsilylcyanide; metal cyanides such as copper cyanide, zinc cyanide, potassium cyanide, sodium cyanide, and lithium cyanide; organomagnesium reagents such as methylmagnesium bromide, ethylmagnesium bromide, propylmagnesium bromide, isopropylmagnesium bromide, butylmagnesium bromide, phenylmagnesium bromide, tolylmagnesium bromide, vinylmagnesium bromide, and hexyldimagnesium dibromide ($BrMg(CH_2)_6MgBr$); organolithium reagents such as methyllithium, ethyllithium, propyllithium, n-butyllithium, s-butyllithium, t-butyllithium, phenyllithium, pentafluoroethyllithium, pentafluorophenyllithium, lithiumdimethylamide, diphenylphosphinolithium, and lithium acetylide; organozinc reagents such as phenylzinc iodide, dimethylzinc, diethylzinc, and methyldizinc diiodide ($IZnCH_2ZnI$); organocopper reagents such as dimethyl copper lithium and diphenyl copper lithium; organoaluminum reagents such as trimethylaluminum and dimethylaluminum chloride; metal halides such as zinc fluoride, copper fluoride, zinc chloride, and zinc bromide; trimethyl(trifluoromethyl)silane (Ruppert-Prakash reagents); and the like. As described above, the substitution reaction reagents usable in the production process [3-1] of the present invention include not only monofunctional reagents having one reaction point but also polyfunctional reagents having two or more reaction points. Preferred are alkylsilyl cyanides, organomagnesium reagents, organolithium reagents, and metal halides.

The use amount of the substitution reaction reagent may be determined properly depending on the number of $-XR^{13}$ groups contained in the intermediate (8). For example, in the case where m is 1 in the general formula of the intermediate (8), the use amount of the substitution reaction reagent for the intermediate (8) is preferably set to be 5:1 to 1:9 (intermediate (8): substitution reaction reagent, mole ratio, the same shall apply hereinafter). It is more preferably 2:1 to 1:5, and furthermore preferably 1:1 to 1:3. In the case where m is 2, the use amount of the substitution reaction reagent for the intermediate (8) is preferably set to be 4:1 to 1:12 (more preferably 1:1 to 1:6, and furthermore preferably 1:2 to 1:4). and in the case where m is 3, the use amount of the substitution reaction reagent for the intermediate (8) is preferably set to be 3:1 to 1:15 (more preferably 1:1.5 to 1:7, and furthermore preferably 1:3 to 1:5). In any case, if the use amount of the substitution reaction reagent is too small, the production amount of the aimed ionic compound may be low and a byproduct may be produced, and on the other hand, if it is too large, the amount of impurities derived from the substitution reaction reagent tends to be increased so that it becomes difficult to purify an aimed product.

In the production process [1], a halogen salt of an organic cation may be used as a cation exchange reagent in addition to the intermediate (8) and the substitution reaction reagent. The halogen salt of an organic cation may be the same as those which are used at the time of producing the intermediate (8). In the above-exemplified halogen salts of organic cations, it is preferable to use ammonium salts among the onium cations represented by general formulas (3) to (5), and more preferable examples thereof include triethylammonium chloride, triethylammonium bromide, triethylammonium iodide, and the like.

In the production process [3-1], a catalyst may be used for accelerating the substitution reaction. In this case, the catalyst used is not particularly limited, and for example, usable are Broensted acids such as sulfuric acid, hydrochloric acid, phosphoric acid, nitric acid, formic acid, acetic acid, oxalic acid, trifluoroacetic acid, trifluoromethanesulfonic acid, and p-toluenesulfonic acid; Lewis acids such as boron fluoride, boron chloride, aluminum chloride, iron chloride, trifluoromethanesulfonic acid anhydride, and acetic anhydride; and Lewis bases such as ammonia, triethylamine, aniline, pyridine, triphenylphosphine, and tributylphosphine. The catalysts may be used alone or two or more of them may be used in combination.

A reaction solvent may be used in the reaction of the intermediate (8) and the substitution reaction reagent. The reaction solvent may be a solvent which can dissolve the intermediate (8) and the substitution reaction reagent therein, and examples thereof include chlorine-containing solvents such as dichloromethane, chloroform, chlorobenzene, and dichloroethane; aromatic hydrocarbon solvents such as toluene and xylene; ether solvents such as diethyl ether and tetrahydrofuran; and the like. Preferred are chlorine-containing solvents. The reaction solvents may be used alone or two or more of them may be used in combination.

In the production process [3-1] of the present invention, the reaction temperature is preferably set to be 20° C. to 250° C. (more preferably 40° C. to 180° C., and furthermore preferably 50° C. to 120° C.), and the reaction time is preferably set to be 1 hour to 80 hours (more preferably 5 hours to 70 hours, and furthermore preferably 10 hours to 60 hours).

In the production process [3-1] of the present invention, the ionic compound (1); $M^{n+}([B(CN)_{4-m}Y_m]^-)_n$ in which $XR^{13}$ of the anion constituting the intermediate (8) is substituted is produced.

Specific examples of the cyanoborate anion constituting the ionic compound (1) obtained by the production process [3-1] of the present invention include, preferably, tricyanoborate anions such as $[B(CN)_3(F)]^-$, $[B(CN)_3(Cl)]^-$, $[B(CN)_3(CF_3)]^-$, $[B(CN)_3(C_2F_5)]^-$, $[B(CN)_3(Ph)]^-$, $[B(CN)_3(Me)]^-$, and $[B(CN)_3(CH_2)_6B(CN)_3]^{2-}$; dicyanoborate anions such as $[B(CN)_2(F)_2]^-$, $[B(CN)_2(Cl)_2]^-$, $[B(CN)_2(CF_3)_2]^-$, $[B(CN)_2(Me)_2]^-$, and $[B(CN)_2(NMe_2)_2]^-$; cyanoborate anions such as $[B(CN)(F)_3]^-$, $[B(CN)(Cl)_3]^-$, $[B(CN)(CF_3)_3]^-$, $[B(CN)(Me)_3]^-$, and $[B(CN)(Ph)_3]^-$.

Consequently, according to the production process [3-1] of the present invention, the ionic compound (1) composed of the organic or inorganic cation $M^{n+}$ and the cyanoborate anion having said Y can be obtained.

2-3-3. Production Process [3-2]

Examples of the substitution reaction reagent used in the production process [3-2] of the present invention include saturated aliphatic alcohols of linear, branched, cyclic, and combination thereof such as methanol, ethanol, n-propanol, iso-propanol, n-butanol, iso-butanol, sec-butanol, tert-butanol, pentanol, hexanol, heptanol, octanol, 2-ethylhexanol, cyclohexanol, methylcyclohexanol, and adamantyl alcohol; unsaturated aliphatic alcohols of linear, branched, cyclic, and combination thereof and/or aromatic alcohols having a valency of one or two or more such as 2-propenyl alcohol, allyl alcohol, 2-butenol, 3-butenol, 2-cyclohexenol, 3-cyclohexenol, methylcyclohexenol, ethylcyclohexenol, cyclohexenylmethyl alcohol, benzyl alcohol, phenylethyl alcohol, methylphenylethyl alcohol, ethylene glycol, propylene glycol, and cyclohexenediol; phenols having a valency of one or two or more such as phenol, methylphenol, cyclohexylphenol, vinylphenol, naphthol, methylnaphthol, hydroquinone, and methoxyphenol; halogenated alcohols of linear, branched, cyclic, and combination thereof and/or halophenols having a valency of one or two or more such as fluoromethyl alcohol, difluoromethyl alcohol, trifluoromethyl alcohol, chloromethyl alcohol, bromomethyl alcohol, iodomethyl alcohol, difluorochloromethyl alcohol, fluorodichloromethyl alcohol, fluoroethyl alcohol, difluoroethyl alcohol, trifluoroethyl alcohol, tetrafluoroethyl alcohol, perfluoroethyl alcohol, fluorochloroethyl alcohol, chloroethyl alcohol, fluoropropyl alcohol, perfluoropropyl alcohol, hexafluoroisopropyl alcohol, fluorochloropropyl alcohol, perfluorobutyl alcohol, perfluorooctyl alcohol, pentafluorocyclohexyl alcohol, perfluorocyclohexyl alcohol, pentafluorophenol, perchlorophenol, fluoroethylene glycol, difluoroethylene glycol, trifluoroethylene glycol, tetrafluoroethylene glycol, fluorocyclohexenol, fluorohydroquinone, and bisphenol F; cyanoalcohols of linear, branched, cyclic, and combination thereof and/or cyanophenols having a valency of one or two or more such as cyanomethyl alcohol, dicyanomethyl alcohol, tricyanomethyl alcohol, cyanoethyl alcohol, dicyanoethyl alcohol, tricyanoethyl alcohol, tetracyanoethyl alcohol, cyanopropyl alcohol, cyanobutyl alcohol, cyanooctyl alcohol, cyanocyclohexyl alcohol, cyanophenol, cyanoethylene glycol, dicyanoethylene glycol, cyanocyclohexene glycol, and cyanohydroquinone; alkoxy-alcohols of linear, branched, cyclic, and combination thereof and/or aryloxyalcohols and/or phenols having a valency of one or two or more such as methoxymethyl alcohol, methoxyethyl alcohol, methoxypropyl alcohol, methoxybutyl alcohol, methoxycyclohexyl alcohol, methoxyphenol, methoxynaphthol, ethoxymethyl alcohol, propoxymethyl alcohol, butoxymethyl alcohol, pentyloxymethyl alcohol, hexyloxymethyl alcohol, cyclohexyloxymethyl alcohol, phenyloxymethyl alcohol, vinyloxymethyl alcohol, isopropenyloxymethyl alcohol, tert-butyloxymethyl alcohol, naphthyloxymethyl alcohol, methoxyethoxymethyl alcohol, ethoxyethoxymethyl alcohol, ethoxyethyl alcohol, propoxyethyl alcohol, butoxyethyl alcohol, pentyloxyethyl alcohol, hexyloxyethyl alcohol, cyclohexyloxyethyl alcohol, phenyloxyethyl alcohol, vinyloxyethyl alcohol, isopropenyloxyethyl alcohol, tert-butyloxyethyl alcohol, naphthyloxyethyl alcohol, methoxyethoxyethyl alcohol, ethoxyethoxyethyl alcohol, diethylene glycol, triethylene glycol, and tetraethylene glycol; aldehydes of linear, branched, cyclic, and combination thereof having a valency of one or two or more such as formaldehyde, paraformaldehyde, trioxane (metaformaldehyde), acetaldehyde, propione aldehyde, butyl aldehyde, acrolein, benzaldehyde, and cinnamaldehyde; ketones of linear, branched, cyclic, and combination thereof having a valency of one or two or more such as acetone, methyl ethyl ketone, acetophenone, benzophenone, cyclohexanone, and acetylacetone; carboxylic anhydrides of linear, branched, cyclic, and combination thereof having a valency of one or two or more such as acetic anhydride, propionic anhydride, butanoic anhydride, pentanoic anhydride, hexanoic anhydride, heptanoic anhydride, octanoic anhydride, isopropanoic anhydride, isobutanoic anhydride, acrylic anhydride, methacrylic anhydride, oxalic anhydride, malonic anhydride, succinic anhydride, and benzoic anhydride; organic acid esters and/or orthoesters of linear, branched, cyclic, and combination thereof having a valency of one or two or more such as methyl acetate, ethyl acetate, butyl acetate, cyclohexyl acetate, phenyl acetate, ethylene glycol diacetate, diethylene glycol diacetate, methyl propionate, methyl butanoate, methyl pentanoate, methyl hexanoate, methyl heptanoate, methyl octanoate, methyl isopropanoate, methyl isobutanoate, methyl acrylate, butyl acrylate, methyl methacrylate, dimethyl oxalate, dimethyl malonate, dimethyl succinate, methyl benzoate, γ-butyrolactone, ε-caprolactone, dimethyl carbonate, methyl ethyl carbonate, diethyl carbonate, ethylene carbonate, propylene carbonate, vinylene carbonate, trimethyl orthoacetate, triethyl orthoacetate, ethyl cyanoacetate, and glycerin carbonate; carboxylic acid amides and/or imides of linear, branched, cyclic, and combination thereof having a valency of one or two or more such as formamide, dimethylformamide, acetamide, methylacetamide, dimethylacetamide, diethylacetamide, dibutylacetamide, diphenylacetamide, acrylamide, dimethylacrylamide, dibutylacrylamide, methacrylamide, oxalic acid diamide, malonic acid diamide, succinic acid diamide, succinimide, methylsuccinimide, benzoic acid amide, γ-butyrolactam, and ε-caprolactam; organosilane compounds such as alkylsilylcyanides of trimethylsilyl cyanide, trimethylsilyl chloride and trimethylsilyl bromide; organoaluminum compounds such as trimethyl aluminate and triethyl aluminate; sulfonic acids and/or sulfonic anhydrides such as fluorosulfonic acid, trifluoromethanesulfonic acid, fluorosulfonic anhydride, and trifluoromethanesulfonic anhydride; and the like. Preferred are alkylsilylcyanides, aliphatic alcohols, halogenated alcohols, phenols, carboxylic anhydrides, sulfonic acid and/or sulfonic anhydrides.

The use amount of the substitution reaction reagent may be determined properly depending on the number of —$R^{13}$ groups contained in the intermediate (8), and for example, in the case where m is 1 in the general formula of the intermediate (8), the use amount of the substitution reaction reagent for the intermediate (8) is preferably set to be 5:1 to 1:10 (intermediate (8): substitution reaction reagent, mole ratio. the same shall apply hereinafter). It is more preferably 2:1 to 1:9, and furthermore preferably 1:1 to 1:8. In the case where m is 2, the use amount of the substitution reaction reagent for the intermediate (8) is preferably set to be 4:1 to 1:12 (more preferably 1:1 to 1:6, and furthermore preferably 1:2 to 1:4), and in the case where m is 3, the use amount of the substitution reaction reagent for the intermediate (8) is preferably set to be 3:1 to 1:15 (more preferably 1:1.5 to 1:7, and furthermore preferably 1:3 to 1:5). In any case, if the use amount of the substitution reaction reagent is too small, the production amount of the aimed ionic compound may be low and a byproduct may be produced, and on the other hand, if it is too large, the amount of impurities derived from the substitution reaction reagent tends to be increased so that it becomes difficult to purify an aimed product.

Also in the production process [3-2], a halogen salt of an organic cation may be used as a cation exchange reagent in addition to the intermediate (8) and the substitution reaction reagent, likewise the production process [3-1]. The halogen salt of an organic cation may be the same as those used in the production process [3-1].

In the production process [3-2], a catalyst may be used for accelerating the substitution reaction. In this case, the catalyst used is not particularly limited, and for example, usable are Broensted acids such as sulfuric acid, hydrochloric acid, phosphoric acid, nitric acid, formic acid, acetic acid, oxalic acid, trifluoroacetic acid, trifluoromethanesulfonic acid, and p-toluenesulfonic acid; Lewis acids such as boron fluoride, boron chloride, aluminum chloride, and iron chloride; Lewis bases such as ammonia, triethylamine, aniline, pyridine, triphenylphosphine, and tributylphosphine; and the like. The catalysts may be used alone or two or more of them may be used in combination.

A reaction solvent may be used in the reaction of the intermediate (8) and the substitution reaction reagent. The reaction solvent may be a solvent which can dissolve the intermediate (8) and the substitution reaction reagent therein, and those which are the same as those described in the production process [3-1] may be used. The substitution reaction reagent may be used as a reaction solvent. In the production process [3-2], aromatic hydrocarbon solvents such as toluene and xylene are preferable among the above-mentioned reaction solvents. The reaction solvents may be used alone or two or more of them may be used in combination. The substitution reaction reagents include those which also serve as a solvent, and such substitution reaction reagents may be used as a reaction solvent. In the case where it is desired that the substitution reaction reagent is used not only as a substitution reaction reagent but also as a reaction solvent, the reaction conditions may be controlled, and for example, the temperature at the time of the reaction may be adjusted.

In the production process [3-2] of the present invention, the reaction temperature is preferably set to be 20° C. to 250° C. (more preferably 40° C. to 180° C., and furthermore preferably 50° C. to 120° C.), and the reaction time is preferably set to be 1 hour to 80 hours (more preferably 5 hours to 70 hours, and furthermore preferably 10 hours to 60 hours).

As described above, in the production process [3-2] of the present invention, the ionic compound (1): $M^{n+}$ $([B(CN)_{4-m}Y_m]^-)_n$ in which $R^{13}$ of the anion constituting the intermediate (8) is substituted is produced.

Specific examples of the cyanoborate anion constituting the ionic compound obtained by the production process [3-2] include alkoxytricyanoborate anions such as $[B(CN)_3(OMe)]^-$, $[B(CN)_3(OEt)]^-$, $[B(CN)_3(O\text{-i-Pr})]^-$, $[B(CN)_3(OBu)]^-$, $[B(CN)_3(OPh)]^-$, $[B(CN)_3(OCH_2CH_2O)B(CN)_3]^{2-}$, and $[B(CN)_3(OC_3H_6O)B(CN)_3]^{2-}$; dialkoxydicyanoborate anions such as $[B(CN)_2(OMe)_2]^-$, $[B(CN)_2(OEt)_2]^-$, $[B(CN)_2(O\text{-i-Pr})_2]^-$, $[B(CN)_2(OBu)_2]^-$, and $[B(CN)_2(OPh)_2]^-$; trialkoxycyanoborate anions such as $[B(CN)(OMe)_3]^-$, $[B(CN)_2(OEt)_3]^-$, $[B(CM(O\text{-i-Pr})_3]^-$, $[B(CM(OBu)_3]^-$, and $[B(CN)(OPh)_3]^-$; thioalkoxytricyanoborate anions such as $[B(CN)_3(SMe)]^-$; haloalkoxycyanoborate anions such as $[B(CN)_3(OCF_3)]^-$ and $[B(CN)_3(OC_2F_5)]^-$; cyanoalkoxycyanoborate anions such as $[B(CN)_3(OC_2H_4CN)]^-$; ester-based cyanoborate anions such as $[B(CN)_3(OCOCH_3)]^-$, $[B(CN)_3(OCOC_2H_5)]^-$, $[B(CN)_3(OCOOCH_3)]^-$, $[B(CN)_3(OCOOC_2H_5)]^-$, and $[B(CN)_3(OCH_2CH_2OCOOCH_3)]^-$; sulfonyl group-containing cyanoborate anions such as $[B(CN)_3(OSO_2F)]^-$, $[B(CN)_3(OSO_2CF_3)]^-$, $[B(CN)_3(OSO_2CH_3)]^-$, and $[B(CN)_3(OSO_2C_6H_4CH_3)]^-$; alkylsiloxycyanoborate anions such as $[B(CN)_3(OSiCH_3)]^-$; and the like.

Consequently, according to the production process [3-2] of the present invention, the ionic compound (1) composed of the organic or inorganic cation $M^{n+}$ and the cyanoborate anion having said Y can be obtained. In the case where the compounds exemplified for both of the production processes [3-1] and [3-2] are used as the substitution reaction reagent, if the reaction temperature is raised higher (e.g., 110° C. or higher), the product obtained in the production process [3-1] may be easily obtained.

In the production processes [3-1] and [3-2], the processes for producing the aimed ionic compound (1) are described in which a synthesized ionic compound (an intermediate) is once used as a raw material and the organic substituent group $R^{13}$, a part of the raw material, is modified or substituted; however, the substitution reaction reagent may be loaded together with raw materials for synthesizing the intermediate (8) to the reaction system at the time of synthesizing the intermediate (8). After the synthesis of the intermediate (8), the substitution reaction reagent may be loaded to the reaction system, or after once the synthesized intermediate (8) is purified, the substitution reaction reagent and the intermediate (8) may be mixed and reacted with each other.

2-4. Purification

In any production process [1] to [3], after the above-mentioned reaction, the produced ionic compound (1) (crude ionic compound) may be purified in order to further lower the impurity amount thereof and to increase the purity thereof. A purification method is not particularly limited, and any conventionally known purification method may be employed; that is, purification methods performed by washing the product with water, an organic solvent, or a mixture solvent thereof, oxidizing agent treatment for bringing the product into contact with an oxidizing agent, an adsorption purification method, a reprecipitation method, a liquid separation extraction method, a recrystallization method, a crystallization method, chromatography, and the like.

These purification methods may be carried out alone or in combination of two or more thereof. In terms of lowering the impurities, one or more of oxidizing agent treatment, adsorption purification method, liquid separation extraction method, and crystallization method are preferably employed, and particularly, it is preferable to carry out all of these methods.

2-4-1. Liquid Separation Extraction Method

A solvent used for treatment by the liquid separation extraction method is not particularly limited; however, a solvent which can form a two-layer state with the above-mentioned solvent used for the ionic compound production is preferable. In the case where an organic solvent is used in the ionic compound production, it is preferable to use water for washing and liquid separation extraction. Use of water makes it possible to efficiently extract alkali metal ions, alkaline earth metal ions, and halide ions, as well as silicon in the water layer and thus to remove these ion components from the ionic compound. From the viewpoint of layer separation from water and recovery ratio of the ionic compound, examples of a preferable combination of extraction solvents include water/hexane, water/methyl ethyl ketone, water/methyl isobutyl ketone, water/dimethyl ether, water/diethyl ether, water/ethyl acetate, water/butyl acetate, and water/dichloromethane; and among them, combinations of water/ethyl acetate, water/butyl acetate, water/methyl isobutyl ketone, and water/diethyl ether are preferable; and combinations of water/ethyl acetate, water/butyl acetate, water/diethyl ether are more preferable.

2-4-2. Crystallization Method

A solvent used for treatment by the crystallization method is not particularly limited; however, it is preferable to use a solvent which can dissolve the ionic compound therein (hereinafter, referred to as good solvent), and if necessary, a solvent with low solubility for the ionic compound (poor solvent) may be used in combination. In the case where crystallization is carried out only with a good solvent, generally, a crude ionic compound may be allowed to be dissolved in a concentration as high as possible at a high temperature, and thereafter, the aimed ionic compound alone may be crystallized by cooling based on the difference of the solubility, or conversely, only impurities may be crystallized and separated from the dissolved matter (purified ionic compound) (so-called recrystallization method). The temperature condition is not particularly limited; however, the method is preferably carried out in a temperature range of 20° C. to 250° C. It is more preferably in a range of 20° C. to 200° C. and furthermore preferably in a range of 20° C. to 160° C.

In the case where a poor solvent is used in combination with a good solvent, a crude ionic compound may be allowed to be dissolved in a concentration as high as possible in the good solvent, and thereafter, the poor solvent is mixed therewith to precipitate or float only the aimed ionic compound based on the difference of the solubility, or conversely to precipitate or float only the impurities and accordingly separate the impurities from the dissolved matter (so-called reprecipitation method). Further, in this case, the temperature may be changed for the purpose of controlling the difference of the solubility. In this case, the temperature condition is not particularly limited; however, the method is preferably carried out in a temperature range of 20° C. to 250° C. It is more preferably in a range of 20° C. to 180° C., and furthermore preferably in a range of 20° C. to 120° C. The recrystallization method and the reprecipitation method may be carried out in combination.

The kinds of solvents (good solvent and poor solvent) used in the case where the crystallization methods are carried out are not particularly limited, and if remaining in a product after purification, both solvents may cause adverse effects on the performance of a device for which the product is used. Consequently, it is preferable to use electrochemically stably solvents. Specifically, preferred are hydrocarbons and their mixtures, that is, petroleum ethers such as hexane, heptane, octane, decane, and dodecane; organic nitriles such as acetonitrile, butyronitrile, capronitrile, valeronitrile, benzonitrile, and succinodinitrile; organic esters such as ethyl acetate, butyl acetate, hexyl acetate, octyl acetate, dimethyl carbonate, diethyl carbonate, methylethyl carbonate, ethylene carbonate, and propylene carbonate; halohydrocarbons such as dichloromethane, chloroform, tetrachloromethane, dichloroethane, tetrachloroethane, chlorobenzene, and dichlorobenzene. Further preferred are hexane, heptane, octane, decane, dodecane, petroleum ethers, acetonitrile, butyronitrile, valeronitrile, ethyl acetate, butyl acetate, dimethyl carbonate, diethyl carbonate, methylethyl carbonate, ethylene carbonate, propylene carbonate, dichloromethane, chloroform, dichloroethane, and tetrachloroethane. The solvents may be used alone or two or more of them may be used in combination. Whether the above-mentioned solvents are used as a good solvent or a poor solvent can be changed depending on the kind of the ionic compound, the temperature condition and concentration condition at the time of crystallization purification, and the purity of the ionic compound for the use after purification, and are not particularly limited.

2-4-3. Oxidant Treatment

The oxidizing agent treatment, to be one which is brought into contact with an oxidizing agent the crude ionic compound, by employing said oxidizing agent treatment, the ionic compound having a high purity impure ion component content of the cyanide ion such as low it can be obtained.

As described above, the impure ionic components contained in the ionic compound, degrade the surrounding member and the electrochemical device is used ionic compound and thus, there is a possibility to degrade the performance of the electrochemical device. Further, in the manufacturing method of the present invention, since it is a starting material cyanide, components derived from cyanide free (CN–) or the like, the starting material or residue, and inevitably in the manufacturing process in the product may impurities contaminating exists. May be used for the constituent material of the electrochemical device, the impurities such as CN– which is present in the ionic compound, causing corrosion of the electrode and lowering of the ion conduction performance and ionic compounds according to the present invention, an electrochemical cause degrading performance.

Incidentally, easily oxidized and decomposed in the presence of an oxidizing agent, organic compound cyanoborate ($[(XR^{13})$ a $B(CN)4$-a]-) also generally ionic compounds and anions, intended to oxidative decomposition in the same manner it has been considered. Thus, (NaCN, NaCl) as, impure ion component of the ionic compound had been removed and transferred to the aqueous layer alkali metal salts by the extraction process using, for example aqueous NaOH, the cyanide ion (CN–) is a weak acid, the extraction efficiency is low because the solubility in water of the salt with an alkali metal is not so high. Further, in order to sufficiently reduce the amount of impurities, there is a problem must be repeated several times to extraction, of reducing the yield of the ionic compound.

However, according to the study of the present inventors, stability to oxidizing agent is higher than the organic compounds typical surprisingly, therefore, ionic compounds having a cyano borate anion, the ionic compound after production by being brought into contact with an oxidizing agent, it is possible to decompose (CN–) excess cyanide ions contained in the product, and further, it can also be reduced content of impurities inevitably mixed in the production process and the starting material obviously has become.

In particular, when it is brought into contact with the product obtained is reacted with a boron compound and trimethylsilyl cyanide, an oxidizing agent, and by performing the oxidizing agent treatment of contacting with the oxidizing agent the crude ionic compound produced, I can be obtained high purity ionic compound impurities and water content of silicon and halide ions is reduced.

The oxidizing agent used in the oxidizing agent treatment, manganese compounds peroxide hydrogen peroxide, sodium perchlorate, peracetic acid, meta-chloroperbenzoic acid, such as (mCPBA), potassium permanganate, and manganese oxide, dichromate inorganic nitrogen compounds halogen-containing compound chromium compounds such as potassium, potassium chlorate, sodium bromate, potassium bromate, sodium hypochlorite, such as chlorine dioxide, nitric acid, such as chloramine, acetic acid, and osmium tetroxide is cited are. Peroxide is preferably Among these, hydrogen peroxide, sodium perchlorate is more preferable. In particular, in the case of using hydrogen peroxide oxidant, dopant chloride ion (Cl–), cyanate ion, such as (NCO–) is distributed efficiently to a hydrogen peroxide aqueous layer and extraction of ionic compound it is particularly preferred efficiency is improved. Further, in the case of using hydrogen peroxide, and those of hygroscopic, because the components easily hydrated is distributed efficiently to a hydrogen peroxide aqueous layer, the purity of the ionic compound and at the same time increases of the impurities, I can be reduced easily water content of the ionic compound.

The above oxidizing agent may be used, it is dissolved in a solvent in the case of solid and even liquid even in solid form. Further, the oxidizing agent solution prepared by dissolving in a solvent oxidant liquid, an oxidizing agent a solid, it may be used by diluting it further.

The amount of the oxidizing agent, depending (such as CN−, especially) the amount of impurities contained in the crude ionic compound, the crude ionic compound per 100 parts by mass, of which 1000 parts by weight 1 part by weight is preferably from, is 500 parts by weight 10 parts by weight more preferably, is 300 parts by weight 20 parts by weight and more preferably between, of which 100 parts by weight 50 parts by weight—particularly preferable. Incidentally, there is a possibility that decompose the ionic compound when oxidizing agent amount is too large, while if it is too small, there are cases where it is difficult to reduce sufficiently the excessive impurity and ion component. Incidentally, the term "crude ionic compound" means the component obtained by distilling off the solvent from the reaction solution after manufacturing. However, the oxidizing agent treatment, or immediately after production, without purification after the other as described above, are distilled off and the reaction solvent may be performed as it is.

Is not particularly limited as long as the oxidizing agent and the crude ionic compound is in contact, and also may be brought into contact with an oxidizing agent as the crude ionic compound preparation of (synthetic) after oxidizing agent treatment, the crude ionic compound the prepared solution may be contacted by mixing an oxidizing agent with the crude ionic compound solution. That is, the aspect of the contact, aspects with an oxidizing agent added in solid to the crude ionic compound solution is brought into contact with them; The manner by mixing an oxidizing agent solution and the crude ionic compound solution is brought into contact with both; can be mentioned; manner by adding the oxidizing agent solution of the crude ionic compound in solid, contacting the two. Note that, as the solvent for dissolving the crude ionic compound, the solvent used in the activated carbon treatment described later is preferred.

As described above, the ionic compound of the present invention, resistance to oxidizing agent is higher than that of the organic matter generally, excessive contact with the oxidizing agent causes decomposition of the ionic compound. Therefore, from the viewpoint of suppressing the decomposition of the ionic compound, the oxidizing agent treatment is preferably carried out in a short time and a low temperature is recommended. For example, it is preferable to a reaction temperature or lower in the production of ionic compounds, and further, oxidizing agent treatment, it is preferable to the boiling point of the solvent. Specifically, of the 150° C.~0° C. is preferably a 130° C.~0° C. more preferably in the 100° C.~10° C. more preferably, of a 80° C.~10° C. particularly desirable.

2-4-5. Adsorption Purification Method

Examples of an adsorbent used for the adsorption purification method include activated carbon, silica gel, alumina, zeolite, and the like. The adsorption treatment (activated carbon treatment) using activated carbon as an adsorbent among them is preferable since contamination of impurities to an ionic compound is small.

The activated carbon usable for the adsorption treatment is not particularly limited. The shape of the activated carbon is not particularly limited as long as it has a wide surface area, and examples thereof include a powder shape, a pulverized shape, a granular shape, a pelletized shape, and a spherical shape, and among them, activated carbon with a powder shape is preferably used owing to its wide surface area. The activated carbon may be one having a surface area of preferably 100 m$^2$/g or more, more preferably 400 m$^2$/g or more, and particularly preferably 800 m$^2$/g or more. Additionally, in order to avoid contamination of impurities contained in the activated carbon to an ionic compound, it is preferable to use activated carbon with a less impurity content, and one example of such activated carbon is Carborafin (registered trademark)-6 manufactured by Japan EnviroChemicals, Ltd.

Preferably the amount of the adsorbent, such as activated carbon, and to the 1 part by mass or more based on the crude ionic compound 100 parts by weight, 500 parts by mass or less, 10 parts by mass or more, more preferably 300 parts by mass or less, more preferably 20 parts by mass or more and 200 parts by weight or less.

Not limited to activated carbon treatment, as a solvent usable in the adsorption process, it is not particularly limited, but a solvent which is dissolving the crude ionic compound. For example, water; methanol, ethanol, n-propyl alcohol, isopropyl alcohol, 1-butanol, sec-butanol, tert-butanol, 1-pentanol, 2-pentanol, 3-pentanol, 3-methyl-1-butanol, 3-methyl-2-butanol, 2-methyl-1-butanol, tert-amyl alcohol, neopentyl alcohol, 1-hexanol, 2-hexanol, 3-hexanol, 2-methyl-1-pentanol, 3-methyl-1-3-pentanol, 4-methyl-2-pentanol, 3,3-dimethyl-2-butanol, 1-heptanol, 2-heptanol, 3-heptanol, 2-methyl-3-hexanol, 2,4-dimethyl-3-pentanol, 1-octanol, 2-octanol, 3-octanol, 2-ethyl-nonanol, 2,4,4-trimethyl-1-pentanol, 1-nonanol, 2-nonanol, 2,6-dimethyl-4-heptanol, 3,5,5-trimethyl-1-hexanol, 1-decanol, 2-decanol, 4-decanol, and 3,7-dimethyl-aliphatic mono alcohols such as octanol, Shikuropen such as glycerol and butene-butane-diol, 1,4-dihydroxy-2-butene, 1,2-dihydroxy-3 ethylene glycol, propylene glycol, 1,4; alicyclic mono-alcohols such as ethanol hexanol, cyclohexane ketones such as methyl isopropyl ketone, acetone, methyl ethyl ketone, methyl butyl ketone, and methyl isobutyl ketone; polyhydric alcohol ether, diethyl ether, dipropyl ether, methyl-tert-butyl ether, butyl ethyl ether, dibutyl ether, dipentyl ether, esters such as methyl acetate, ethyl acetate, isopropyl acetate, butyl acetate, methyl acrylate, and methyl methacrylate; ethers such as tetrahydropyran, and tetrahydrofuran n-pentane, hexane, methyl pentane, n-heptane, methyl to n-linear or, hexane, trimethylpentane, dimethyl heptane, and n-decane, aliphatic saturated hydrocarbons branched hexane, dimethylpentane, n-octane, methylheptane, the dimethyl to; 1-pentene, 1-hexene, 4-methyl-1-pentene, 1- or linear, and heptene, aliphatic unsaturated hydrocarbons branched; aromatic hydrocarbons such as benzene, toluene, xylene, ethylbenzene, and propylbenzene; alicyclic compounds cyclopentane, methyl cyclopentane, cyclohexane, methyl cyclohexane, dimethyl cyclohexane, ethyl cyclohexane, such as propyl cyclohexane; chloromethane, dichloromethane, trichloromethane, tetrachloromethane, dichloroethylene, trichlorethylene, and, including such as tetrachloroethylene nitriles such as halogenated solvents, acetonitrile, propionitrile, butyronitrile, valeronitrile, hexanenitrile, and benzonitrile, and the like. Among these, halogen-containing solvent water, ketones, ethers, esters, aliphatic saturated hydrocarbons, and the like. Among them, water, methyl ethyl ketone, dimethyl ether, diethyl ether, ethyl acetate, butyl acetate, and hexane are preferred. It may be used alone or the solvent, is preferably used as a mixture of two or more. In addition, the treated ion-exchange membrane or filter, such as a reverse osmosis membrane, with ultrapure water apparatus equipped with various kinds of filter media, ultrapure water used in the activated carbon treatment is preferably from (ionic resistance 1.0 Ω·cm or more) preferred.

Preferably the amount of the solvent, the crude ionic compound 100 parts by weight, and to 10 parts by mass or more and 2000 parts by mass or less, 100 parts by mass or more, more preferably 1000 parts by mass or less, and more preferably 200 parts by mass or more and 1000 parts by weight or less. If the solvent amount is too large, there is a tendency that the reactor becomes large, on costly, the yield decreases, economic advantage is low. On the other hand, if the amount is too small, there are cases where the purity of the ionic compound is lowered.

The order for carrying out the purification methods is not particularly limited, and for example, in the case where all of oxidizing agent treatment, adsorption purification method, and liquid separation extraction method are employed, the liquid separation extraction method, the oxidizing agent treatment and the adsorption purification method are preferably carried out in this order.

2-5. Cation Exchange Reaction

The ionic compound obtained by the above-mentioned production process may be further subjected to cation exchange reaction. The characteristics of the ionic compound represented by general formula (1) depend on the cationic species, and therefore, carrying out a cation exchange reaction can make it easy to obtain cyanoborate salts with different characteristics.

The cation exchange reaction may be carried out by allowing the ionic compound represented by general formula (1) obtained by the above-mentioned production process and an ionic substance having a desired cation to react with each other. The ionic substance may be a compound having a desired cation, and examples thereof include hydroxides, haloid salt, tetrafluoroborates, hexafluorophosphates, perchlorates, bis(trifluoromethanesulfonyl) imide salts, and the like. The conditions at the time of the cation exchange reaction are not also particularly limited, and the reaction temperature and time may be properly adjusted depending on the advancing state of the reaction. Further, if necessary, a solvent may be used and the above-mentioned reaction solvents are preferably used.

3. Electrolytic Material

The present invention includes (i) an electrolytic material containing the ionic compound (1) and a medium (hereinafter, may be referred to as electrolytic material (i)), (ii) an electrolytic material containing the ionic compound (1) and a medium, wherein the concentration of the ionic compound is 1% by mass or more and the content of water is 50 ppm or lower (hereinafter, may be referred to as electrolytic material (ii)), and (iii) an electrolytic material containing the ionic compound (1) and having a water content of 2000 ppm or lower (hereinafter, may be referred to as electrolytic material (iii)).

The present inventors have found that use of the ionic compound represented by general formula (1) described above as an electrolyte can improve the voltage endurance of an electrolytic solution and stably operate an electrical storage device even if charge/discharge is repeated under high voltage, and consequently have completed the present invention. Hereinafter, the electrolytic materials (i) to (iii) will be described.

3-1. Electrolytic Material (i)

The electrolytic material (i) of the present invention has a feature of containing the ionic compound represented by general formula (1) described above and a solvent (medium). Hereinafter, the electrolytic material (i) of the present invention may be simply referred to as an electrolytic solution.

3-1-1. Ionic Compound

The electrolytic solution of the present invention contains the ionic compound (1). The concentration of the ionic compound (1) is preferably 0.1% by mass or more and the saturated concentration or lower in the electrolytic solution. If it is lower than 0.1% by mass, the ion conductivity is lowered and therefore, it is not preferable. It is more preferably 1% by mass or more, and furthermore preferably 5% by mass or more; and preferably 50% by mass or lower, and more preferably 40% by mass or lower. If the electrolyte concentration is too low, it may become difficult to obtain desired electric conductivity, and on the other hand, if the concentration is too high, the viscosity of the electrolytic solution is increased to lower the electric charge transfer efficiency or the ionic compound (1) may be separated and precipitated in the electrolytic solution to cause an adverse effect on a device, outstandingly particularly in a low temperature range (about −20° C.). There causes another problem that use of the ionic compound (1) in a large amount increases the cost.

3-1-2. Medium (Solvent)

Examples of a medium (solvent) that can be used preferably for the electrolytic solution of the present invention may include aprotic solvents which can dissolve the above-mentioned ionic compound (1) therein.

Usually, an organic solvent is decomposed under high voltage, and therefore, an electrolytic solution is deteriorated. However, the present inventors have found that use of the electrolytic solution of the present invention containing the cyanoborate salt represented by general formula (1) allows no decomposition electric current to flow even under high voltage exceeding the voltage endurance of a commonly known solvent, and makes it difficult to deteriorate the electrolytic solution. This effect is particularly significant when the amount of a prescribed impurity contained in the ionic compound (1) is lowered. That is, the electrolytic solution of the present invention has a high voltage resistant property as compared with a conventional electrolytic solution, so that it is supposed that an electrical storage device using this electrolytic solution is provided with improved charge/discharge cycle performance. The voltage resistant property and the cycle performance improvement effect can be also obtained similarly in the case where the electrolytic solution contains other electrolytes in addition to the ionic compound (1) represented by general formula (1) described above.

The aprotic solvent that can be used for the electrolytic solution of the present invention may be preferably a solvent having a high dielectric constant, high solubility for an electrolytic salt, a boiling point of 60° C. or higher, and a wide electrochemical stability range. It is more preferably an organic solvent (non-aqueous solvent) with a low water content. Examples of the organic solvent include ethers such as ethylene glycol dimethyl ether (1,2-dimethoxyethane), ethylene glycol diethyl ether, tetrahydrofuran, 2-methyltetrahydrofuran, 2,6-dimethyltetrahydrofuran, tetrahydropyrane, crown ether, triethylene glycol dimethyl ether, tetraethylene glycol dimethyl ether, 1,4-dioxane, and 1,3-dioxolane; chain carbonic acid esters such as dimethyl carbonate, ethyl methyl carbonate, diethyl carbonate, diphenyl carbonate, and methyl phenyl carbonate; cyclic carbonic acid esters such as ethylene carbonate, propylene carbonate, ethylene 2,3-dimethyl carbonate, butylene carbonate, vinylene carbonate, and ethylene 2-vinyl carbonate; aliphatic carboxylic acid esters such as methyl formate, methyl acetate, propionic acid, methyl propionate, ethyl acetate, propyl acetate, butyl acetate, and amyl acetate; aromatic carboxylic acid esters such as methyl benzoate and ethyl benzoate; carboxylic acid esters such as γ-butyrolactone, γ-valerolactone, and δ-valerolactone; phosphoric acid esters such as trimethyl phosphate, ethyl dimethyl phosphate, diethyl methyl phosphate, and triethyl phosphate; nitriles such as acetonitrile, propionitrile, methoxypropionitrile, glutaronitrile, adiponitrile, 2-methylglutaronitrile, valeronitrile, butyronitrile, and isobutylnitrile; amides such as N-methylformamide, N-ethylformamide, N,N-dimethylformamide, N,N-dimethylacetamide, N-methylpyrrolidinone, and N-vinylpyrrolidone; sulfur compounds such as dimethylsulfone, ethylmethylsulfone, diethylsulfone, sulfolane, 3-methylsulfolane, and 2,4-dimethylsulfolane; alcohols such as ethylene glycol, propylene glycol, ethylene glycol monomethyl ether, and ethylene glycol monoethyl ether; sulfoxides such as dimethyl sulfoxide, methylethyl sulfoxide, and diethyl sulfoxide; aromatic nitriles such as benzonitrile and tolunitrile; nitromethane, 1,3-dimethyl-2-imidazolidinone, 1,3-dimethyl-3,4,5,6-tetrahydro-2(1H)-pyrimidinone, 3-methyl-2-oxazolidinone, and the like. Among them, preferred are chain carbonic acid esters, cyclic carbonic acid esters, aliphatic carboxylic acid esters, carboxylic acid esters, and ethers; and more preferred are dimethyl carbonate, ethylmethyl carbonate, diethyl carbonate, ethylene carbonate, propylene carbonate, γ-butyrolactone, γ-valerolactone, and the like. The solvents may be used alone or two or more of them may be used in combination.

3-1-3. Other Electrolytes

The electrolytic solution of the present invention may contain other electrolytes other than the ionic compound (1). The other electrolytes are preferably those having a high dissociation constant in the electrolytic solution. Examples of cationic species contained in the other electrolytes include alkali metal ions such as $Li^+$, $Na^+$, and $K^+$; alkaline earth metal ions such as $Ca^{2+}$ and $Mg^{2+}$; and the above-mentioned onium cations, and particularly, chain quaternary ammonium or lithium ions are preferable. On the other hand, examples of anionic species include $PF_6^-$, $BF_4^-$, $Cl^-$, $Br^-$, $ClO_4^-$, $AlCl_4^-$, $C[(CN)_3]^-$, $N[(CN)_2]^-$, $N[(SO_2CF_3)_2]^-$, $N[(SO_2F)_2]^-$, $CF_3(SO_3)^-$, $C[(CF_3SO_2)_3]^-$, $AsF_6^-$, $SbF_6^-$, dicyanotriazolate ion (DCTA), and the like. Among them, $PF_6^-$ and $BF_4^-$ are more preferable, and $BF_4^-$ is particularly preferable.

Specifically, preferable examples of the other electrolytes include triethylmethyl ammonium tetrafluoroborate containing triethylmethylammonium as a cationic component and $BF_4^-$ as an anionic component; tetraethylammonium fluoroborate containing tetraethylammonium as a cationic component and $BF_4^-$ as an anionic component; and the like.

In the case where the other electrolytes are used, the presence amount thereof is preferably 0.1% by mass or more and 50% by mass or lower in total of 100% by mass of the ionic compound (1) and the other electrolytes. If it is lower than 0.1% by mass, the absolute amount of ions cannot be sufficient and the electric conductivity may be low, and if it exceeds 50% by mass, the ion transfer may be inhibited considerably. It is more preferably 1% by mass or more, furthermore preferably 5% by mass or more, even more preferably 6% by mass or more, and even furthermore preferably 10% by mass or more; and preferably 40% by mass or lower, furthermore preferably 30% by mass or lower, and even more preferably 25% by mass or lower.

In the case where the other electrolytes are used in combination, the electrolyte concentration (total amount of the ionic compound (1) or of the ionic compound (1) and the other electrolytes) in the electrolytic solution of the present invention is preferably 1% by mass or more and the saturated concentration or lower. If it is lower than 1% by mass, the ion conductivity is lowered and therefore, it is not preferable. It is more preferably 5% by mass or more; and more preferably 50% by mass or lower and furthermore preferably 40% by mass or lower. If the electrolyte concentration is too low, it may become difficult to obtain desired electric conductivity, and on the other hand, if the concentration is too high, the viscosity of the electrolytic solution is increased to lower the electric charge transfer efficiency or the electrolyte (ionic compound (1), other electrolytes) may be separated and precipitated in the electrolytic solution to cause an adverse effect on a device, outstandingly particularly in a low temperature range (about −20° C.). There causes another problem that use of the electrolytes in a large amount increases the cost.

The electrolytic solution of the present invention is preferably an electrolytic solution which has a voltage endurance of 6.9 V or more and 13.8 V or lower (vs. $Li/Li^+$) when LSV measurement is carried out under the following conditions.

Herein, the expression "has a voltage endurance of 6.9 V or more and 13.8 V or lower (vs. $Li/Li^+$)" means that an electric current of standard electric current value or more does not flow in a range of 6.9 V to 13.8 V when LSV measurement is carried out under the following conditions; that is, it means that the electrolytic solution is hardly decomposed. Consequently, an electrical storage device including the electrolytic solution of the present invention having the voltage endurance can be charged to a high potential, and even if the device is operated at a high potential, the electrolytic solution and the electrodes are hardly deteriorated. Therefore, the device can have high energy density. Additionally, it can be said that as the voltage at which an electric current of the standard electric current value or more flows is higher, the electrolytic solution is provided with higher performance. Consequently, the electrolytic solution of the present invention is preferably an electrolytic solution having a voltage endurance of 7 V to 13.8 V (based on lithium), more preferably an electrolytic solution having a voltage endurance of 8 V to 13.8 V (based on lithium), and furthermore preferably an electrolytic solution having a voltage endurance of 10 V to 13.8 V (based on lithium).

The range of the voltage endurance can be determined by measuring the decomposition potential through linear sweep voltammetry (LSV) as will be described below.

In the linear sweep voltammetry, a decomposition potential is measured when an electric current of 0.1 mA (12.7 $mA/cm^2$) flows by using a tripolar type electrochemical cell including a propylene carbonate solution or γ-butyrolactone solution with a prescribed electrolyte concentration (total of the ionic compound (1) and the other electrolytes) as an electrolytic solution, a glassy carbon electrode (electrode surface area: 1 mm ϕ (0.785 $mm^2$) as a work electrode, an Ag electrode as a reference electrode, a platinum electrode as a counter electrode and a salt bridge; and a standard voltammetry tool ("HSV-100" or "HSV-3000", both manufactured by Hokuto Denko Corporation) in a dry room at a temperature of 20° C., a sweeping speed of 100 mV/s, and a sweeping range of −5V to 10 V (vs. Ag/Ag$^+$). In the case of scanning to the potential side higher than the natural potential, an oxidation decomposition potential can be measured and in the case of scanning to the potential side lower than the natural potential, a reduction decomposition potential can be measured. The concentration of the electrolytic solution is set to be 1 mol/L in the case where the cation $M^{n+}$ is an onium cation, and it is set to be 0.7 mol/L in the case where the cation $M^{n+}$ is an inorganic cation (e.g., metal cation or the like).

In the voltage endurance evaluation, it can be confirmed that the electrolytic solution is an electrolytic solution with higher performance by setting the standard current value to further lower than 0.1 mA. That is, it can be said that it is an electrolytic solution with high performance in which an even very slight current is not observed in the case where the measurement is carried out in the LSV measurement conditions.

The present invention also include an electrolytic solution having a voltage endurance of 0 V or more and lower than 6.9 V (vs. Li/Li$^+$) when the LSV measurement is carried out in the conditions which are the same as those described above, except that the electrolytic solution contains the ionic compound (1) represented by formula (1): $M^{n+}([B(CN)_{4-m}Y_m]^-)_n$ and a solvent and the standard electric current value is set to be 0.1 mA. Except the standard electric current value, the LSV measurement conditions are as described above, and the expression "having a voltage endurance of 0 V or more and lower than 6.9 V (vs. Li/Li$^+$)" means that no current equal to or higher than the standard electric current value (0.1 mA) flows in a range of 0 V or more and lower than 6.9 V in the case where the LSV measurement is carried out in the conditions as described above; that is, it means that the electrolytic solution does not decompose.

In the voltage endurance evaluation in a range of 0 V or more and lower than 6.9 V (Li/Li$^+$), it can be confirmed that the electrolytic solution is an electrolytic solution with higher performance by similarly setting the standard current value to further lower than 0.1 mA.

3-2. Electrolytic Material (ii) and Electrolytic Material (iii)

Next, the electrolytic materials (ii) and (iii) will be described. Both of the electrolytic materials (ii) and (iii) contain the ionic compound (1). Herein, the ionic compound (1) contained in the electrolytic materials (ii) and (iii) is preferably a compound having an inorganic cation as the cation $M^{n+}$. Examples of the ionic compound (1) contained in the electrolytic materials (ii) and (iii) include lithium tricyanomethoxyborate, lithium tricyanoethoxyborate, sodium tricyanomethoxyborate, magnesium bis(tricyanomethoxyborate), lithium tricyanoisopropoxyborate, lithium tricyanobutoxyborate, lithium tricyanophenoxyborate, lithium tricyano(pentafluorophenoxy)borate, lithium tricyano(trimethylsiloxy)borate, lithium tricyano(hexafluoroisopropoxy)borate, lithium tricyanomethylthioborate, lithium dicyanodimethoxyborate, lithium cyanotrimethoxyborate, and the like. Among them, preferred are lithium tricyanomethoxyborate, lithium tricyanoethoxyborate, lithium tricyanophenoxyborate, and lithium tricyanobutoxyborate.

3-2-1. Electrolytic Material (ii)

The electrolytic material (ii) of the present invention contains the ionic compound (1) represented by general formula (1) described above and a solvent, and has a feature in that the concentration of the ionic compound in the electrolytic material (ii) is 1% by mass or more and the content of water is 50 ppm or lower.

The present inventors have made investigations on the characteristics of the ionic compound represented by general formula (1) described above, and found that the water content in the electrolytic material (ii) causes an effect on the electrolytic solution and further on the deterioration of electrochemical characteristics of the electrical storage device such as a voltage endurance property and cycle performance. The present inventors have further made investigations in order to provide an ionic compound which hardly deteriorates such characteristics, and consequently found that if the content of water in the electrolytic material (ii), which contains the ionic compound represented by general formula (1) and a medium such that the concentration of the ionic compound is 1% by mass or more, is about 50 ppm or lower (mass basis, the same shall apply hereinafter), the characteristics of the ionic compound are hardly deteriorated and as a result, the deterioration of constituent members and electrochemical characteristics of various electrical storage devices using the ionic compound is hardly caused.

It is supposed that the water contained in the electrolytic material is water remained, the remained water being used, for example, at the time of the synthesis reaction of the ionic compound (1) or at the time of purification in the production process of the electrolytic material, or being contaminated from environments such as air due to humidity absorption. The electrolytic material of the present invention may be used for an electrolytic solution for various electrical storage devices; however, if the electrolytic material contains water, the water lowers the voltage endurance property of an electrolytic solution or the water is electrolyzed during operation of an electrical storage device and hydrogen ions are produced and therefore, pH of the electrolytic solution is lowered (acidic). As a result, there cause the problems that the acidic component produced in the electrolytic solution dissolves electrode materials, allows to react with or corrodes electrode materials so that the performance of the electrical storage device is deteriorated. Further, at the time of electrolysis of water, gas is generated and owing to this, the inner pressure of various electrical storage devices with a sealed structure is increased, and it may result in deformation or breakage. For this reason, the devices not only may become unusable but also may cause a problem in terms of safety.

Consequently, it is better as the content of water is lower, and the water content in the electrolytic material (ii) is preferably about 30 ppm or lower, more preferably about 20 ppm or lower, furthermore preferably about 15 ppm or lower, and particularly preferably about 10 ppm or lower. In addition, the lower limit of the content of water is not particularly limited, and most preferably 0 ppm; however it is technically difficult to decrease the content of water to 0 ppm and it may be undesirable because of economical reasons. Consequently, the lower limit of the content of water contained in the electrolytic material (ii) of the present invention may be about 0.1 ppm. It is because if the water content is about 0.1 ppm, the effect on the characteristics of the electrolytic material (ii) is small. The lower limit may be about 1 ppm. It is because in this case, significant characteristic deterioration is hardly observed and any particular problem on practical use is scarcely caused.

The content of water in the present invention is, for example, a value measured by the procedure described in Examples below by using a Karl Fischer water content measurement apparatus (e.g., Karl Fischer Moisture Titrator manufactured by Hiranuma Sangyo Corporation) according to a coulometric titration method or a volumetric titration method.

The medium is not particularly limited, and examples thereof include a non-aqueous solvent, a polymer, a polymer gel, and the like. As the non-aqueous solvent, preferred is a solvent having a high dielectric constant, high solubility for the ionic compound (1), a boiling point of 60° C. or higher, and a wide electrochemical stability range. More preferable examples thereof include aprotic organic solvents with low water content. Examples of the organic solvents that can be preferably used include aprotic solvents exemplified in the description of the electrolytic material (i).

Examples of the polymer used as the medium include polyether-based polymers such as polyethylene oxide (PEO) and polypropylene oxide, which are homopolymers and copolymers of epoxy compounds (ethylene oxide, propylene oxide, butylene oxide, ally glycidyl ether, etc.); methacrylic polymers such as polymethyl methacrylate (PMMA); nitrile-based polymers such as polyacrylonitrile (PAN); fluorine-based polymers such as polyvinylidene fluoride (PVDF), polyvinylidene fluoride-hexafluoropropylene; their copolymers; and the like. A polymer gel obtained by mixing these polymers and other organic solvents may also be used as the medium of the present invention. Examples of the other organic solvents include the aprotic solvents described above.

Examples of a production process of the electrolytic material (ii) using the polymer gel as the medium include a process of dropping a solution obtained by dissolving the ionic compound (1) in the aprotic solvent on a polymer formed by a conventionally known process and thereby impregnating and supporting the polymer with the ionic compound (1) and the aprotic solvent; a process of melting and mixing the polymer and the ionic compound (1) at a temperature of the melting point of the polymer or higher, thereafter forming a film, and then impregnating the film with the aprotic organic solvent; a process of mixing a solution obtained previously dissolving the ionic compound (1) in an organic solvent with a polymer, thereafter forming the mixture into a film by a casting method or a coating method, and evaporating the organic solvent (these are gel electrolytes); and a process of melting and mixing a polymer and the ionic compound (1) at a temperature of the melting point of the polymer or higher and thereafter mixing and forming the melt (true polymer electrolyte); and the like.

The amount of the medium is preferably adjusted such that the concentration of the ionic compound (1) in the electrolytic material (ii) of the present invention is 1% by mass or more and the saturated concentration or lower. For example, the saturated concentration of lithium tricyanomethoxyborate to γ-butyrolactone is 20.2% by mass. The concentration of the ionic compound (1) in the electrolytic material (ii) is more preferably 5% by mass or more, and furthermore preferably 6% by mass or more; and more preferably 30% by mass or lower, and furthermore preferably 25% by mass or lower.

3-2-2. Electrolytic Material (iii)

The present invention also includes an electrolytic material (iii) containing the ionic compound represented by general formula (1) described above and having a water content of about 2000 ppm or lower.

Similarly to the electrolytic material (ii), in the case where the electrolytic material (iii) contains water, the water lowers the voltage endurance property of an electrolytic solution and accordingly becomes a cause of a defect of an electrochemical device using the electrolytic material (iii). Consequently, it is better as the content of water is lower, and the water content in the electrolytic material (iii) of the present invention is preferably about 1500 ppm or lower, more preferably about 1000 ppm or lower, furthermore preferably about 800 ppm or lower, still more preferably about 600 ppm or lower, still further preferably about 500 ppm or lower, still further preferably about 300 ppm or lower, particularly preferably about 200 ppm or lower, particularly further preferably about 150 ppm or lower, and most preferably about 100 ppm or lower. In addition, the lower limit of the content of water is not particularly limited, and most preferably 0 ppm; however it is technically difficult to decrease the content of water to 0 ppm and it may be undesirable because of economical reasons. Consequently, the lower limit of the content of water in the present invention may be about 0.1 ppm. It is because if the water content is about 0.1 ppm, the effect on the characteristics of the ionic compound contained in the electrolytic material (iii) is small. The lower limit may be about 1 ppm. It is because in that case, significant characteristic deterioration is hardly observed and any particular problem on practical use is scarcely caused.

It is sufficient that the electrolytic material (iii) of the present invention contains the ionic compound (1). Accordingly, in the present invention, it is desirable that the water content in the ionic compound (1) (solid state) is within the above-mentioned range.

The water content in the electrolytic material (iii) can also be measured by the method described in Examples below, similarly to the case of the electrolytic material (ii).

A method for setting the water content of the electrolytic material within the above-mentioned range is not particularly limited. For example, the electrolytic materials (ii) and (iii) containing ionic compound (1) with decreased water content can be obtained by employing the production process described below.

It is preferable, in the electrolytic materials (ii) and (iii) of the present invention, that an electrolytic solution prepared by dissolving the electrolytic material (ii) or (iii) in a solvent (medium) for an electrical storage device so as to have a concentration of the ionic compound (1) in a range of 5% by mass to saturated concentration has a peak electric current value of 2 mA/cm$^2$ or lower observed in a range of 3.8V to 13.8V (v.s. Li/Li$^+$) (=0 to 10.0V v.s. Ag/Ag$^+$) when it is measured by linear sweep voltammetry in conditions of a sweeping range of natural potential to 10 V and a sweeping speed of 100 mV/sec, using a tripolar type electrochemical cell including a glassy carbon electrode as a work electrode, an Ag electrode as a reference electrode, and a platinum electrode as a counter electrode.

Herein, the "solvent for an electrical storage device" may be a solvent selected from lactone-based solvents and carbonate-based solvents, and the solvents may be used alone or two or more of them may be used in combination. Examples of the solvent include, but are not limited to, one or more solvents or mixed solvents selected from the group consisting of γ-butyrolactone, propylene carbonate, ethylene carbonate, and ethyl methyl carbonate.

Examples of the electrolytic solution used for the LSV measurement include those obtained by dispersing or dissolving the electrolytic material (ii) or (iii) in a solvent for an electrical storage device; and ionic compound (1) solutions (electrolytic material (ii)) obtained by using a solvent used as the solvent for an electrical storage device selected from lactone-based solvents and/or carbonate-based solvent and carrying out a step (ii) and/or a step (iii) in such a manner that the concentration of the ionic compound (1)

becomes 7% by mass according the production process described below. In the present invention, the peak electric current value observed in the case where LSV measurement is carried out for the electrolytic solutions preferably falls within the above-mentioned range.

As described above, since the electrolytic materials (ii) and (iii) of the present invention have a decreased water content, decomposition of the electrolytic solution attributed to water is hardly caused, and even if the potential is scanned to the higher potential side as high as 13.8 V on a lithium basis, the peak electric current value (decomposition electric current value) observed can be suppressed to be low. Consequently, it is understood that the electrolytic materials (ii) and (iii) of the present invention are usable as an electrolytic solution material or an electrolytic solution excellent in voltage endurance property. Additionally, since the voltage endurance property is more excellent as the peak electric current value is lower, the peak electric current value is more preferably 1.5 mA/cm$^2$ or lower, and furthermore preferably 1.3 mA/cm$^2$ or lower. It is particularly preferably 1.0 mA/cm$^2$ or lower.

In the case where LSV measurement is carried out for electrolytic solutions prepared by dissolving the electrolytic materials (ii) and (iii) in solvents, it is preferable that the water derived from the solvents does not affect the measurement value. Specifically, dehydrated grade solvents with a water content of 30 ppm or lower are used as the solvents used for the LSV measurement.

The electrolytic materials (ii) and (iii) of the present invention may contain the ionic compound represented by general formula (1) described above and a medium, or may only contain the ionic compound (1); however may contain other electrolytes other than the ionic compound (1). Use of the other electrolytes can increase the absolute amount of ions in the electrolytic material and can improve the electric conductivity in an ionic conductive material using the electrolytic material of the present invention.

The other electrolytes are preferably those having a high dissociation constant in an electrolytic solution and having anions hardly solvated in an aprotic solvent described below. Examples of cationic species and anionic species constituting the other electrolytes include those which are the same as those exemplified in the description of the electrolytic material (i).

Specifically, those described below are preferable as the other electrolytes: alkali metal salts and alkaline earth metal salts of trifluoromethanesulfonic acid such as $LiCF_3SO_3$, $NaCF_3SO_3$, and $KCF_3SO_3$; alkali metal salts and alkaline earth metal salts of perfluoroalkanesulfonic acid imide such as $LiC(CF_3SO_2)_3$, $LiN(CF_3CF_2SO_2)_2$, and $LiN(FSO_2)_2$; alkali metal salts and alkaline earth metal salts of hexafluorophosphoric acid such as $LiPF_6$, $NaPF_6$, and $KPF_6$; alkali metal and alkaline earth metal perchlorates such as $LiClO_4$ and $NaClO_4$; tetrafluoroboric acid salts such as $LiBF_4$ and $NaBF_4$; alkali metal salts such as $LiAsF_6$, LiI, $LiSbF_6$, $LiAlO_4$, $LiAlCl_4$, LiCl, NaI, $NaAsF_6$, and KI; perchloric acid quaternary ammonium salts such as tetraethylammonium perchlorate; tetrafluoroboric acid quaternary ammonium salts such as $(C_2H_5)_4NBF_4$ and $(C_2H_5)_3(CH_3)NBF_4$; quaternary ammonium salts such as $(C_2H_5)_4NPF_6$; quaternary phosphonium salts such as $(CH_3)_4P.BF_4$ and $(C_2H_5)_4P.BF_4$; and the like. Among them, alkali metal salts and/or alkaline earth metal salts are preferable. From the viewpoint of solubility and ion conductivity in an aprotic organic solvent, $LiPF_6$, $LiBF_4$, $LiAsF_6$, alkali metal salts and alkaline earth metal salts of perfluoroalkanesulfonic acid imide, and chain quaternary ammonium salts are preferable, and from the viewpoint of reduction resistance, chain quaternary ammonium salts are preferable. As the alkali metal salts, lithium salts, sodium salts, and potassium salts are preferable, and as the alkaline earth metal salts, calcium salts and magnesium salts are preferable. More preferred are lithium salts.

The presence amount of the other electrolytes is preferably 0.1% by mass or more and 90% by mass or lower in total 100% by mass of the ionic compound represented by formula (1) described above and the other electrolytes. If the amount of the other electrolytes is too small, effects obtained by use of the other electrolytes (e.g., the absolute amount of ions cannot be sufficient and the electric conductivity may be low) may hardly be attained, and if the amount of the other electrolytes is too large, the ion transfer may be inhibited considerably. It is more preferably 1% by mass or more and furthermore preferably 5% by mass or more; and preferably 80% by mass or lower and more preferably 70% by mass or lower.

3-2-3. Production Process for Electrolytic Materials (ii) and (iii)

A production process for electrolytic materials (ii) and (iii) is a production process for the above-mentioned electrolytic materials (ii) and (iii) and has a feature of mixing the ionic compound represented by general formula (1) described above with the solvent selected from lactone-based solvents and/or carbonate-based solvents and thereafter (i) a step of carrying out distillation and/or (ii) a step of bringing the obtained solution into contact with a molecular sieve.

The ionic compound (1) contained in the electrolytic materials (ii) and (iii) of the present invention has extreme high affinity with water that it is difficult to sufficiently lower the water content in the ionic compound (1) even continuous heating at a temperature exceeding 100° C. under vacuum. Therefore, the present inventors have made various investigations on a method for decreasing the water content and found that the water content can be efficiently lowered by treating the ionic compound (1) in a state of being dissolved in an organic solvent. However, in the case of an organic solvent with a boiling point lower than that of water, there is a problem that the solvent is removed by distillation prior to water, and in the case of an organic solvent with low solubility of the ionic compound (1), there is a problem that the ionic compound is precipitated during the dewatering treatment and thus the water content is difficult to be lowered sufficiently. Further, it is supposed to be possible to use a polar solvent from the viewpoint of the solubility of the ionic compound; however, in this case, the polar solvent remains in the ionic compound after drying. In the case where the ionic compound contains a polar solvent, if it is used for an electrochemical use, there occur the problems of abnormal current generation due to decomposition of the solvent and deterioration of the electrochemical characteristics such as deterioration of ion conductivity. The present inventors have therefore made further investigations and surprisingly found it possible to obtain an electrolytic material in which the ionic compound precipitation is prevented and at the same time the water content is lowered, and the electrochemical characteristics are hardly deteriorated even in the electrochemical use, if (i) a distillation step and/or (ii) a contact step with a molecular sieve is carried out in the state where ionic compound is dissolved in the solvent selected from lactone-based solvents and carbonate-based solvents which is also used as a solvent for an electrolytic solution.

A production process for the ionic compound (1) is not particularly limited, and for example, the above-mentioned production processes [1] to [3] may be employed for the production.

Solubility ionic compound (1) is high compared to other solvents, for boiling point is relatively high, the use of carbonate-based solvents or lactone-based solvents, ionic compounds carbonate-based solvents and lactone-based solvent, (it is possible while suppressing the precipitation of 1) reducing the water content efficiently. Moreover, since it is also used as a solvent of the electrolyte solution for a variety of storage devices, ionic compound (1), electrolyte material (i), carbonate-based solvent and a lactone-based solvent may remain in the (ii) in further, it is intended impact on the electrochemical properties is small. Furthermore, since it can be used for electric storage device uses an electrolytic solution such as ionic compounds moisture content is reduced through steps (i) and/or the step (ii): (1) solution to obtain a merit on the process I can.

As the lactone Specific solvent, γ-butyrolactone, γ-valerolactone, δ-valerolactone, γ-caprolactone, α-aceto lactone, β-propiolactone and the like. And also may be used alone or may be used in combination of two or more lactone-based solvent. Among the lactone-based solvent, γ-butyrolactone, γ-valerolactone is preferred.

Examples of carbonate-based solvents, dimethyl carbonate (dimethyl carbonate), diethyl carbonate (diethyl carbonate), ethyl methyl carbonate (ethyl methyl carbonate), diphenyl carbonate, carbonate methylphenyl, ethylene carbonate and propylene carbonate. And also may be used alone or may be used in combination of two or more carbonate-based solvent. Among the carbonate-based solvents, propylene carbonate, ethylene carbonate, ethyl methyl carbonate is preferred.

In addition, it may be used in combination as necessary carbonate-based solvent and the lactone-based solvent.

Alternatively, the ionic compound to be mixed with the solvent thereof (1), all of the solvent part or be used as a solution ionic compound containing a solvent used in the purification process of the other (1) synthetic or after removal, it may be mixed with the carbonate-based solvent, or lactone-based solvent.

The preferred amount of the carbonate-based solvent, 1 to one million parts by weight 100 parts by weight—(1) with respect to 100 parts by weight of ionic compounds contained in the solution ionic compound (1) and lactone-based solvents and/or is a 100 000 parts by weight to 100 parts by mass and more preferably between a 10000 parts by weight to 100 parts by mass and more preferably between. If the use amount of the solvent is too small, sometimes it is difficult to remove enough moisture ionic compound would precipitate may productivity is reduced if it is too large.

The mixed solution of the carbonate-based solvents ionic compound (1) and lactone-based solvents and/or other solvents may be included. And also, even those contained in the reaction solution, other solvents may also be intended to be mixed ionic compound (1) with the carbonate-based solvents and lactone-based or solvent.

Solvent, and as the other solvents, for example, ester solvents (aromatic) hydrocarbon solvents, such as ethyl acetate and butyl acetate cyclohexane or hexane, or toluene, or acetone used in the purification step or another the synthetic halogen-containing solvents ketone solvent of methyl ethyl ketone, methylene chloride and chloroform, chlorobenzene, dichlorobenzene and the like, nitrile solvents valeronitrile such as acetonitrile, ether solvents, amide solvents, alcohol solvents and the like.

The amount of other solvents is not particularly limited, for the reasons described above, in the course of performing step (ii) to (dehydration step), other solvents are distilled off (i) and/or later it's is preferred, finally, to carry out step (ii) (i) and/or in a state of dissolved ionic compound is (1) a carbonate-based solvent and the lactone solvent and/or is recommended.

3-2-3-1. (I) Distillation Step

Distillation step (i), after mixing with the carbonate-based solvents and lactone-based solvents and/or ionic compounds represented by the above general formula (1), to perform distillation was subjected to a distillation apparatus the mixed solution. In the distillation step is a step of distilled off the lactone solvents, together with the carbonate-based solvent, and water (solvent or the like used in the purification step or synthetic) solvent of the other contained in the mixed solution. No particular limitation is imposed on the distillation operation can be used in the present invention may, format using a thin film evaporator, fractional distillation format provided a distillation column and a reflux ratio of certain distillate from the distillation column and a single distillation format where distillation format withdrawing while returning to the tower, concentrated moisture to reflux tank holding at total reflux distillation column, the components of the reflux tank is stable, distilled form which performs the extraction batch in a short time, and the like. By repeating the extraction mass and total reflux, it is possible to further remove moisture. Time is kept in total reflux vary distillation equipment, but it can be longer than twice the liquid is distilled from the top of the tower relative to the liquid amount of the reflux tank is preferred. The apparatus used in the distillation step, of which those both with a known heating means is preferred.

Preferably to above 30° C., and 250° C. below the heating temperature of the mixed solution, 40° C. or more, more preferably less than 200° C., 50° C. or more, it is 150° C. or less. Temperature is too low, may be difficult to reduce the water content sufficiently, while there is a possibility that the temperature is too high, the solvent and (1) an ionic compound is decomposed. It may be carried out under reduced pressure distillation. This is because possible to reduce the water content efficiently, even at a low temperature by controlling the degree of pressure reduction. The degree of reduced pressure, preferably for example, is to the 20 kPa or less, more preferably 10 kPa or less, more preferably 5 kPa or less.

Execution time of the distillation step is not particularly limited, a solvent or distillation amount, a predetermined, may be performed a distillation concentration ionic compound (1) reaches the desired value. Thus, it is possible to obtain a (electrolyte) ion conducting material comprising an ionic compound of the desired concentration (1).

3-2-3-2. Contacting Step of (ii) and Molecular Sieves

After mixing step of contacting the molecular sieve in (ii), and a lactone-based solvent and the ionic compound represented by the general formula (1), is contacted with the molecular sieve to the mixed solution.

Here, the molecular sieve, the general formula is (M', it is a valence of M, $M'_{2/q}O.Al_2O_3.xSiO_2.yH_2O$ metal cation alkali metal, alkaline earth metal or the like, q is 1 it is represented by the) showing a ~2. I could use any type Toraishibu like the shape of the molecular sieve is not particularly limited, cylindrical powder, sphere (bead) form, columnar (pellet form), a plurality of combined. Molecular sieves may also comprise a binder component in a range that does not affect the electrochemical properties of the ionic compound, if necessary. And also may be used after synthesis, molecular sieve may be used commercially. Furthermore, it may be used after applying the baking process if necessary. The molecular sieves concrete, average pore diameter as the basic type 3A, 4A type, 5A type, the 13X type may be mentioned molecular sieves (notarized value) 3~10 Å. With less elution component of metal cation and the like are preferable from the viewpoint of device used for the battery. Incidentally, those containing Li as a metal cation Among them, I is preferably used for in the contacting step after the metal cation of the molecular sieve derived even if the residual effect on the performance of the electric storage device is low. In the present invention, the processing may be performed to replace the metal cations, the other cation M', where necessary, be included in the molecular sieve.

The present invention is not particularly limited, the amount of the molecular sieve may be suitably determined depending on the amount of moisture contained in the mixture or the ionic compounds, for example, molecular sieve 0 to 100 parts by mass of the mixed solution preferably to 10000 parts by weight 0.01 parts by weight—is a 1000 parts by weight 0.05 parts by weight more preferably, is 100 parts by mass 0.1 parts by mass and more preferably between. May be difficult to reduce the water content sufficient amount of molecular sieve is too small, even with a large amount of moisture reduction effect commensurate with the amount used is hardly seen.

Contacting manner with molecular sieve and mixed solution is not particularly limited as long as a molecular sieve (1) an ionic compound into contact, but in order to obtain a good dewatering efficiency, the method is updated mixed solution in contact with the molecular sieve it is preferred. The contacting a specific embodiment, for example, aspect was mixed with molecular sieve and mixed solution, stirred; aspects passing an ionic compound solution to the packed bed of the molecular sieve; like. For in the embodiment to pass through an ionic compound solution to the filling layer, by passing it through if necessary, repeat the ionic compound solution of the same packed bed, and be reduced further the water content of the solution in the I could. Among the above aspects, aspects of passing the ionic compound solution to the packed bed of the molecular sieve, must be provided (solid-liquid separation step filtration, sedimentation, and centrifugation) separation step with molecular sieve and an ionic compound solution no, step is not complicated, is particularly suitable in implementation in actual operation level.

Preferably the temperature at which it is brought into contact with the molecular sieve and the mixed solution's is −40° C.~200° C., is −20° C.~100° C. more preferably from 0° C.~50° C. more preferably. Contact time is not particularly limited, preferably to 72 hours or less from the viewpoint of production efficiency, more preferably 24 hours or less, preferably 6 hours or less.

In addition, molecular sieves after use, may also be reused by the heat treatment. The reproduction condition of the molecular sieve, for example, a method in which high-temperature treatment after the inert gas flow under such as nitrogen, was pre-heated at a lower temperature, and a method for heat treatment 200° C. or the like, but is not particularly limited does not.

By following the contacting step with the molecular sieve, if necessary, to carry out solid-liquid separation, solution containing (1) an ionic compound is obtained.

It is recommended that the steps (i) and (ii) are carried out successively to the synthesis of the ionic compound and other purification steps. The effect of lowering the water content by the steps (i) and (ii) is obtained even in the case where these steps are not carried out successively to the synthesis step. Consequently, the steps (i) and (ii) may be carried out after the ionic compound (1) in a solid state is mixed with and dissolved in a lactone-based solvent and/or a carbonate-based solvent in the case where the ionic compound (1) in a solid state contains water, or the steps may be carried out for a solution containing a ionic compound (1) which is made available in the form of a solution. The effect of decreasing the water content is sufficiently obtained by carrying out either the step (i) or the step (ii), and the steps may be carried out in combination.

Carrying out the step (i) or (ii) gives a solution containing the ionic compound (1) with water content decreased to 50 ppm or lower. The solution containing the ionic compound (1) can be used as it is for various purposes since the water content is lowered. That is, according to the present invention, an increase in content of water derived from a solvent can be prevented as compared with the case where a solid-state ionic compound is dissolved in a solvent. Herein, since the lactone-based solvent and/or the carbonate-based solvent corresponds to the above-mentioned medium, the ionic compound (1) solution obtained by being subjected to the step (i) or (ii) corresponds to the electrolytic material (i) or (ii) of the present invention.

After the step (i) and/or the step (ii), the solvent may be removed by distillation from the obtained ionic compound (1) solution to give an ionic compound in a solid state for the purpose of improving the stability at the time of storage or facilitating distribution of a product. Herein, the ionic compound in a solid state corresponds to the electrolytic material (iii).

A method for obtaining the ionic compound (1) in a solid state is not particularly limited, and examples thereof include (a) a method for heating the ionic compound (1) solution until the ionic compound (1) is precipitated, separating the precipitate, and then drying the precipitate to solidify (powder) the precipitate; (b) a method for removing the lactone-based solvent and/or the carbonate-based solvent by distillation from the ionic compound (1) solution to be concentrated, allowing the concentrated solution to stand still while cooling the concentrated solution if necessary to precipitate the ionic compound (1), separating the precipitate, and then drying the precipitate to solidify the precipitate; (c) a method for precipitating the ionic compound (1) by adding a solvent to the above-mentioned concentrated solution, separating the precipitate, and then drying the precipitate to solidify the precipitate; (d) a method for removing the lactone-based and/or the carbonate-based solvent by distillation while adding a poor solvent with a higher boiling point, and carrying out solid-liquid separation for the resulting slurry; (e) a method for heating the ionic compound (1) solution until the solvent is removed, and then drying the solution to solidify the solution; and the like.

The drying method for the ionic compound (1) is not particularly limited, and a conventionally known drying apparatus can be used. The temperature is preferably set to be 0° C. to 400° C. at the time of drying. It is more preferably 10° C. or higher, furthermore preferably 20° C. or higher; and preferably 300° C. or lower and more preferably 200° C. or lower.

The drying of the ionic compound (1) may be carried out while supplying a gas to a drying apparatus. Examples of a usable gas include dry inert gases such as nitrogen and argon, and dry air.

It is expected that the electrolytic materials (i) to (iii) of the present invention containing the ionic compound (1) are used as electrochemical materials for electrolytic solutions used for primary batteries, batteries having charge-discharge mechanism such as lithium (ion) secondary batteries and fuel cells, as well as various electrical storage devices such as electrolytic capacitors, electric double layer capacitors, and solar cells; and also used as conductivity providing agents for polymers based on the electrochemical characteristics and the thermal stability. Especially, the electrolytic materials (ii) and (iii) of the present invention are particularly preferably applied for the above-mentioned uses since the water content therein is lowered. The structure of the electrical storage device is not particularly limited, and the electrolytic material of the present invention can be applied for known electrical storage devices.

4. Electrical Storage Device

The electrolytic materials (i) to (iii) of the present invention are used preferably as an electrolytic solution or electrolytic solution material for various electrical storage devices. Examples of an electrical storage device using the electrolytic solution of the present invention include primary batteries, batteries having charge-discharge mechanism such as lithium (ion) secondary batteries and fuel cells, as well electrolytic capacitors, electric double layer capacitors, lithium ion capacitors, solar cells, and the like, and among them, (1) lithium ion secondary battery, (2) electrolytic capacitor, (3) electric double layer capacitor, and (4) lithium ion capacitor will be described more in detail.

(1) Lithium Ion Secondary Battery

A lithium ion secondary battery comprises a positive electrode, a negative electrode, a separator interposed between the positive electrode and the negative electrode, and an electrolytic solution as basic constituent elements. The lithium ion secondary battery of the present invention has a feature of having the electrolytic solution of the present invention as the electrolytic solution in the above basic constitution. The lithium ion secondary battery having the above-mentioned constitution can be operated stably even if charge/discharge are carried out repeatedly under high voltage.

As such a lithium ion secondary battery, preferred are non-aqueous electrolytic lithium ion secondary batteries, which are lithium ion secondary batteries other than aqueous electrolytes. The lithium ion secondary battery has a carbon material such as graphite as a negative electrode active material described below and a compound containing a metal oxide such as $LiCoO_2$ as a positive electrode active material. In such a lithium ion secondary battery, at the time of charge, for example, reaction of $C_6Li \rightarrow 6C+Li+e$ is caused in the negative electrode, and the electrons (e) generated in the negative electrode surface are transferred to the positive electrode surface by ionic conduction in the electrolytic solution, and on the other hand, for example, reaction of $CoO_2+Li+e \rightarrow LiCoO_2$ is caused in the positive electrode surface and thus the electric current flows from the negative electrode to the positive electrode. On the other hand, at the time of discharge, reverse reactions to those at the time of charge are caused to flow the electric current from the positive electrode to the negative electrode. As described above, electricity is stored or supplied by chemical reactions of ions in the lithium ion secondary battery.

The electrolytic solution to be included in the lithium ion secondary battery of the present invention contains lithium ions, a cyanoborate anion, and an aprotic organic solvent. Lithium ions and a cyanoborate anion respective function as carriers of electric charge in the electrolytic solution. Particularly, a cyanoborate anion is excellent in voltage endurance characteristic (effect of improving voltage endurance characteristic in the positive electrode side) and hard to be decomposed even use under high voltage. Consequently, the lithium ion secondary battery of the present invention can stably be operated even under high voltage, and can be a battery having high energy density.

As the electrolytic solution to be included in the lithium ion secondary battery of the present invention, the electrolytic solution of the present invention is preferable to be used. The lithium ions and the cyanoborate anion contained in the electrolytic solution of the present invention are derived from a compound containing anion and/or cation. A compound producing these ions may be derived from the ionic compound (1) or may be derived from the other electrolytes. In the case where no lithium ion is contained in the ionic compound (1), the lithium ions contained in the electrolytic solution of the present invention is derived from the other electrolytes.

The concentration of lithium ions in the electrolytic solution is preferably $5.0 \times 10^{-4}$ mass % or more and 5% by mass or lower. It is more preferably $2.5 \times 10^{-3}$% by mass or more and furthermore preferably $1.0 \times 10^{-2}$% by mass or more; and preferably 3% by mass or lower and more preferably 2% by mass or lower. On the other hand, the concentration of the cyanoborate anion is preferably 0.1% by mass or more and 50% by mass or lower. It is more preferably 1% by mass or more and furthermore preferably 5% by mass or more; and preferably 40% by mass or lower and more preferably 30% by mass or lower. In the case where the presence amounts of both lithium ions and the cyanoborate anion in the electrolytic solution is too small, it may become difficult to obtain desired electric conductivity, and on the other hand, if the concentration is too high, the viscosity of the electrolytic solution is increased to lower the electric charge transfer efficiency or the lithium cyanoborate may be precipitated in the electrolytic solution to cause an adverse effect on electrodes or the like, outstandingly particularly in a low temperature range (about −20° C.). Use in a large amount also results in an increase in cost.

The concentration of the ionic compound (1) and the other electrolytes in the electrolytic solution is not particularly limited if the amount of lithium ions and the amount of the cyanoborate anion are within the above-mentioned ranges, and for example, the concentration of an ionic compound (1) in which $M^{n+}$ is an onium cation is preferably 0.01% by mass or more and lower than 50% by mass. In the case where the concentration of the electrolyte is within the above-mentioned range, good electric conductivity is provided and therefore, it is preferable. The concentration of the ionic compound (1) is more preferably 0.05% by mass or more, furthermore preferably 0.1% by mass or more; more preferably 20% by mass or lower, and furthermore preferably 10% by mass or lower. If the electrolyte concentration is too low, it may become difficult to obtain desired electric conductivity, and on the other hand, if the concentration is too high, the viscosity of the electrolytic solution is increased to lower the electric charge transfer efficiency or the ionic compound (1) may be separated and precipitated in the electrolytic solution to cause an adverse effect on electrodes or the like, outstandingly particularly in a low temperature range (about −20° C.). Use in a large amount of the ionic compound (1) also results in an increase in cost.

A polymer electrolyte or a polymer gel electrolytic solution may be used as the electrolyte in the lithium ion secondary battery of the present invention. The polymer gel electrolyte may be one produced by depositing electrolytes on polymers to be a substrate, and examples thereof include a polymer electrolyte obtained by impregnating a polymer with the electrolytic solution of the present invention (polymer gel electrolytic solution) and a polymer electrolyte obtained by forming a solid solution of a substrate polymer with the ionic compound represented by the general formula (1) or the other electrolytes (true polymer electrolyte). In the present invention, it is preferable to use a polymer electrolyte containing lithium ions and a cyanoborate anion. Examples of the polymer to be a substrate of the polymer electrolyte include polyether-based copolymers such as polyethylene oxide and polypropylene oxide, and among them, polyethylene oxide is preferably used.

The lithium ion secondary battery of the present invention comprises a positive electrode, a negative electrode, and an electrolytic solution. A separator is interposed between the positive electrode and the negative electrode in order to prevent short-circuit by contact of both electrodes.

Each of the positive electrode and the negative electrode is constituted by a current collector, a positive electrode active material or a negative electrode active material, a conductive agent, a binder (binder substance) and the like, and each electrode is formed by forming these materials into a thin coating film, a sheet-like form or a plate-like form on a current collector.

The positive electrode is not particularly limited and a conventionally known positive electrode can be used. For example, a positive electrode constituted by a positive electrode current collector, a positive electrode active material, a conductive agent, a binder and the like can be used. Examples of the positive electrode current collector include aluminum and stainless steel. Examples of the positive electrode active material that can be used include $LiNiVO_4$, $LiCoPO_4$, $LiCoVO_4$, $LiCrMnO_4$, $LiCr_xMn_{2-x}O_4$ (0<x<0.5), $LiCr_{0.2}Ni_{0.4}Mn_{1.4}O_4$, $LiPtO_3$, $Li_xFe_2(SO_4)_3$, $LiFeO_2$, $LiMnO_2$, $LiMn_2O_4$, $LiCoO_2$, $LiMn_{1.6}Ni_{0.4}O_4$, $LiFePO_4$, $LiNi_{1/3}Mn_{1/3}Co_{1/3}O_2$, $LiNi_{1/2}Mn_{1/2}O_2$, $LiNi_{0.5}Mn_{1.5}O_4$, $LiNi_{0.8}Co_{0.2}O_2$, $LiNiO_2$, and $Li_{1+x}(Fe_{0.4}Mn_{0.4}Co_{0.2})_{1-x}O_2$, and the like. Among them, preferred are $LiMn_2O_4$, $LiCoO_2$, $LiFePO_4$, $LiCoPO_4$, $LiNiPO_4$, $LiNi_{1/3}Mn_{1/3}Co_{1/3}O_2$, $LiNi_{0.8}Co_{0.2}O_2$, NMC, and NCA(=$Ni_{0.8}Co_{0.15}Al_{0.05}O_2$). In order to improve the output power, a material having a potential as high as 4V or higher is preferable to be used as a positive electrode material. Examples of the material having a high potential include $LiCoO_2$ (4.2 V), $LiCr_xMn_{2-x}O_4$ (0<x<0.5) (4.2 V), $LiCr_{0.2}Ni_{0.4}Mn_{1.4}O_4$ (4.7 V), $LiNi_{0.5}Mn_{1.5}O_4$ (4.7 V), $LiCoPO_4$ (4.8 V), $LiNiPO_4$ (5.1 V), -NMC (4.2 V), and NCA(=$Ni_{0.8}Co_{0.15}Al_{0.05}$)$O_2$ (4.2 V), and the like.

The positive electrode active material is preferably one in the form of a powder (granular) and having a particle diameter of 10 nm or larger and 500 μm or smaller. The particle diameter is more preferably 20 nm or larger and 100 μm or smaller, furthermore preferably 50 nm or larger and 50 μm or smaller, particularly preferably 100 nm or larger and 30 μm or smaller, and even furthermore preferably 10 μm or smaller. Herein, the average particle diameter is a value of volume average particle diameter measured by a laser diffraction particle size distribution measurement apparatus. The nominal value described by a seller may be used as reference.

The negative electrode is not also particularly limited and any of conventionally known negative electrodes used for lithium ion secondary batteries may be used and specifically, those which are constituted by a negative electrode current collector, a negative electrode active material, a conductive agent, a binder and the like are preferable to be used. A negative electrode is formed by forming these materials into a thin coating film, a sheet-like form or a plate-like form on a negative electrode current collector in the same manner as in the case of a positive electrode.

Examples of the negative electrode current collector include copper, nickel, and stainless steel. Examples of the negative electrode active material to be used include conventionally known negative electrode active materials used for lithium ion secondary batteries. Specific examples thereof include carbon materials such as natural graphite, artificial graphite, amorphous carbon, coke, meso-phase pitch type carbon fibers, graphite, hard carbon which is amorphous carbon, and C—Si composite materials; lithium alloys such as lithium-aluminum alloys, lithium-magnesium alloys, lithium-indium alloys, lithium-thallium alloys, lithium-lead alloys, and lithium-bismuth alloy; and metal oxides and metal sulfides containing one or more kinds of metals such as titanium, tin, iron, molybdenum, niobium, vanadium, and zinc. Among them, metal lithium and carbon materials, which can absorb and desorb alkali metal ions, are more preferable.

As the conductive agent, preferred are carbon black such as acetylene black and ketjenblack; natural graphite, thermal expansive graphite, carbon fibers, ruthenium oxide, titanium oxide, and metal fibers of aluminum and nickel. One or more kinds of these materials may be used. Among them, in terms of an efficient improvement in conductivity at a small amount, acetylene black and ketjenblack are more preferable. Although being different in accordance with the kind of the active material to be used, the addition amount of the conductive agent is preferably 1 part by mass to 10 parts by mass, and more preferably 3 parts by mass to 5 parts by mass per 100 parts by mass of the positive electrode active material or the negative electrode active material.

As the binder substance, preferred are polytetrafluoroethylene, polyvinylidene fluoride, carboxylmethyl cellulose, crosslinked polymers of fluoro-olefin copolymers, polyvinyl alcohols, polyacrylic acids, polyimides, petroleum pitch, coal pitch, and phenol resins. One or more kinds of these materials may be used. Although being different in accordance with the kind of the active material to be used, the addition amount of the binder substance is preferably 0.5 parts by mass to 10 parts by mass, and more preferably 3 parts by mass to 5 parts by mass per 100 parts by mass of the positive electrode active material or the negative electrode active material.

As a method of forming the positive electrode or negative electrode, for example, preferred are (1) a method of adding a binder substance to a mixture of a positive electrode active material or negative electrode active material and acetylene black as a conductive agent to be mixed with one another, thereafter applying the resulting mixture to each current collector, and press-forming the resulting current collector; and (2) a method of mixing an electrode active material and a binder substance, molding the mixture to integrate the molded mixture with a current collector, and thereafter subjecting the resulting current collector to heat treatment in an inert atmosphere to obtain a sintered body as an electrode. In the case where an activated carbon fiber cloth obtained by activating a carbon fiber cloth is used, it may be used as an electrode as it is without using a binder substance.

The lithium ion secondary battery of the present invention is preferable to be prevented from contact of the positive electrode and the negative electrode and short-circuit therebetween by a method of interposing a separator between the positive electrode and the negative electrode, a method of setting the respective electrodes face to face at an interval by employing a holding means, or the like.

As the separator, it is preferable to use a porous thin film which does not cause chemical reaction with the ionic compound (1), the other electrolytes or the like in an operating temperature range. As a material for the separator, preferred are paper; organic materials such as polyolefins (polypropylene, polyethylene, etc.) and aramide; organic porous materials such as aramide fibers; inorganic materials such as glass fibers; and the like. Particularly, in the case where an electrical storage device is operated under high voltage, a high insulating property is required and therefore, a separator made of an inorganic material, a polyolefin-based material, or their mixture is preferable. From the viewpoint of the insulating property, preferable as the separator are polypropylene (PP) films, polyethylene (PE) films, and layered films obtained by layering these films (e.g., PP/PE/PP trilayer film); formed bodies of mixtures of polyolefin-based materials and inorganic materials; materials obtained by coating or impregnating porous sheets containing cellulose with the above-mentioned organic materials; and the like.

In addition, an electrolyte such as $LiPF_6$ used for a conventional electrolytic solution is decomposed by even a trace amount of water contained in the electrolytic solution to produce hydrogen fluoride (HF). This hydrogen fluoride not only dissolves the electrode active material but also causes reaction with the inorganic material for a separator such as glass fibers to be dissolved, so that there is a problem that it results in an increase in inner resistance of an electricity storage device. However, if the ionic compound (1) which does not contain fluorine (F) is used as an electrolyte, metal oxides such as ceramics and insulating inorganic materials such as glass fibers may also be used as the separator material. The insulating inorganic materials may be used alone or may be used as a filler in the form of mixtures with organic substances.

The lithium ion secondary battery of the present invention may be sufficient if it is equipped with a positive electrode, a negative electrode, and an electrolytic solution, and may be one equipped with a plurality of cells each of which contains a positive electrode, a negative electrode, and an electrolytic solution as one unit. If equipped with the above-mentioned constitution, the shape of the lithium ion secondary battery of the present invention is not particularly limited, and may be any of conventionally known shapes such as coin-type, rolled cylindrical type, layered rectangular type, and aluminum laminate type. The outer casing is not also particularly limited and conventionally known ones made of aluminum, steel, and the like may be used.

(2) Electrolytic Capacitor

An electrolytic capacitor comprises an anode foil, a cathode foil, an electrolytic paper as a separator interposed between the anode foil and the cathode foil, lead wires, and the electrolytic solution of the present invention as basic constituent elements. As such an electrolytic capacitor, preferred are aluminum electrolytic capacitors. As the aluminum electrolytic capacitor, an aluminum electrolytic capacitor in which a thin oxide coating (aluminum oxide) formed by anodic oxidation on the surface of a surface-roughened aluminum foil having fine unevenness by electrolytic etching is suitably used as a dielectric body.

(3) Electric Double Layer Capacitor

An electric double layer capacitor comprises polarizable electrodes (a negative electrode and a positive electrode) and an electrolytic solution as basic constituent elements. The electric double layer capacitor of the present invention has a feature of having the electrolytic solution of the present invention containing the ionic compound (1) and a solvent as the electrolytic solution in the above-mentioned basic constitution. The ionic compound (1) is desirably a compound having an onium cation as cation $M^{n+}$. The polymer electrolyte or the polymer gel electrolyte may be used as the electrolyte for the electric double layer capacitor of the present invention. The electric double layer capacitor having the above-mentioned constitution has a high positive electrode potential at the time of full charge as compared with a conventional one and can be operated stably even if charge/discharge are carried out repeatedly under high voltage.

In the electric double layer capacitor of the present invention, one of the pair of polarizable electrodes facing to each other functions as a positive electrode and the other functions as a negative electrode. Each of the polarizable electrodes is provided on an electrode current collector and is constituted by a positive electrode active material or a negative electrode active material, a conductive agent, a binder (binder substance) and the like, and each electrode is formed by forming these materials into a thin coating film, a sheet-like form or a plate-like form on an electrode current collector.

Examples of the electrode active material include activated carbon such as activated carbon fibers, formed bodies of activated carbon particles, and activated carbon particles; porous metal oxides, porous metals, and conductive polymers. In addition, activated carbon is preferable for the negative electrode, and activated carbon, a porous metal oxide, a porous metal, or a conductive polymer is preferable for the positive electrode. Among them, activated carbon is preferable and activated carbon with an average fine pore diameter of 2.5 nm or smaller is preferable. Herein, the average fine pore diameter is a value measured by BET method based on nitrogen adsorption. Although being different in accordance with the electrostatic capacity per unit surface area ($F/m^2$) of each carbonaceous material and a decrease in bulk density along with increased specific surface area, the specific surface area of the activated carbon is preferably 500 $m^2/g$ to 2500 $m^2/g$ and more preferably 1000 $m^2/g$ to 2000 $m^2/g$ as the specific surface area measured by BET method based on nitrogen adsorption.

As a method for producing the activated carbon, it is preferable that an activation method of carbonizing raw materials such as plant-based wood materials, sawdust, coconut husks, pulp waste solutions, fossil fuel type coal, petroleum heavy oils, coal and petroleum pitch obtained by heat decomposition thereof, petroleum coke, carbon aerogel, meso-phase carbon, fibers obtained by spinning tar pitch, synthetic polymers, phenol resins, furan resins, polyvinyl chloride resins, polyvinylidene chloride resins, polyimide resins, polyamide resins, ion-exchange resins, liquid crystal polymers, waste plastics, used tires, and the like, and thereafter activating the carbonized materials.

Examples of the activated method include (1) a gas activation method of carrying out contact reaction of a carbonized raw material with steam, carbon dioxide gas, oxygen, or other oxidizing gases at a high temperature; and (2) a chemical activation method of evenly impregnating a carbonized raw material with zinc chloride, phosphoric acid, sodium phosphate, calcium chloride, potassium sulfide, potassium hydroxide, sodium hydroxide, potassium carbonate, sodium carbonate, sodium sulfate, potassium sulfate, calcium carbonate, boric acid, nitric acid, and the like; heating the raw material in an inert gas atmosphere; and thus causing dehydration and oxidation reaction of the chemicals, and either one method may be employed.

The activated carbon obtained by the above-mentioned activation method may be subjected to heat treatment for removing unnecessary surface functional groups or developing the crystallinity of carbon to improve the electric conductivity. The heat treatment may be carried out preferably at a temperature of 500° C. to 2500° C. and more preferably 700° C. to 1500° C. under an inert gas atmosphere of nitrogen, argon, helium, xenon, or the like. Examples of the shape of the activated carbon include a crushed shape, a pelletized shape, a granular shape, a fibrous shape, a felt shape, a woven fabric shape, and a sheet shape. Among them, the shape of the activated carbon is preferably a granular shape, and in this case, the average particle diameter of the activated carbon is preferably 30 μm or smaller in terms of an improvement in bulk density of the electrodes and a decrease in inner resistance. Herein, the average particle diameter is a value of volume average particle diameter measured by a laser diffraction particle size distribution measurement apparatus. The nominal value described by a seller may be used as reference.

As the electrode active material, carbon materials other than the activated carbon having the above-mentioned specific surface area may be used, and for example, carbon nanotubes or diamond produced by plasma CVD may be used.

As the conductive agent, preferred are those which are the same as those exemplified, as the conductive agent, in the description of the lithium ion secondary battery. Although being different in accordance with the materials to be used as electrode active materials and their shapes, for example, in the case of using activated carbon, the addition amount of the conductive agent is preferably 5 parts by mass to 50 parts by mass and more preferably 10 parts by mass to 30 parts by mass per 100 parts by mass of the activated carbon.

As the binder substance, preferred are those which are the same as those exemplified, as the binder substance, in the description of the lithium ion secondary battery. Although being different in accordance with the materials to be used as electrode active materials and their shapes, for example, in the case of using activated carbon, the addition amount of the binder substance is preferably 0.5 parts by mass to 30 parts by mass and more preferably 2 parts by mass to 30 parts by mass per 100 parts by mass of the activated carbon.

The electrode current collectors are used for taking out the electric capacity stored in the polarizable electrodes outside. Examples of the electrode current collector include aluminum foil, copper foil, and metal fibers of aluminum and nickel.

As a method of forming the polarizable electrodes (positive electrode and negative electrode), for example, preferred are (1) a method of adding polytetrafluoroethylene as a binder substance to a mixture of activated carbon as an electrode active material and acetylene black as a conductive agent to be mixed with one another, thereafter applying the resulting mixture to each electrode current collector, and press-forming the resulting electrode current collector; (2) a method of mixing activated carbon and a binder substance such as pitch, tar, or a phenol resin, molding the mixture to integrate the molded mixture with a current collector, and thereafter subjecting the resulting current collector to heat treatment in an inert atmosphere to obtain a sintered body as an electrode; and (3) a method of sintering activated carbon and a binder substance or only activated carbon to obtain an electrode. In the case where an activated carbon fiber cloth obtained by activating a carbon fiber cloth is used, it may be used as an electrode as it is without using a binder substance.

The electric double layer capacitor of the present invention is preferable to be prevented from contact of polarizable electrodes and short-circuit therebetween by a method of interposing a separator between polarizable electrodes; a method of setting the respective polarizable electrodes face to face at an interval by employing a holding means, or the like.

As the separator, it is preferable to use porous thin films which do not cause chemical reaction with the ionic compound (1) or the other electrolytes in an operating temperature range. Examples of a material for the separator include nonwoven fabrics made of cellulose fibers such as Kraft paper and Manila paper; fiber materials made of inorganic fibers such as ceramic fibers; porous sheets containing aliphatic polyketone fibers; and porous sheets containing cellulose and being impregnated with a polymer such as latex.

The electric double layer capacitor of the present invention may be sufficient if it has a pair of polarizable electrodes facing to each other with a separator interposed therebetween and the electrolytic solution of the present invention or may be one having a plurality of cells each of which has a pair of polarizable electrodes facing to each other with a separator interposed therebetween and a non-aqueous electrolytic solution as one unit. If equipped with the above-mentioned constitution, the shape of the electric double layer capacitor of the present invention is not particularly limited, and may be any of conventionally known shapes such as coin-type, rolled cylindrical type, layered rectangular type, and aluminum laminate type.

In the electric double layer capacitor of the present invention, electric charge is stored in the electric double layers formed in the interfaces of the polarizable electrodes and the electrolytic solution due to the physical adsorption/desorption of ions. The stored electric charge is taken out as electric energy through the electrode current collectors.

(4) Lithium Ion Capacitor

A lithium ion capacitor is a capacitor with improved energy density based on the principle of a common electric double layer capacitor while using a carbon-based material capable of absorbing lithium ions as a negative electrode material and adding lithium ions thereto. Therefore, charge/discharge principle is different between a positive electrode and a negative electrode, and the capacitor has a structure formed by combining a negative electrode of a lithium ion secondary battery and a positive electrode of an electric double layer capacitor.

The lithium ion capacitor of the present invention has a feature of having a basic constitution of a lithium ion capacitor, that is, having a polarizable electrode (positive electrode), a negative electrode containing a negative electrode active material capable of absorbing and desorbing lithium ions, and also the electrolytic solution of the present invention. The lithium ion capacitor having the above-mentioned constitution can be operated stably even if charge/discharge are carried out repeatedly under high voltage.

The electrolytic solution to be included in the lithium ion capacitor of the present invention preferably contains the ionic compound (1) comprising a lithium ion as cation $M^{n+}$ and an aprotonic organic solvent. Lithium ions and a cyanoborate anion function as carriers of electric charge in the electrolytic solution. Particularly, cyanoborate anion is excellent in voltage endurance characteristic (effect of improving voltage endurance characteristic in the positive electrode side) and hard to be decomposed even use under high voltage. Consequently, the lithium ion capacitor of the present invention can stably be operated even under high voltage, and can be one having high energy density.

The lithium ions and the cyanoborate anion contained in the electrolytic solution of the present invention are derived from a compound containing anion and/or cation. A compound producing these ions may be derived from the ionic compound (1) or may be derived from the other electrolytes. In the case where no lithium ion is contained in the ionic compound (1), the lithium ions contained in the electrolytic solution of the present invention is derived from the other electrolytes.

The concentration of lithium ions in the electrolytic solution is preferably $5.0 \times 10^{-4}$ mass % or more and 5% by mass or lower. It is more preferably $2.5 \times 10^{-3}$% by mass or more and furthermore preferably $1.0 \times 10^{-2}$% by mass or more; and preferably 3% by mass or lower and more preferably 2% by mass or lower. On the other hand, the concentration of the cyanoborate anion is preferably 0.1% by mass or more and 50% by mass or lower. It is more preferably 1% by mass or more and furthermore preferably 5% by mass or more; and preferably 40% by mass or lower and more preferably 30% by mass or lower. In the case where the presence amounts of both lithium ions and the cyanoborate anion in the electrolytic solution is too small, it may become difficult to obtain desired electric conductivity, and on the other hand, if the concentration is too high, the viscosity of the electrolytic solution is increased to lower the electric charge transfer efficiency or the lithium cyanoborate may be precipitated in the electrolytic solution to cause an adverse effect on electrodes or the like, outstandingly particularly in a low temperature range (about $-20°$ C.). Use in a large amount also results in an increase in cost.

The lithium ion capacitor of the present invention comprises a positive electrode (polarizable electrode), a negative electrode, and an electrolytic solution. A separator is interposed between the positive electrode and the negative electrode in order to prevent short-circuit by contact of both electrodes.

Each of the positive electrode and the negative electrode is constituted by a current collector, a positive electrode active material or a negative electrode active material, a conductive agent, a binder (binder substance) and the like, and each electrode is formed by forming these materials into a thin coating film, a sheet-like form or a plate-like form on an electrode current collector.

As the positive electrode active material, activated carbon, a porous metal oxide, a porous metal, or a conductive polymer is preferable. As the activated carbon, preferred are those which are the same as those exemplified, as the activated carbon, in the description of the electric double layer capacitor. As its production process, the same process for the activated carbon in the electric double layer capacitor can be employed.

As the positive electrode active material, carbon materials other than the activated carbon having the above-mentioned specific surface area may be used, and for example, carbon nanotubes or diamond produced by plasma CVD may be used.

As the negative electrode active material, materials capable of absorbing and desorbing lithium ions are used. Preferable examples of the material include thermally decomposed carbon; coke such as pitch coke, needle coke, and petroleum coke; graphite; glassy carbon; organic polymer compound fired bodies obtained by firing and carbonizing phenol resins, furan resins, or the like at a proper temperature; carbon fibers; carbon materials such as activated carbon; polymers such as polyacetylene, polypyrrol, and polyacene; lithium-containing transition metal oxides and transition metal sulfides such as $Li_{4/3}Ti_{5/3}O_4$ and $TiS_2$; metals such as Al, Pb, Sn, Bi, and Si forming alloys with alkali metals; cubic system intermetallic compounds such as AlSb, $Mg_2Si$, and $NiSi_2$ having an interstitial-alkali metal insertion property; and lithium-nitrogen compounds such as $Li_{3-f}G_fN$ (G: transition metal; f: actual number higher than 0 and lower than 0.8). One or more kinds of these materials may be used. Among them, carbon materials are more preferable.

As the conductive agent, preferred are those which are the same as those exemplified, as the conductive agent, in the description of the lithium ion secondary battery. Although being different in accordance with the kinds and shapes of the materials to be used as positive electrode and negative electrode active materials, for example, in the case of using activated carbon, the addition amount of the conductive agent is preferably 5 parts by mass to 50 parts by mass and more preferably 10 parts by mass to 30 parts by mass per 100 parts by mass of the activated carbon.

As the binder substance, preferred are those which are the same as those exemplified, as the binder substance, in the description of the lithium ion secondary battery. Although being different in accordance with the kinds and shapes of the materials to be used as positive electrode and negative electrode active materials, for example, in the case of using activated carbon, the addition amount of the binder substance is preferably 0.5 parts by mass to 30 parts by mass and more preferably 2 parts by mass to 30 parts by mass per 100 parts by mass of the activated carbon.

The electrode current collectors are used for taking out the electric capacity stored in the positive electrode (polarizable electrode) and the negative electrode outside. As the positive electrode current collector, for example, aluminum or a stainless steel is used, and as the negative electrode current collector, for example, aluminum, copper, nickel or the like is used.

As a method of forming the positive electrode or negative electrode, for example, preferred are (1) a method of adding a binder substance to a mixture of a positive electrode active material or negative electrode active material and acetylene black as a conductive agent to be mixed with one another, thereafter applying the resulting mixture to each current collector, and press-forming the resulting current collector; (2) a method of mixing an electrode active material and a binder substance, molding the mixture to integrate the molded mixture with a current collector, and thereafter subjecting the resulting current collector to heat treatment in an inert atmosphere to obtain a sintered body as an electrode; and (3) a method of sintering activated carbon and a binder substance or only activated carbon to obtain an electrode. In the case where an activated carbon fiber cloth obtained by activating a carbon fiber cloth is used, it may be used as an electrode as it is without using a binder substance.

The negative electrode produced in the above-mentioned manner is preferable to absorb lithium ions by a chemical method or an electrochemical method. Consequently, the potential of the negative electrode is lowered and therefore, a wider voltage range can be employed and as a result, the energy density of the lithium ion capacitor is improved. Any of conventionally known methods may be employed as a method of absorbing lithium ions, and examples thereof include a method of carrying out constant current charge while making the negative electrode and the lithium metal face to face with a separator interposed therebetween in an electrolytic solution; and a method of heating the negative electrode and the lithium metal while bringing them into contact with each other in an electrolytic solution.

The lithium ion capacitor of the present invention is preferable to be prevented from contact of the positive electrode and the negative electrode and short-circuit therebetween by a method of interposing a separator between the positive electrode and the negative electrode; a method of setting the respective electrodes face to face at an interval by employing a holding means, or the like.

As the separator, it is preferable to use porous thin films which do not cause chemical reaction with the ionic compound (1), the other electrolytes or the like in an operating temperature range. As a material for the separator, preferred are those exemplified for the separators of the lithium ion secondary battery and the electric double layer capacitor.

The lithium ion capacitor of the present invention may be sufficient if it is equipped with a positive electrode, a negative electrode, and an electrolytic solution, and may be one equipped with a plurality of cells each of which contains a positive electrode, a negative electrode, and an electrolytic solution as one unit. If equipped with the above-mentioned constitution, the shape of the lithium ion capacitor of the present invention is not particularly limited, and may be any of conventionally known shapes such as coin-type, rolled cylindrical type, layered rectangular type, and aluminum laminate type.

The lithium ion capacitor of the present invention comprises a positive electrode and a negative electrode facing to each other with a separator interposed therebetween and an electrolytic solution filling the space between the electrodes as basic constituent elements. In the lithium ion capacitor of the present invention, electric charge is stored in the electric double layers formed in the interface of the positive electrode and the electrolytic solution due to the physical adsorption/desorption of ions. On the other hand, electric charge is stored by absorbing lithium ions in the negative electrode active material of the negative electrode. When the stored electric charge is taken out as electric energy through the electrode current collectors, the ions adhering to the positive electrode are separated from the electrode and lithium ions stored in the negative electrode active material is also desorbed.

The ionic compound (1) of the present invention becomes an ionic liquid which is in a liquid state at 100° C. or lower by selecting the cation $M^{n+}$. Generally, it is known that, because of a characteristic of being a liquid having an ionic bond, an ionic liquid is highly electrochemically and thermally stable and has a property of selectively absorbing a specified gas such as carbon dioxide, and the ionic compound (1) of the present invention is also supposed to have similar characteristics. Consequently, the ionic compound (1) of the present invention is expected to be used, in addition to as electrochemical materials for the above-mentioned various electrical storage devices (as electrochemical materials for electrolytic solutions used for primary batteries, batteries having charge-discharge mechanism such as lithium (ion) secondary batteries and fuel cells, as well as various electrical storage devices such as electrolytic capacitors, electric double layer capacitors, and solar cells), as reaction solvents repeatedly usable for organic synthesis or as sealing agents and lubricants for mechanical movable parts based on high thermal stability, as conductivity providing agents for polymers based on the electrochemical characteristics and the thermal stability, and as gas absorbents for carbon dioxide or the like since having a gas absorbing capability.

EXAMPLES

Hereinafter, the present invention will be described more specifically with reference to Examples. However, the invention is not originally limited to the Examples below. The invention can be naturally carried out by adding appropriate modifications in a range where the modifications can be applied to the foregoing and aftergoing gist, all of which are encompassed within the technical scope of the invention.

Experimental Example 1

NMR Measurement

Using "Unity Plus" (400 MHz) manufactured by Varian, $^1$H-NMR and $^{13}$C-NMR spectra were measured and structural analysis was performed for each sample based on the peak intensities of proton and carbon. "Advance 400 M" (400 MHz) manufactured by Bruker was used for measurement of $^{11}$B-NMR spectra.

The NMR spectra measurement was carried out at room temperature (25° C.) and cumulative number of 64 times by loading each measurement sample obtained by dissolving a reaction solution or a crude product in a concentration of 1% by mass to 5% by mass in deuterated dimethyl sulfoxide in an NMR tube made of aluminum oxide and free from boron element. In the $^1$H-NMR and $^{13}$C-NMR spectra measurement, tetramethylsilane was employed as a standard substance and in the $^{11}$B-NMR spectra measurement, boron trifluoride diethyl etherate was used as a standard substance.

Production Example 1-1

Synthesis of Triethylammonium Tricyanomethoxyborate ($Et_3NHB(CN)_3OMe$)

To a 100 mL capacity three-neck flask equipped with a thermometer and a stirring apparatus, 3.66 g (20.10 mmol) of triethylammonium bromide was added, and the inner gas of the flask was replaced with nitrogen gas. After 42.49 g of 1,2-dichloroethane was added to the flask, further 2.07 g (19.92 mmol) of trimethyl borate was added at room temperature. Next, while stirring the mixed solution, 8.07 g (81.34 mmol, 4.1 equivalents to the boron compound) of trimethylsilyl cyanide was dropped to the flask at room temperature and thereafter the reaction solution was heated to 60° C. in an oil bath and stirred to allow for reaction. The stirring was continued at that temperature for 20 hours.

Thereafter, the organic solvent was removed from the obtained yellow solution by distillation under reduced pressure, the resulting solution was concentrated, and the concentrated solution was cooled to room temperature, and to the obtained oily material was added 26 g of toluene and the mixture was stirred. The crystal precipitated at that time was removed by filtration and the resulting product was washed with 50 g of toluene. The obtained filtrate (toluene layer) was mixed with 40 g of pure water to be separated into layers, and after the water layer was separated, the pure water was removed by distillation to obtain a yellow liquid (triethylammonium tricyanomethoxyborate) (yield amount: 1.85 g (8.32 mmol), yield: 42%).

$^1$H-NMR (d6-DMSO) δ1.22 (t, J=7.2 Hz, 9H), 3.11-3.18 (m, 9H)

$^{13}$C-NMR (d6-DMSO) δ8.80, 49.9, 52.7, 127.7 (q, J=69.5 Hz)

$^{11}$B-NMR (d6-DMSO) δ−18.6 (s)

Production Example 1-2

Synthesis of Triethylmethylammonium Tricyanomethoxyborate ($Et_3MeNB(CN)_3OMe$)

To a 200 mL capacity three-neck flask equipped with a stirring apparatus, 9.84 g (64.90 mmol) of triethylmethylammonium chloride was added, and the inner gas of the flask was replaced with nitrogen gas. Further, 6.74 g (64.90 mmol) of trimethyl borate was added to the flask at room temperature. Next, while stirring the mixed solution, 35.42 g (356.97 mmol) of trimethylsilyl cyanide was added at room temperature. The reaction solution was then heated to 140° C. in an oil bath and heated and stirred for 5 hours. The obtained solution was cooled to room temperature and transferred to a separating funnel and thereafter, 135 g of butyl acetate and 22.5 g of ultrapure water were added thereto. The lower layer (water phase) was extracted by liquid separation extraction and concentrated and dried to obtain a pale yellow liquid (triethylmethylammonium tricyanomethoxyborate (yield amount: 9.30 g (40.24 mmol), yield: 62%).

$^1$H-NMR (d6-DMSO) δ1.20 (tt, J=7.2 Hz, 1.8 Hz, 9H), 2.88 (s, 3H), 3.13 (q, J=4.0 Hz, 3H), 3.25 (q, J=7.2 Hz, 6H)
$^{13}$C-NMR (d6-DMSO) δ8.14, 46.7, 53.2, 55.7, 128.2 (q, J=69.7 Hz)
$^{11}$B-NMR (d6-DMSO) δ−18.6 (s)

Experimental Example 1-1

Synthesis of Triethylammonium Tetracyanoborate ($Et_3NHB(CN)_4$)

After the inner gas of a 50 mL capacity two-neck flask equipped with a stirring apparatus was replaced with nitrogen gas, 1.92 g (10.54 mmol) of triethylammonium bromide and 21.15 g of chlorobenzene were added thereto and the contents were stirred. To the obtained solution was added 2.34 g (10.54 mmol) of triethylammonium tricyanomethoxyborate ($Et_3NHB(CN)_3OMe$) produced in the same manner as in Production Example 1-1 at room temperature. Next, while stirring the mixed solution, 1.05 g (10.54 mmol, 1.0 equivalent to the boron compound) of trimethylsilyl cyanide was dropped thereto at room temperature. On completion of the dropwise addition, after continuously stirred at room temperature for 13 hours, the reaction solution was heated to 120° C. in an oil bath and continuously heated and stirred at that temperature for 54 hours. Thereafter, the obtained black solution was extracted by a syringe and subjected to $^{11}$B-NMR measurement (d6-DMSO), and production of triethylammonium tetracyanoborate was confirmed (NMR yield: 22%).

$^1$H-NMR (d6-DMSO) δ 8.83 (s, 1H), 3.10 (q, J=7.2 Hz, 6H), 1.17 (t, J=7.2 Hz, 9H)
$^{13}$C-NMR (d6-DMSO) δ 121.9 (m), 46.0 (s), 8.8 (s)
$^{11}$B-NMR (d6-DMSO) δ −39.6 (s)

NMR yield means the crude yield amount of triethylammonium tetracyanoborate calculated by comparison of the integrated value of the peak derived from the aimed product and the integrated value of other peaks (impurities) in the obtained chart (the same shall apply hereinafter).

Experimental Example 1-2

Synthesis of Triethylmethylammonium Tricyano(trimethylsiloxy)borate ($Et_3MeNB(CN)_3OSiMe_3$)

After the inner gas of a 200 mL capacity four-neck flask with a stirrer was replaced with nitrogen gas, 8.5 g (43.34 mmol) of triethylmethylammonium bromide, 9.60 g (43.21 mmol) of triethylmethylammonium tricyanomethoxyborate ($Et_3MeNB(CN)_3OMe$) obtained in the same manner as in Production Example 1-2, and 82 g of xylene were added thereto. While stirring the mixed solution, 34.33 g (346.1 mmol, 8.0 equivalents to the boron compound) of trimethylsilyl cyanide was dropped thereto at room temperature. On completion of the dropwise addition, the reaction solution was heated to 80° C. in an oil bath and stirred for 56 hours and thereafter, the reaction was stopped.

Next, low boiling point materials (xylene, remaining trimethylsilyl cyanide, etc.) were removed from the reaction solution by distillation to obtain a reddish brown oily product. The obtained product was subjected to $^{11}$B-NMR measurement, and production of triethylmethylammonium tricyano(trimethylsiloxy)borate was confirmed (NMR yield: 77%).

$^1$H-NMR (d6-DMSO) δ 0.06 (s, 9H), 1.19 (tt, J=7.2 Hz, 2.0 Hz, 9H), 2.87 (s, 3H), 3.25 (q, J=7.2 Hz, 6H)
$^{13}$C-NMR (d6-DMSO) δ 2.17, 8.28, 46.9, 55.9, 129.6 (q, J=68.8 Hz)
$^{11}$B-NMR (d6-DMSO) δ −21 (s)

According to the process of the present invention, a tetracyanoborate salt and a cyanoborate salt (ionic compound (1)) having 1 to 3 cyano groups and an arbitrary substituent group can be obtained from the compound represented by formula (8) described above.

Experimental Example 2

NMR Measurement

NMR measurement was carried out in the same manner as in Experimental Example 1.

[Measurement of Impurity Content]

An impurity content in each ionic compound obtained in the following Experimental Examples were measured. The method for measuring each kind impurity was as follows.

[1] Water Measurement

A water content in each sample was measured by using a Karl Fischer water measurement apparatus "AQ-2000" manufactured by Hiranuma Sangyo Corporation. Each sample was used after stored for one day in a dry room (temperature: 20° C. and dewpoint: −70 to −50° C.) in the state of being put in a screw tube on completion of the drying step in each Experimental Example. An injection amount was 0.5 ml and as a generating solution, "Hydranal Aqualyte RS-A" (sold by Hiranuma Sangyo Corporation) was used and as a counter solution, "Aqualyte CN" (manufactured by Kanto Chemical Co., Inc.) was used. Each sample was injected through a sample injection port by using a syringe for keeping the sample from outside air.

[2] Measurement of $CN^−$ Content

Each measurement solution was obtained by diluting 10 mg of each ionic compound obtained in the following Experimental Examples 100 times, 1000 times, or 10000 times with ultrapure water (exceeding 18.2 Ω·cm), and the cyanide content in each compound was measured by using a simple pack for free cyanide measurement (sold by Sibata Scientific Technology Ltd., 4-pyridinecarboxylic acid method).

[3] Measurement of Metal and Semi-Metal Component Content

Each measurement solution was obtained by diluting 0.1 g of each ionic compound obtained in the following Experimental Examples 100 times or 200 times with ultrapure water (exceeding 18.2 Ω·cm), and the Na, Li, K, Si, and Fe contents in each sample were measured by using an ICP spectrophotometer ICPE-9000 (manufactured by Shimadzu Corporation). The determination limit (lower limit) is 10 ppm.

Experimental Example 2-1

Synthesis of Ionic Compound

Experimental Example 2-1-1

Synthesis of lithium tricyanomethoxyborate (LiB(CN)$_3$OMe)

To a 100 mL round-bottom flask with a stirrer were added 1.65 g (7.43 mmol) of triethylammonium tricyanomethoxyborate obtained in Production Example 1-1 and 16.01 g of pure water, and further 0.85 g (20.26 mmol) of lithium hydroxide monohydrate was added thereto at room temperature, and the mixture was stirred to allow for reaction. The stirring was continued at that temperature for 4 hours.

Next, the solvent was removed from the obtained yellow solution by distillation under reduced pressure, the resulting solution was concentrated, and the concentrate was cooled to room temperature. Thereafter, 111 g of butyl acetate and 10 g of pure water were added for liquid separation, the butyl acetate layer was separated and then butyl acetate was removed by distillation to obtain a light yellow solid product (lithium tricyanomethoxyborate). The pure water was removed from the water layer by distillation, 45 g of butyl acetate was again added, and the mixture was stirred for 30 minutes and then subjected to filtration. After butyl acetate was removed from the filtrate by distillation, the obtained product was dried by allowing it to stand still in a vacuum drier set at 80° C. for 3 days to obtain a light yellow solid product (lithium tricyanomethoxyborate) (total yield amount: 0.66 g (5.20 mmol), yield: 70%)

$^1$H-NMR (d6-DMSO) δ3.16 (q, J=3.6 Hz, 3H)
$^{13}$C-NMR (d6-DMSO) δ52.7, 127.7 (q, J=69.9 Hz)
$^{11}$B-NMR (d6-DMSO) δ−18.6 (s)

Production Example 2-1-2

Synthesis of Triethylmethylammonium Tricyanomethoxyborate (Et$_3$MeNB(CN)$_3$OMe)

To a 200 mL capacity three-neck flask equipped with a stirring apparatus was added 9.84 g (64.90 mmol) of triethylmethylammonium chloride, and the inner gas of the flask was replaced with nitrogen gas. Further, 6.74 g (64.90 mmol) of trimethyl borate was added to the flask at room temperature. Next, while stirring the mixed solution, 35.42 g (356.97 mmol) of trimethylsilyl cyanide was added at room temperature. The reaction solution was then heated to 140° C. in an oil bath and heated and stirred for 5 hours. The obtained solution was cooled to room temperature and transferred to a separating funnel and thereafter, 135 g of butyl acetate and 22.5 g of ultrapure water were added thereto. The lower layer (water phase) was extracted by liquid separation extraction and concentrated and dried by allowing it to place in a vacuum drier set at 50° C. for 3 days, and further to place stand in a vacuum drier set at 25° C. for 2 days to obtain a pale yellow liquid (triethylmethylammonium tricyanomethoxyborate (yield amount: 9.30 g (40.24 mmol), yield: 62%).

$^1$H-NMR (d6-DMSO) δ1.20 (tt, J=7.2 Hz, 1.8 Hz, 9H), 2.88 (s, 3H), 3.13 (q, J=4.0 Hz, 3H), 3.25 (q, J=7.2 Hz, 6H)

$^{13}$C-NMR (d6-DMSO) δ8.14, 46.7, 53.2, 55.7, 128.2 (q, J=69.7 Hz)
$^{11}$B-NMR (d6-DMSO) δ−18.6 (s)

Experimental Example 2-1-3

Synthesis of Potassium Tricyanomethoxyborate (KB(CN)$_3$OMe)

To a 50 mL capacity two-neck flask equipped with a stirring apparatus was added 1.30 g (19.96 mmol) of potassium cyanide, and the inner gas of the flask was replaced with nitrogen gas. Further, 2.07 g (19.93 mmol) of trimethyl borate was added thereto at room temperature. While stirring the mixed solution, 7.16 g (72.16 mmol) of trimethylsilyl cyanide was added at room temperature. Next, the reaction solution was heated to 70° C. in an oil bath and heated and stirred for 18 hours. The obtained solution was cooled to room temperature and concentrated and dried to obtain a black solid product (potassium tricyanomethoxyborate) (total yield amount: 2.44 g (15.36 mmol), yield: 77%).

$^1$H-NMR (d6-DMSO) δ3.16 (q, J=3.6 Hz, 3H)
$^{13}$C-NMR (d6-DMSO) δ52.7, 127.7 (q, J=69.9 Hz)
$^{11}$B-NMR (d6-DMSO) δ−18.6 (s)

Experimental Example 2-1-4

Dying of Potassium Tricyanomethoxyborate (KB(CN)$_3$OMe)

To a 50 mL recovery flask was added 1.04 g (6.57 mmol) of the black solid product (potassium tricyanomethoxyborate) obtained in Experimental Example 2-1-3. While reducing the pressure inside of the flask by a vacuum pump, the flask was heated to 80° C. in an oil bath, and then dried for 48 hours.

Experimental Example 2-2

Measurement of Impurity Content

The impurity content in each ionic compound obtained in Experimental Examples 2-1-1 to 2-1-4 was measured according to the above-mentioned measurement method. The results are shown in Table 1. The cation constituting each ionic compound, a product, is not regarded as impurity ion. That is, in Experimental Example 2-1-1 (M is lithium ion), alkali metals and/or alkaline earth metals other than Li are impurity ions; in Experimental Example 2-1-2 (M is onium cation), alkali metals and/or alkaline earth metals are impurity ions; and Experimental Examples 2-1-3 and 2-1-4 (M is potassium ion), alkali metals and/or alkaline earth metals other than K are impurity ions.

TABLE 1

| Ionic Compound | Impurity Content (ppm) | | | | | |
|---|---|---|---|---|---|---|
| | Water content | CN | Na | Li | K | Fe |
| Experimental Example 2-1-1 | 2447 | 92.6 | 69.5 | x | 45.6 | N.D. |
| Experimental Example 2-1-2 | 889 | 99.3 | 10.2 | 4.00 | 21.2 | N.D. |
| Experimental Example 2-1-3 | 7411 | >20190 | 1415 | 5.10 | x | 11.1 |
| Experimental Example 2-1-4 | 33661 | >4556 | 1423 | 4.21 | x | 12.2 |

In Table 1, "x" indicates that the content exceeded the upper limit (Li ions or K ions: higher than 20000 ppm) and "N. D." indicates that the content was lower than the detection limit (lower limit). Herein, Li in Experimental Example 2-1-1 and K in Experimental Examples 2-1-3 and 2-1-4 are not regarded as impurities since they are cations constituting the ionic compounds.

Experimental Example 2-3

Measurement of Voltage Endurance Range

Experimental Example 2-3-1

LSV Measurement for Triethylmethylammonium Tricyanomethoxyborate

The voltage endurance range of the triethylmethylammonium tricyanomethoxyborate synthesized in Experimental Example 2-1-2 was measured by linear sweep voltammetry (LSV). As a solution for measurement, a solution obtained by dissolving the salt produced in Experimental Example 2-1-2 in a dehydrated propylene carbonate (manufactured by Kishida Chemical Co., Ltd.) and adjusting the concentration to 25% by mass was used. The measurement condition is as follows and the results are shown in FIG. 1.

[LSV Measurement]

The measurement of the voltage endurance range was carried out in a dry room set at 20° C. by using a standard voltammetric tool HZ-3000 (trade name: manufactured by Hokuto Denko) using a triode cell. The measurement conditions were as follows.

(Measurement Condition)

Work electrode: a glassy carbon electrode; Reference electrode: an Ag electrode; and Counter electrode: a platinum electrode Solution concentration: 25% by mass
Solvent: Propylene carbonate
Sweeping speed: 100 mV/s
Sweeping range: natural potential to ±10 V
Standard current value: 0.1 mA According to the results shown in FIG. 1, an electric current (0.1 mA or higher) is not observed up to 10 V (based on silver electrode), and it is supposed that the electrolytic solution of the present invention containing triethylmethylammonium tricyanomethoxyborate as an electrolyte hardly causes electrolyte decomposition even if it is used in a high voltage range.

Experimental Example 2-3-2

Measurement of LSV for Lithium Tricyanomethoxyborate

The voltage endurance range of the lithium tricyanomethoxyborate synthesized in Experimental Example 2-1-1 was measured by linear sweep voltammetry (LSV). As a solution for measurement, a solution obtained by dissolving the salt produced in Experimental Example 2-1-1 in dehydrated γ-butyrolactone (manufactured by Kishida Chemical Co., Ltd.) and adjusting the concentration to 7% by mass was used. The measurement conditions are as follows, and the results are shown in FIG. 2.

The measurement of the voltage endurance range was carried out in the same manner as in Experimental Example 2-3-1, except that the solvent for the solution for measurement was changed to γ-butyrolactone and the solution concentration was changed to 7% by mass.

Figure 2:
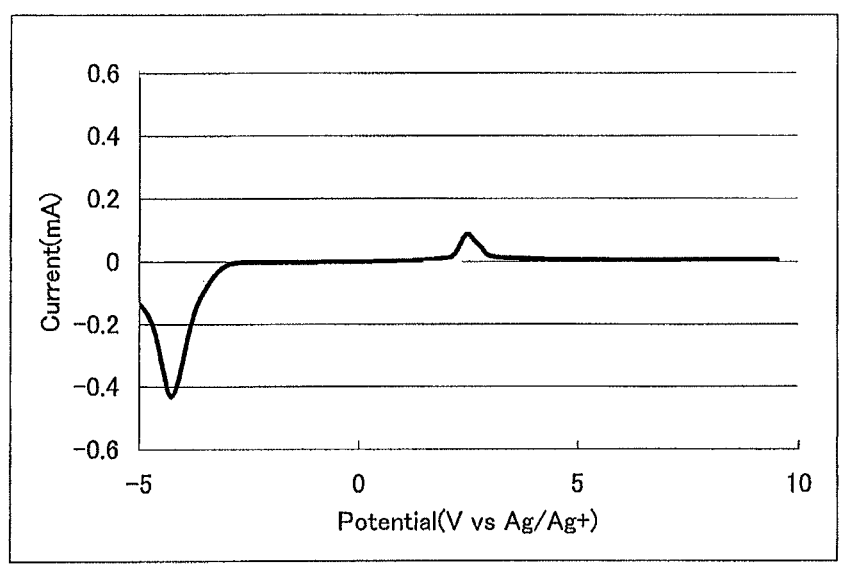
FIG. 2 is a diagram showing LSV measurement results of Experimental Example 2-3-2.

According to the results shown in FIG. 2, an electric current (0.1 mA or higher) is not observed up to 10 V (based on silver electrode) and it is supposed that the electrolytic solution of the present invention containing lithium tricyanomethoxyborate as an electrolyte hardly causes electrolyte decomposition even if it is used in a high voltage range.

The ionic compound of the present invention represented by general formula (1) described above has a decreased content of a prescribed impurity. According to the production process of the present invention, the ionic compound represented by general formula (1), more specifically, an ionic compound with a decreased amount of various impurities can be obtained. Owing to the decreased amount of a prescribed impurity, the ionic compound of the present invention is supposed to sufficiently exhibit the characteristics of the ionic compound itself when it is used for various uses, and is preferably used for various uses. Particularly, in the case where the ionic compound of the present invention is used for an electrolytic solution included in an electrical storage device, it is expected that the electrical storage device hardly causes decomposition of electrolytic solution even if operated in a high voltage range, has good cycle performance, and has high performance.

Experimental Example 2-4

Charge/Discharge Test

CR 2032 type coin cells were produced using the lithium tricyanomethoxyborate synthesized in Experimental Example 2-1-1 and commercialized γ-butyrolactone (LIB grade; manufactured by Kishida Chemical Co., Ltd.) and subjected to a charge/discharge test.

The coin cell was produced by using $LiMn_2O_4$ as a positive electrode, a lithium foil (thickness: 0.5 mm, manufactured by Honjo Metal Co., Ltd.) as a negative electrode, making the positive electrode and the negative electrode facing each other with a nonwoven fabric made of glass interposed therebetween, and filling the gap with a solution of 7% by mass (0.7 M) lithium tricyanomethoxyborate in γ-butyrolactone (electrolytic solution).

Figure 3:
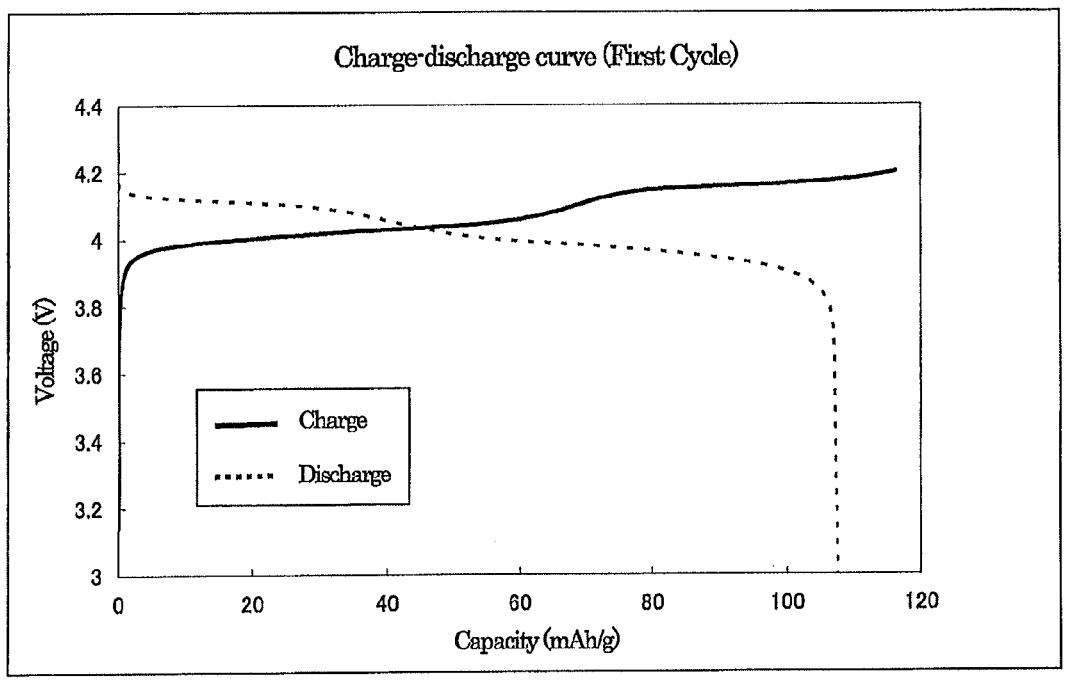
FIG. 3 is a graph showing initial charge/discharge test results of Experimental Example 2-4.

Using the produced coil cell, the discharge capacity was measured at initial time and after 10 cycles by a charge/discharge test apparatus ("Battery Labo System [BS2501 Series]", manufactured by Keisokuki Center Co., Ltd.) and the retention ratio of the capacity after 10 cycles was calculated. In the respective charge/discharge times, charge/discharge pause for 10 minute was provided. The measurement conditions are as follows. The results are shown in Table 2 and the charge/discharge curve at the time of initial charge/discharge is shown in FIG. 3.

(Measurement Condition)
Charge/discharge rate: 0.2 C
Charge/discharge mode: constant current mode
Charge/discharge range: 3.0 V to 4.2 V (based on Li)

TABLE 2

| Experimental Example | Ionic species in the electrolyte | | Discharged Capacity (mAh/g) | | Retention Rate (%) |
| --- | --- | --- | --- | --- | --- |
| | Cation | Anion | First | After 10 cycles | |
| 2-4 | $Li^+$ | $[B(CN)_3(OMe)]^-$ | 108 | 104 | 97 |

According to the results shown in Table 2, it can be understood that an electrical storage device equipped with an electrolytic solution containing lithium tricyanomethoxyborate shows a small decrease of capacity retention ratio after 10 cycles. As a result, it was shown that the electrolytic solution of the present invention containing the ionic compound represented by general formula (1) and a solvent is preferable as an electrolytic solution for an electrical storage device, and that an electrical storage device equipped with the electrolytic solution of the present invention hardly causes a capacity decrease even if charge/discharge is repeated.

The electrolytic solution of the present invention containing the ionic compound represented by general formula (1) described above and a solvent hardly decompose even in a high voltage range, and thus can be preferably used as an electrolytic solution for various electrical storage devices. It is also supposed that in an electrical storage device equipped with the electrolytic solution of the present invention, the electrolytic solution is hardly deteriorated even in operating at high potential, and the device can be operated stably.

Experimental Example 3

NMR Measurement

Using "Unity Plus" (400 MHz) manufactured by Varian, $^1$H-NMR and $^{13}$C-NMR spectra were measured and structural analysis was performed for each sample based on the peak intensities of proton and carbon. For measurement of $^7$Li-NMR and $^{11}$B-NMR spectra, "Advance 400 M" (400 MHz) manufactured by Bruker was used.

The NMR spectra measurement was carried out at room temperature (25° C.) and cumulative number of 64 times by loading each measurement sample obtained by dissolving a reaction solution or an obtained salt in a concentration of 1% by mass to 5% by mass in deuterated dimethyl sulfoxide in an NMR tube made of aluminum oxide and free from boron element. In the $^1$H-NMR and $^{13}$C-NMR spectra measurement, tetramethylsilane was employed as a standard substance, and in the $^7$Li-NMR spectra measurement, lithium chloride was used as a standard substance and in the $^{11}$B-NMR spectra measurement, 1-ethyl-3-methylimidazolium tetrafluoroborate was used as a standard substance for a calibration reference.

[Measurement of Water Content]

A water content in an ionic compound (electrolytic material (iii)) obtained in the following Experimental Example, or an electrolytic solution (electrolytic material (ii)) containing an ionic compound, and an organic solvent was measured by using a Karl Fischer Moisture Titrator "AQ-2100", manufactured by Hiranuma Sangyo Corporation. Handling of the ionic compounds or ionic conductive materials and operation of a series of measurement for water content and the like were performed in a dry room (temperature: 25° C., dewpoint: −70° C. to −50° C.). A sample injection amount was adjusted to 0.1 ml to 3 ml depending on the water content of each sample and "Hydranal (registered trade name) Chromat AK" (manufactured by Sigma Aldrich) was used as a generating solution and "Hydranal (registered trade name) Chromat CG-K" (manufactured by Sigma Aldrich) was used as a counter solution. Each sample was injected through a sample injection port by using a syringe for keeping the sample from outside air.

The water content of a solution containing the ionic compound (1) (electrolytic material (ii) of the present invention) was measured using each ionic compound obtained in the following Experimental Examples by using the above-mentioned Karl Fischer Moisture Titrator. The water content of a solid (ionic compound (1)) was calculated by measuring the water content for a sample solution prepared by dissolution in a solvent with previously measured water content and subtracting the water content derived from the solvent from the water content of the measured solution (measured value) with regard to the ionic compound (1) in a solid state. Additionally, in the case where a polymer is contained as a medium of the electrolytic material (ii), the measurement can be carried out by dispersing the material in a solvent in the same manner as in the measurement of the solid state ionic compound (1).

[Measurement of Impurity Content]

A impurity content in each ionic compound obtained in the Experimental Examples was measured. The measurement for the contents of various impurities (CN$^-$, metal and semi-metal component contents) was carried out in the same manner as in Experimental Example 2.

Experimental Example 3-1

Synthesis of Ionic Compound

Experimental Example 3-1-1

Synthesis of Lithium Tricyanomethoxyborate (LiB(CN)$_3$OMe)

To a 1 L capacity three-neck flask equipped with a thermometer, a stirring apparatus, and a dripping funnel was added 109 g (600 mmol) of triethylammonium bromide, and the inner gas of the flask was replaced with nitrogen gas. After 300 mL of 1,2-dichloroethane was added to the flask, further 62.3 g (600 mmol) of trimethyl borate was added at room temperature (25° C.). Next, while stirring the obtained mixed solution, 238 g (2400 mmol, 4.0 equivalents to the boron compound) of trimethylsilyl cyanide was dropped to the flask at room temperature and thereafter the mixed solution was heated to 60° C. in an oil bath and stirred continuously for 15 hours at the same temperature to allow for reaction.

Thereafter, the organic solvent was removed from the obtained yellow reaction solution by distillation under reduced pressure, the resulting solution was concentrated, and the concentrated solution was cooled to room temperature, and successively, a yellow oily triethylammonium tricyanomethoxyborate (crude) was obtained.

Next, to a 1 L recovery flask with a stirrer were added the obtained triethylammonium tricyanomethoxyborate and 574 g of pure water and further 30.2 g (720 mmol) of lithium hydroxide monohydrate was added thereto at room temperature and the mixture was stirred continuously for 4 hours at the same temperature to allow for reaction.

The solvent was removed from the obtained yellow reaction solution by distillation under reduced pressure, the resulting solution was concentrated, and the concentrated solution was cooled to room temperature. Thereafter, the concentrated solution and 1567 g of ethyl acetate were mixed in a separating funnel and shaken and stirred to extract a product in the organic layer. After the organic layer was separated from the water layer, ethyl acetate was removed by distillation to obtain light yellow solid lithium tricyanomethoxyborate (crude) (yield amount: 45.3 g, yield: 59.5%).

Next, in the separating funnel, the obtained lithium tricyanomethoxyborate was dissolved in 228 g of an aqueous 5% by mass lithium hydroxide solution and further 2273 g of butyl acetate was added and shaken and stirred to extract a product in the organic layer. After the organic layer was separated from the water layer, butyl acetate was removed by distillation. This operation was repeated 2 times to obtain white solid lithium tricyanomethoxyborate (washed product) (yield amount: 25.3 g).

To the obtained lithium tricyanomethoxyborate was added 160 g of dehydrated acetonitrile, and the mixture was heated to 70° C. to obtain a uniform solution, which was allowed to stand still overnight at −20° C. After the standstill, the solid precipitated in the bottom of the flask was filtered to obtain a white crystal of lithium tricyanomethoxyborate (primary crystal, recrystallized product). The filtrate was recovered and acetonitrile was removed by distillation and the above-mentioned recrystallization operation was carried out again to obtain a secondary crystal (total yield amount: 16.6 g, 131 mmol, total yield: 22%, water content: 531 ppm). The amounts of respective impurities contained in the product are shown in Table 3.

$^1$H-NMR (d6-DMSO) δ3.16 (q, J=3.6 Hz, 3H)
$^{13}$C-NMR (d6-DMSO) δ8.80, 49.9, 52.7, 127.7 (q, J=69.5 Hz)
$^{11}$B-NMR (d6-DMSO) δ−18.6 (s)

Experimental Example 3-1-2

Synthesis of Lithium Tricyanoethoxyborate (LiB(CN)$_3$OEt)

Reaction and purification were carried out in the same conditions as in Experimental Example 3-1-1, except that 72.7 g (498 mmol) of triethyl borate was used in place of trimethyl borate in Experimental Example 3-1-1 to obtain a white crystal of lithium tricyanoethoxyborate (recrystallized product) (yield amount: 30.3 g, 215 mmol, total yield: 43%, water content: 593 ppm). The amounts of respective impurities contained in the product are shown in Table 3.

$^1$H-NMR (d6-DMSO) δ1.12 (t, J=7.2 Hz, 3H), 3.37-3.38 (m, 2H)
$^{13}$C-NMR (d6-DMSO) δ17.4, 60.5, 128.0 (q, J=69.7 Hz)
$^{11}$B-NMR (d6-DMSO) δ−19.2 (s)

TABLE 3

| | Impurity Content (ppm) | | | | | |
|---|---|---|---|---|---|---|
| | Water content | CN | Na | Li | K | Fe |
| Experimental Example 3-1-1 | 531 | 20 | 73.5 | x | 19.6 | N.D. |
| Experimental Example 3-1-2 | 593 | 50 | 11.6 | x | N.D. | N.D. |

In Table 3, "x" indicates that the content exceeded the upper limit (Li ions: higher than 20000 ppm) and "N. D." indicates that the content was lower than the detection limit (lower limit). Herein, Li in Experimental Examples 3-1-1 and 3-1-2 is not regarded as an impurity since Li is cation constituting the ionic compounds.

Experimental Example 3-2

Production of Electrolytic Material

Experimental Example 3-2-1

A uniform sample solution was obtained by dissolving 1.01 g of the lithium tricyanomethoxyborate (LiB(CN)$_3$OMe, recrystallized product) (water content: 531 ppm) obtained in Experimental Example 3-1-1 in 9.61 g of γ-butyrolactone with a water content of 12.8 ppm. The water content of the sample solution at that time was 62.1 ppm.

Next, in a dry room at a temperature of 25° C. and a dewpoint of −70° C. to −50° C., the sample solution and a molecular sieve 2 (molecular sieve containing sodium cation, model number "4A SDG", average pore diameter (nominal value): 4 angstroms, spherical, manufactured by UNION SHOWA K. K.) in an amount of 33% by mass to the mass of the sample solution were loaded to a screw tube made of polypropylene and tightly sealed and stirred for 24 hours in environments of a temperature of 25° C. and a dewpoint of −70° C. to −50° C. by a shaking apparatus (SHAKER RS-2, manufactured by As One Corporation) to measure the water content. The results are shown in Table 4.

Experimental Example 3-2-2

A uniform sample solution was obtained by dissolving 1.12 g of the lithium tricyanoethoxyborate (LiB(CN)$_3$OEt, recrystallized product) (water content: 593 ppm) obtained in Experimental Example 3-1-2 in 9.20 g of γ-butyrolactone. The water content of the sample solution at that time was 75.8 ppm.

Next, similar to the Experimental Example 3-2-1, in a dry room at a temperature of 25° C. and a dewpoint of −70° C. to −50° C., the sample solution and a molecular sieve 2 in an amount of 33% by mass to the mass of the sample solution were loaded to a screw tube made of polypropylene and tightly sealed and stirred for 24 hours in environments of a temperature of 25° C. and a dewpoint of −70° C. to −50° C. by a shaking apparatus (SHAKER RS-2, manufactured by As One Corporation) to measure the water content. The results are shown in Table 4.

The water content (solution) obtained at that time and the water content (powder) calculated from the amount of a powder obtained when the solvent is removed from the sample solution after 24 hour stirring are both shown in Table 4.

TABLE 4

| | Molecular Sieve | | Sample Solution [g] | Water content (Solution) [ppm] After 24 hours | Water content (powder) [ppm] |
|---|---|---|---|---|---|
| | Kind | Used amount [g] | | | |
| Experimental Example 3-2-1 | Molecular Sieve 2 | 3.33 | 10.62 | 10.1 | 106.2 |
| Experimental Example 3-2-2 | Molecular Sieve 2 | 3.44 | 10.33 | 9.6 | 88.5 |

From Table 4, it can be understood that in both Examples 3-2-1 and 3-2-2, the water content can be so sufficiently lowered as to make the ionic compounds usable as a conductive material by bringing into contact with a molecular sieve while the ionic compound concentration is maintained.

The present invention can provide electrolytic materials (ii) and (iii) with a lowered content of water which causes an adverse effect on electrochemical characteristics and a process for producing these materials. Consequently, it is supposed that the electrolytic materials (ii) and (iii) with a lowered water content of the present invention show a good voltage endurance property and are preferably used for various electrochemical devices.

Experimental Example 4

Experimental Example 4-1

Synthesis of Ionic Compound

Experimental Example 4-1-1

Synthesis of Triethylmethylammonium Tricyanophenylborate (Et$_3$MeNB(CN)$_3$Ph)

To a 30 mL capacity two-neck flask equipped with a stirring apparatus was added 0.98 g (5.0 mmol) of triethylmethylammonium bromide and the inner gas of the flask was replaced with nitrogen gas. After 5 mL of chlorobenzene was added to the flask, 0.65 mL (4.9 mmol) of dichlorophenylborane was further added at room temperature (25° C.). Next, while stirring the mixed solution, 2.6 mL (21.1 mmol, 4.2 equivalents to the boron compound) of trimethylsilyl cyanide was dropped to the flask at room temperature and thereafter the reaction solution was heated to 80° C. in an oil bath and stirred to allow for reaction. The stirring was continued at this temperature for 9 hours.

Thereafter, the organic solvent was removed from the obtained yellow solution by distillation under reduced pressure, and the concentrated solution was cooled to room temperature, and to the obtained powder were added 50 g of ethyl acetate and 10 g of pure water for solution separation and the ethyl acetate layer was separated. Next, ethyl acetate was removed by distillation to obtain a brown solid crude product (triethylmethylammonium tricyanophenylborate). The crude product was purified by recrystallization (solvent: diethyl ether/acetonitrile) to obtain a white crystal (yield amount: 0.43 g (1.51 mmol), yield: 30%).

$^1$H-NMR (d6-DMSO) δ1.22 (t, J=7.2 Hz, 9H), 2.90 (s, 3H), 3.27 (q, J=7.2 Hz, 6H), 7.25-7.28 (m, 1H), 7.29-7.36 (m, 2H), 7.43-7.45 (m, 2H)
$^{13}$C-NMR (d6-DMSO) δ7.37, 45.9, 54.9, 126.8, 127.9, 128.5-129.5 (m), 132.3, 138.1-139.3 (m)
$^{11}$B-NMR (d6-DMSO) δ-29.0 (s)

Experimental Example 4-1-2

Synthesis of Lithium Cyano(Fluoro)Oxalylborate (LiB(CN)(F)(OC(O)C(O)O))

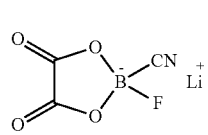

[Chemical formula 7]

To a 100 mL capacity three-neck flask equipped with a stirring apparatus was added 2.19 g of lithium difluorooxalylborate (15.2 mmol, lithium difluorooxalylborate was produced with reference to the method described in Chemistry-A European Journal 2009, 15, 10, p 2270-p 2272) and the inner gas of the flask was replaced with nitrogen gas. Next, 20 mL of isobutyronitrile was added thereto and while stirring the obtained mixed solution, 4.7 mL (37.9 mmol, 2.5 equivalents to the boron compound) of trimethylsilyl cyanide was dropped to the flask at room temperature and thereafter the reaction solution was heated to 80° C. in an oil bath and stirred at this temperature continuously for 2.5 hours to allow for reaction.

Thereafter, the obtained yellow solution was concentrated by distilling away the organic solvent under a reduced pressure to obtain a light yellow solid (lithium cyano(fluoro)oxalylborate) (yield amount: 0.55 g (3.65 mmol), yield: 73%).

$^{19}$F-NMR (d6-DMSO) δ-140.79 (q, J=30.8 Hz)
$^{11}$B-NMR (d6-DMSO) δ-0.37 (d, J=30.8 Hz)

Experimental Example 4-1-3

Synthesis of Lithium Dicyano Oxalylborate (LiB(CN)$_2$(OC(O)C(O)O))

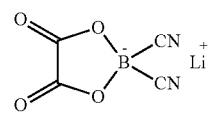

[Chemical formula 8]

To a 100 mL capacity three-neck flask equipped with a stirring apparatus was added 0.72 g (5.0 mmol) of lithium difluorooxalylborate and the inner gas of the flask was replaced with nitrogen gas. Next, 5 mL of benzonitrile was added thereto. While stirring the obtained mixed solution, 1.6 mL (12.9 mmol, 2.6 equivalents to the boron compound) of trimethylsilyl cyanide was dropped to the flask at room temperature (25° C.). Thereafter, the reaction solution was heated to 80° C. in an oil bath and stirred at this temperature continuously for 47 hours to allow for reaction.

Thereafter, the obtained yellow solution was concentrated by distilling away the organic solvent under a reduced pressure to obtain a light yellow solid (lithium dicyano oxalylborate) (yield amount: 0.40 g (2.53 mmol), yield: 51%).

$^{11}$B-NMR (d6-DMSO) δ-6.9 (s)

Experimental Example 4-2

Measurement of Voltage Endurance Range

Experimental Example 4-2-1

LSV Measurement for Triethylmethylammonium Tricyanophenylborate

The voltage endurance range of the triethylmethylammonium tricyanophenylborate synthesized in Experimental Example 4-1-1 was measured by linear sweep voltammetry (LSV). As a solution for measurement, a solution obtained by dissolving the salt produced in Experimental Example 4-1-1 in a dehydrated propylene carbonate (manufactured by Kishida Chemical Co., Ltd.) and adjusting the concentration to 19% by mass (1.0 M) was used. The measurement conditions are as follows and the results are shown in FIG. 4.

[LSV Measurement]

The measurement of the voltage endurance range was carried out in the same manner as in Experimental Example 2-3-1.

Figure 4:
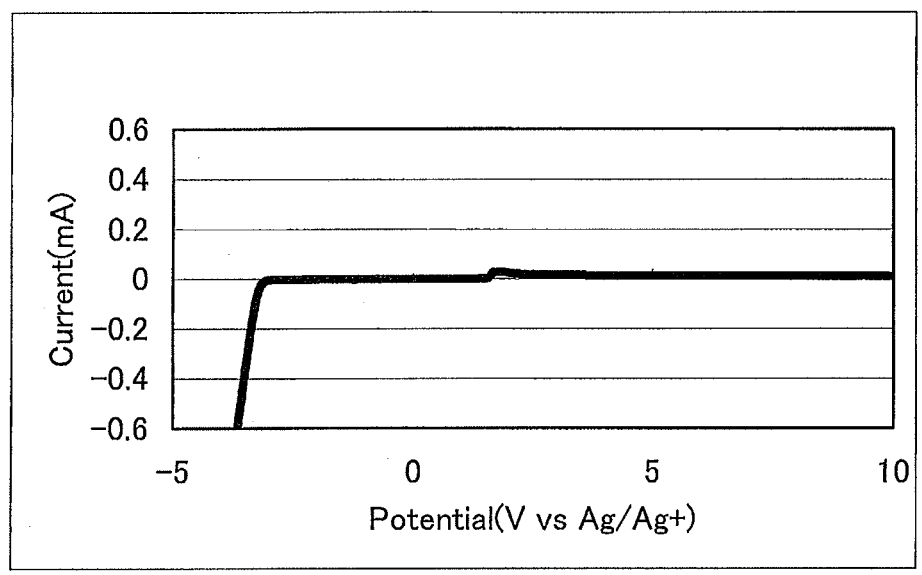
FIG. 4 is a diagram showing LSV measurement results of Experimental Example 4-2.

According to the results shown in FIG. 4, an electric current (0.1 mA or higher) is not observed up to 10 V (based on silver electrode). Therefore, it is supposed that the electrolytic solution of the present invention containing triethylmethylammonium tricyanophenylborate as an electrolyte hardly causes electrolyte decomposition even if it is used in a high voltage range.

The invention claimed is:

1. An ionic compound consisting of an organic cation or inorganic cation and an anion represented by a following formula (8-1) or (8-2);

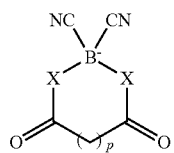
(8-1)

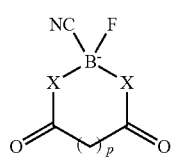
(8-2)

wherein X denotes O (oxygen) or S (sulfur), and p denotes an integer of 0 to 10.

2. The ionic compound according to claim 1, wherein the X of the formulae (8-1) and (8-2) is O.

3. An electrolytic solution comprising the ionic compound defined in claim 1 and a solvent.

4. An electrolytic material comprising the ionic compound defined in claim 1 and a solvent.

5. An electrical storage device comprising the ionic compound defined in claim 1.

6. An electrolytic solution comprising the ionic compound defined in claim 2 and a solvent.

7. An electrolytic material comprising the ionic compound defined in claim 2 and a solvent.

8. An electrical storage device comprising the ionic compound defined in claim 2.

* * * * *